US012619869B2

(12) United States Patent
Okamoto

(10) Patent No.: US 12,619,869 B2
(45) Date of Patent: May 5, 2026

(54) LEARNING APPARATUS, LEARNING METHOD, AND A NON-TRANSITORY COMPUTER-READABLE STORAGE MEDIUM

(71) Applicant: Actapio, Inc., East Wenatchee, WA (US)

(72) Inventor: Shinichiro Okamoto, Wenatchee, WA (US)

(73) Assignee: Actapio, Inc., East Wenatchee, WA (US)

( * ) Notice: Subject to any disclaimer, the term of this patent is extended or adjusted under 35 U.S.C. 154(b) by 1081 days.

(21) Appl. No.: 17/471,124

(22) Filed: Sep. 9, 2021

(65) Prior Publication Data

US 2022/0083859 A1 Mar. 17, 2022

Related U.S. Application Data

(60) Provisional application No. 63/077,273, filed on Sep. 11, 2020.

(51) Int. Cl.
| | |
|---|---|
| *G06F 18/21* | (2023.01) |
| *G06F 18/40* | (2023.01) |
| *G06N 3/08* | (2023.01) |
| *G06N 20/00* | (2019.01) |

(52) U.S. Cl.
CPC ........... *G06N 3/08* (2013.01); *G06F 18/2163* (2023.01); *G06F 18/217* (2023.01); *G06F 18/40* (2023.01); *G06N 20/00* (2019.01)

(58) Field of Classification Search
CPC ..... G06N 3/08; G06F 18/217; G06F 18/2163; G06F 18/40
See application file for complete search history.

(56) References Cited

U.S. PATENT DOCUMENTS

| | | | |
|---|---|---|---|
| 2018/0203916 A1* | 7/2018 | Rafsky | G06F 16/285 |
| 2020/0034708 A1* | 1/2020 | Shiota | G06N 3/08 |

FOREIGN PATENT DOCUMENTS

| | | |
|---|---|---|
| JP | 2019164793 A | 9/2019 |
| WO | 2020/174826 A1 | 9/2020 |

OTHER PUBLICATIONS

Burlutskiy, Nikolay, et al. "An investigation on online versus batch learning in predicting user behaviour." Research and Development in Intelligent Systems XXXIII: Incorporating Applications and Innovations in Intelligent Systems XXIV 33. Springer International Publishing, 2016. (Year: 2016).*

Choi, Dami, et al. "Faster neural network training with data echoing." arXiv preprint arXiv:1907.05550 (2019). (Year: 2019).*

Japanese Patent Office, Notice of Reasons for Refusal, Application No. JP2021-1487872, dated Dec. 13, 2022, in 5 pages.

(Continued)

*Primary Examiner* — Eric Nilsson

(74) *Attorney, Agent, or Firm* — PROCOPIO, CORY, HARGREAVES & SAVITCH LLP

(57) ABSTRACT

A learning apparatus according to the present application includes: a dividing unit that divides predetermined learning data features of which are to be learned by a model by training, into a plurality of sets in chronological order; and a training unit that trains the model to learn the features of the learning data included in the set obtained by the division by the dividing unit, for each of the divided sets, in a predetermined order.

8 Claims, 25 Drawing Sheets

(56) References Cited

OTHER PUBLICATIONS

Alec Radford et al., "Improving Language Understanding by Generative Pre-Training", Jun. 11, 2018, pp. 1-12, URL: https://cdn.openai.com/research-covers/languague-unsupervised/language_understanding_paper.pdf.

Japanese Patent Office, Notice of Reasons for Refusal, Application No. JP2021-147872, dated Jun. 13, 2023, in 5 pages.

Jacob Devlin et al., "BERT: Pre-training of Deep Bidirectional Transformers for Language Understanding", May 24, 2019, pp. 1-16, URL: https://arxiv.org/pdf/1810.04805v2.pdf.

Japanese Patent Office, Notice of Reasons for Refusal, Application No. 2024-002587, dated Sep. 9, 2025, in 5 pages.

"What is Combinatorial Purged Cross-Validation for time series data?", Cross Validated [online], Jan. 3, 2025, [retrieved on Aug. 26, 2025], all 1 page, Retrieved from <https://stats.stackexchange.com/questions/443159/what-is-combinatorial-purged-cross-validation-for-time-series-data>.

* cited by examiner

Figure 11:
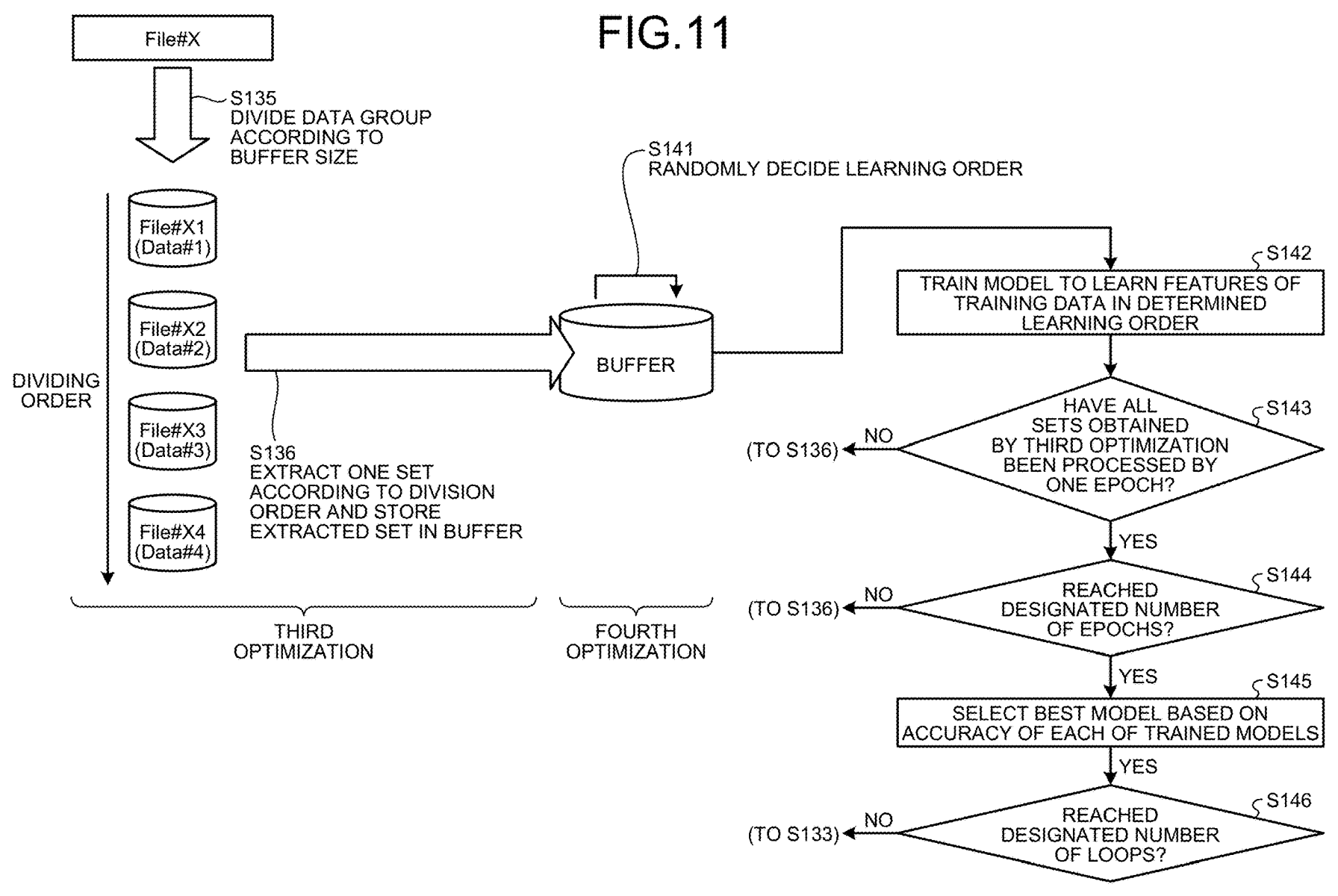

File#X

S135 DIVIDE DATA GROUP ACCORDING TO BUFFER SIZE

File#X1 (Data#1)
File#X2 (Data#2)
File#X3 (Data#3)
File#X4 (Data#4)

DIVIDING ORDER

S136 EXTRACT ONE SET ACCORDING TO DIVISION ORDER AND STORE EXTRACTED SET IN BUFFER

THIRD OPTIMIZATION

BUFFER

FOURTH OPTIMIZATION

S141 RANDOMLY DECIDE LEARNING ORDER

S142 TRAIN MODEL TO LEARN FEATURES OF TRAINING DATA IN DETERMINED LEARNING ORDER

S143 HAVE ALL SETS OBTAINED BY THIRD OPTIMIZATION BEEN PROCESSED BY ONE EPOCH?

NO (TO S136)

YES

S144 REACHED DESIGNATED NUMBER OF EPOCHS?

NO (TO S136)

YES

S145 SELECT BEST MODEL BASED ON ACCURACY OF EACH OF TRAINED MODELS

S146 REACHED DESIGNATED NUMBER OF LOOPS?

NO (TO S133)

YES

FIG.13

STOP CONDITION C1

```
early_stopping:
  is_active: False
  function: stop_if_no_decrease_hook
  metric_name: average_loss
  max_epochs_without_decrease: 3
  #max_steps_without_decrease: 1000
  min_epochs: 1
  #min_steps: 0
```

STOP CONDITION C2

```
early_stopping_1:
  is_active: False
  function: stop_if_no_increase_hook
  metric_name: auc
  max_epochs_without_increase: 3
  #max_steps_without_increase: 1000
  min_epochs: 1
  #min_steps: 0
```

ONE EXAMPLE OF STOP CONDITION

STOP CONDITION C3

```
early_stopping_2:
  is_active: False
  function: stop_if_lower_hook
  metric_name: accurcy
  threshold: 0.8
  min_epochs: 3
  #min_steps: 0
```

STOP CONDITION C4

```
early_stopping_3:
  is_active: False
  function: stop_if_higher_hook
  metric_name: loss
  threshold: 300
  min_epochs: 5
  #min_steps: 0
```

STOP CONDITION C5

```
early_stopping_4:
  is_active: False
  function: stop_if_not_in_top_k_hook
  metric_name: auc
  top_k: 10
  epochs: 3
```

FIG.14

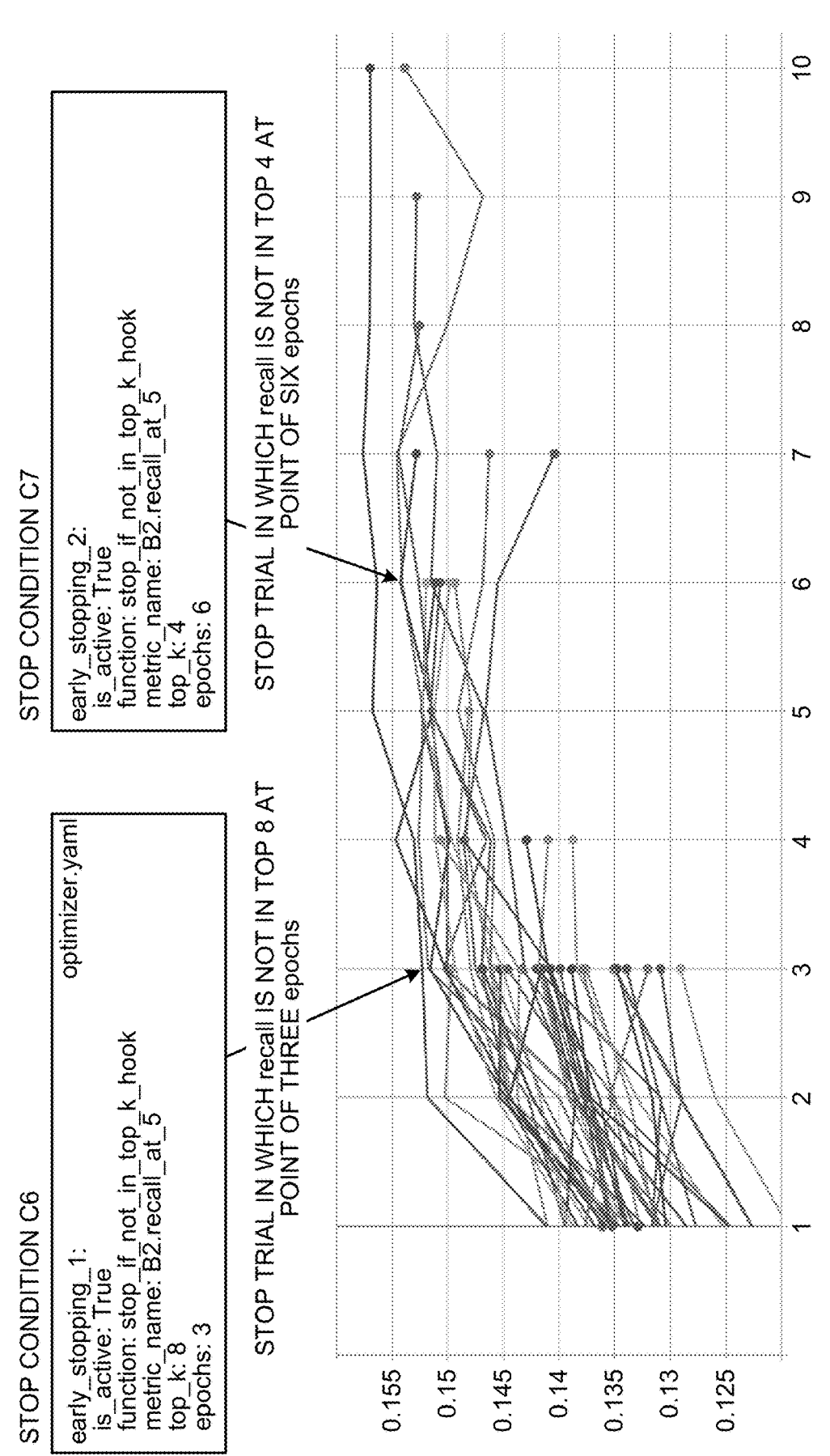

STOP CONDITION C6 optimizer.yaml early_stopping_1:
is_active: True
function: stop_if_not_in_top_k_hook
metric_name: B2.recall_at_5
top_k: 8
epochs: 3

STOP TRIAL IN WHICH recall IS NOT IN TOP 8 AT
POINT OF THREE epochs

STOP CONDITION C7 early_stopping_2:
is_active: True
function: stop_if_not_in_top_k_hook
metric_name: B2.recall_at_5
top_k: 4
epochs: 6

STOP TRIAL IN WHICH recall IS NOT IN TOP 4 AT
POINT OF SIX epochs

Recall for Test Data

Recall for Evaluation Data
used for input optimization $R^2 = 0.998$

<table>
<tr><td colspan="3">ς221</td></tr>
<tr><td>MODEL ID</td><td>ARCHITECTURE INFORMATION</td><td>...</td></tr>
<tr><td>MD#1</td><td>ARCHITECTURE #1</td><td>...</td></tr>
<tr><td>MD#2</td><td>ARCHITECTURE #2</td><td>...</td></tr>
<tr><td>...</td><td>...</td><td>...</td></tr>
</table>

FIG.19

INFORMATION INDICATING ARITHMETIC
UNIT AS EXECUTION TARGET

```
def call(self, features, mode):

with tf.device('/device:gpu:0'):
        net = self._input_layer(features)

for i in range(len(self._hidden_layers)):
            net = self._hidden_layers[i](net)

if self._dropout is not None and is_training:
            net = self._dropout_layers[i](net, training=True)

if self._batch_norm:
            net = self._batch_norm_layers[i](net, training=is_training)

logits = self._logits_layer(net)
        return logits
```

FIG.20

| No. | Number of label classes | Model Size (Trainable Parameters) | Performance Improvement | GPU Utilization | Service |
|---|---|---|---|---|---|
| 1 | 27,482 | 3.77 M | 30.8% | 28% → 38% | SV1 |
| 2 | 98,774 | 37.48 M | 44.2% | 15% → 42% | SV2 |
| 3 | 15,977 | 5.39 M | 12.3% | 15% → 18% | SV3 |
| 4 | 4,200 | 53.11 M | 65.1% | 54% → 56% | SV4 |
| 5 | 89,569 | 8.18 M | 39.1% | 39% → 45% | SV5 |

Average: 38.8%

| No. | Number of label classes | Model Size (Trainable Parameters) | Performance Improvement | GPU Utilization | Service |
|-----|------------------------|-----------------------------------|-------------------------|-----------------|---------|
| 6   | 2                      | 44.54 M                           | 50.3%                   | -               | SV6     |
| 7   | 2                      | 0.28 M                            | 30.2%                   | -               | SV7     |

LEARNING APPARATUS, LEARNING METHOD, AND A NON-TRANSITORY COMPUTER-READABLE STORAGE MEDIUM

TECHNICAL FIELD

The present invention relates to a learning apparatus, a learning method, and a learning program.

BACKGROUND ART

In recent years, there has been a proposed technique of training various models such as a support vector machine (SVM) and a deep neural network (DNN) to learn the features of learning data so that the model will perform various predictions and classifications. As an example of such a training method, there is a proposed technique of dynamically changing the learning mode of learning data in accordance with a hyperparameter value or the like.

CITATION LIST

Patent Literature

Patent Literature 1: Patent Application Laid-Open No. 2019-164793

SUMMARY

Technical Problem

Unfortunately, however, it is difficult to ensure improvement of accuracy of the model with the above-described conventional technique.

For example, in the above-described conventional technique, the learning data as a learning target of features is merely dynamically changed according to the values of the hyperparameter or the like. Therefore, when the hyperparameter values are not appropriate, there might be a case where improvement of the accuracy of the model fails.

The present application has been made in view of the above, and aims to provide a learning apparatus, a learning method, and a non-transitory computer-readable storage medium having stored therein a learning program capable of improving the accuracy of a model.

Solution to Problem

It is an object of the present invention to at least partially solve the problems in the conventional technology. According to one aspect of an embodiment, A learning apparatus includes a dividing unit that divides predetermined learning data features of which are to be learned by a model by training, into a plurality of sets in chronological order. The learning apparatus includes a training unit that trains the model to learn the features of the learning data included in the set obtained by division by the dividing unit, for each of the divided sets, in a predetermined order. The above and other objects, features, advantages and technical and industrial significance of this invention will be better understood by reading the following detailed description of presently preferred embodiments of the invention, when considered in connection with the accompanying drawings.

Advantageous Effects of Invention

According to one aspect of the embodiment, there is an effect that accuracy of the model can be improved.

BRIEF DESCRIPTION OF DRAWINGS

FIG. 4 is a diagram illustrating an example of division for each of trials when a data set is divided for each of applications;

FIG. 11 is a diagram illustrating an example of a third optimization algorithm;

FIG. 13 is a diagram illustrating an example of conditional information regarding a fifth optimization algorithm;

FIG. 14 is a diagram illustrating an example of the fifth optimization algorithm;

FIG. 19 is a diagram illustrating an example of a model architecture associated with information indicating an execution target arithmetic unit;

FIG. 20 is a diagram illustrating a state of performance improvement by experiments using a model for multi-class classification;

FIG. 21 is a diagram illustrating an example of experimental details of an experiment conducted onto a model corresponding to service SV1;

FIG. 22 is a diagram illustrating a state of performance improvement by experiments using a model for two-class classification;

DESCRIPTION OF EMBODIMENTS

Figure 1:
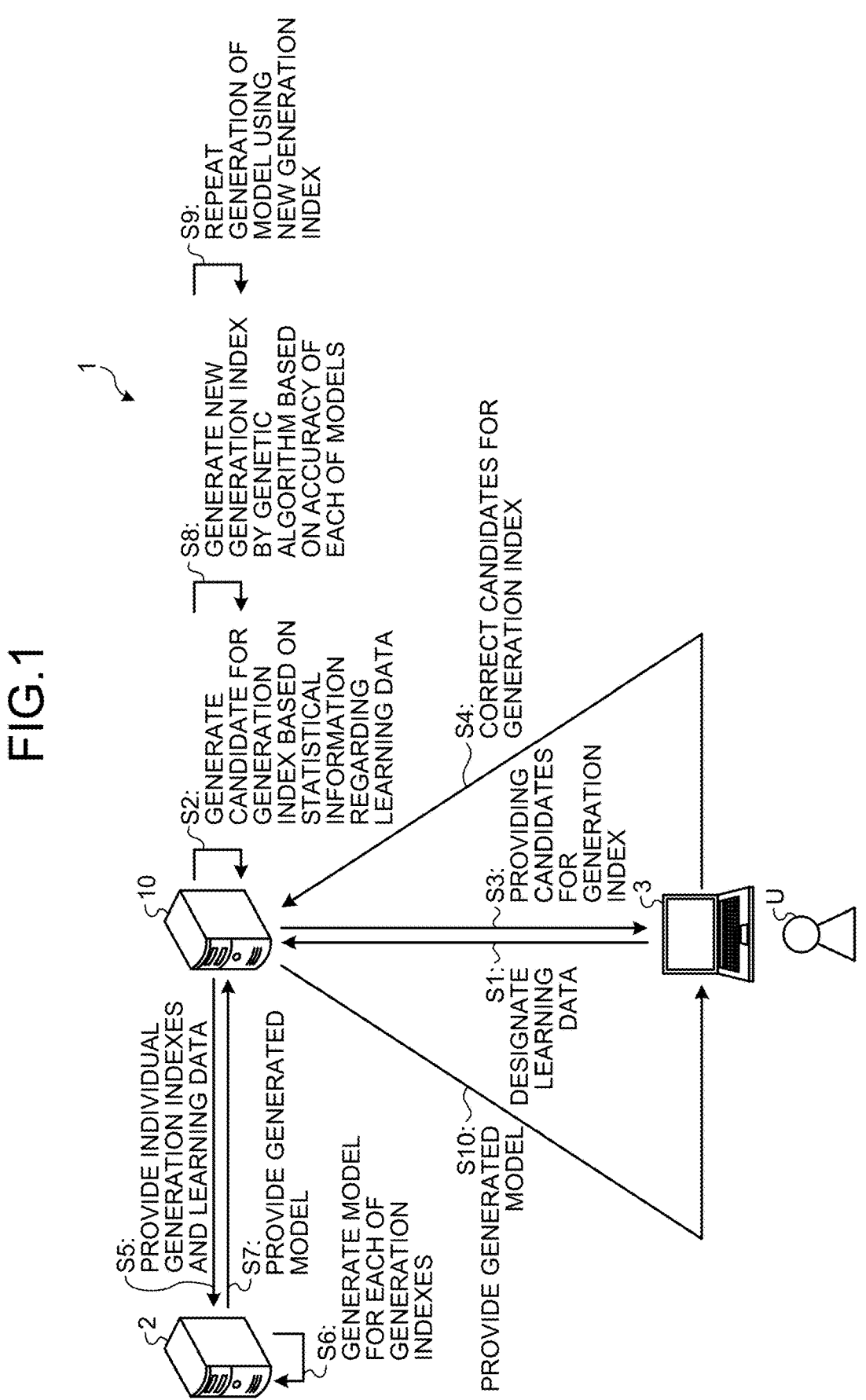
FIG. 1 is a diagram illustrating an example of processing executed by an information providing device according to an embodiment.

Modes (hereinafter, referred to as embodiments) for implementing the apparatuses, methods, and programs (specifically, a learning apparatus, a learning method, and a non-transitory computer-readable storage medium having stored therein a learning program/a classification apparatus, a classification method, and a non-transitory computer-readable storage medium having stored therein a classification program/an execution control apparatus, an execution control method, and a non-transitory computer-readable storage medium having stored therein an execution control program) according to the present application will be described in detail with reference to the drawings. The learning apparatus, learning method, and learning program according to the present application are not limited by these embodiments. Individual embodiments can be appropriately combined as long as the processes do not contradict each other. Note that the same parts in each of the following embodiments are designated by the same reference numerals, and duplicate description is omitted.

1. Embodiments

In the following embodiments, information processing executed by an information processing device 100, which is an example of the learning apparatus and the classification apparatus, and information processing executed by an execution control apparatus 200 will be mainly described. Along with this, processes executed by an information providing device 10 included in a system equipped with the information processing device 100 and the execution control apparatus 200 will be described first as a premise of information processing according to an embodiment.

2. Configuration of Information Providing System

FIG. 1 is a diagram illustrating an example of processing executed by the information providing device 10 according to an embodiment. The example of FIG. 1 illustrates an information providing system 1 as an example of a system including the information processing device 100 and the execution control apparatus 200, although not illustrated in this diagram.

As illustrated in FIG. 1, the information providing system 1 includes the information providing device 10, a model generation server 2, and a terminal device 3. The information providing system 1 may include a plurality of model generation servers 2 and a plurality of terminal devices 3. Furthermore, the information providing device 10 and the model generation server 2 may be actualized by the same server device, cloud system, or the like. Here, the information providing device 10, the model generation server 2, and the terminal device 3 are communicably connected via a network N by a wired or wireless connection.

The information providing device 10 is an information processing device that executes an index generation process of generating a generation index which is an index (that is, a model recipe) in model generation, and a model generation process of generating a model according to the generation index, and that provides the generation index and model that have been generated. The information providing device 10 is actualized by a server device or a cloud system, for example.

The model generation server 2 is a generation device that generates a model trained to learn the features of the learning data and is actualized by a server device or a cloud system, for example. For example, the model generation server 2 has received a configuration file describing the type and behavior of the model to be generated and how to train the model to learn the features of the learning data, as a model generation index, and then, automatically generates the model in accordance with the received configuration file. The model generation server 2 may train the model by using an arbitrary model training method. Furthermore, for example, the model generation server 2 may be various existing services such as AutoML.

The terminal device 3 is a terminal device used by a user U, and is actualized by, for example, a personal computer (PC), a server device, or the like. For example, the terminal device 3 communicates with the information providing device 10 to generate a model generation index and then acquires a model generated by the model generation server 2 following the generation index that has been generated.

3. Outline of Processes Executed by Information Providing Device

Next, an outline of the processes executed by the information providing device 10 will be described. First, the information providing device 10 receives from the terminal device 3 an indication of learning data having features to be learned by the model (step S1). For example, the information providing device 10 stores various types of learning data used for learning in a predetermined storage device, and receives an indication of the learning data designated by the user U as their learning data. The information providing device 10 may acquire learning data used for the learning from the terminal device 3 or various external servers, for example.

Here, any data can be adopted as the learning data. For example, the information providing device 10 may use, as learning data, various type of information regarding the user, such as the history of location of each of users, the history of web content browsed by each of users, the history of purchases by each of users, and the history of search queries. Furthermore, the information providing device 10 may use a demographic attribute, a psychographic attribute, or the like of the user, as learning data. Furthermore, the information providing device 10 may use the types and details of various web content to be distributed, metadata of the creator, or the like, as learning data.

In such a case, the information providing device 10 generates candidates for a generation index based on the statistical information of the learning data used for learning (step S2). For example, the information providing device 10 generates candidates for a generation index indicating types of model and types of training method appropriate for what type of models based on the features of values included in the learning data. In other words, the information providing device 10 generates, as a generation index, a model capable of learning the features of the learning data with high accuracy and a training method for training the model to learn the features with high accuracy. That is, the information providing device 10 optimizes training methods. Note that details of what types of generation index are to be generated by what types of learning data are selected will be described below.

Subsequently, the information providing device 10 provides a candidate for the generation index to the terminal device 3 (step S3). In such a case, the user U corrects the candidate of the generation index according to the preference, empirical rules, or the like (step S4). Subsequently, the information providing device 10 provides candidates for each of generation indexes and the learning data to the model generation server 2 (step S5).

The model generation server 2 generates a model for each of generation indexes (step S6). For example, the model generation server 2 trains the model having a structure indicated by the generation index to learn the features of the learning data by using the training method indicated by the generation index. Then, the model generation server 2 provides the generated model to the information providing device 10 (step S7).

Here, each of the models generated by the model generation server 2 is considered to have a difference in accuracy due to a difference in the generation index. Therefore, the information providing device 10 generates a new generation index by a genetic algorithm based on the accuracy of each of models (step S8), and repeatedly executes the generation of the model using the newly generated generation index (step S9).

For example, the information providing device 10 divides learning data into evaluation data and training data, and acquires a plurality of models, each of which has been trained to learn the features included in the training data, and each of which has been generated in accordance with mutually different generation indexes. For example, the information providing device 10 generates ten generation indexes, and generates ten models by using the generated ten generation indexes and the training data. In such a case, the information providing device 10 measures the accuracy of each of the ten models using evaluation data.

Subsequently, the information providing device 10 selects a predetermined number of models (for example, five) in order from the one with the highest accuracy among the ten models. The information providing device 10 then generates a new generation index from the generation index adopted when the five selected models are generated. For example, the information providing device 10 regards each of the generation indexes as an individual of a genetic algorithm, and regards the model type, the model structure, and each of various training methods indicated by each of generation indexes (that is, various indexes indicated by the generation indexes) as a gene in the genetic algorithm. Then, the information providing device 10 newly generates ten next-generation generation indexes by selecting an individual that performs crossover of genes and by performing crossover of genes. The information providing device 10 may take mutation into consideration when performing crossover of genes. In addition, the information providing device 10 may perform two-point crossover, multi-point crossover, uniform crossover, and random selection of genes for crossover. Furthermore, the information providing device 10 may adjust the crossover rate at the time of performing crossover so that the gene of an individual with higher model accuracy would be inherited more by the next-generation individual.

The information providing device 10 generates ten new models again using the next-generation generation index. Subsequently, the information providing device 10 generates a new-generation index by the above-described genetic algorithm based on the accuracy of the new ten models. By repeatedly executing such processes, the information providing device 10 can bring the generation index closer to the generation index corresponding to the features of the learning data, that is, the optimized generation index.

Furthermore, when a predetermined condition is satisfied, that is, when a new generation index has been generated a predetermined number of times, when the maximum value, the mean value, or the minimum value of the accuracy of the model exceeds a predetermined threshold, or the like, the information providing device 10 selects the model with the highest accuracy as a providing target. The information providing device 10 then provides the terminal device 3 with the corresponding generation index together with the selected model (step S10). As a result of such processes, the information providing device 10 can generate an appropriate model generation index and provide a model that follows the generated generation index merely by selecting learning data from the user.

Although the above-described example is a case where the information providing device 10 implements the stepwise optimization of the generation index by using the genetic algorithm, the embodiment is not limited to this. As will be clarified in the description below, the accuracy of the model changes greatly not only by the features of the model itself such as the type and structure of the model, but also by indexes at the time of generating the model (that is, at the time of learning of features of learning data by the model), such as how and what type of learning data is to be input to the model, and what type of hyperparameters are to be used for the learning by the model.

Therefore, the information providing device 10 would not have to perform optimization using a genetic algorithm as long as it generates a generation index presumed to be optimal corresponding to the learning data. For example, the information providing device 10 may present to the user a generation index generated in accordance with whether the learning data satisfies various conditions generated under the empirical rule, and may generate a model following the presented generation index. Furthermore, after receiving the correction of the presented generation index, the information providing device 10 may generate a model following the received generation index that has been corrected, present the accuracy and the like of the generated model to the user, and may receive correction of the generation index again. That is, the information providing device 10 may allow the user U to take a trial-and-error to select the optimum generation index.

4. Generation of Generation Index

Hereinafter, an example of what type of generation index is to be generated for what type of learning data will be described. The following example is just an example, and any process can be adopted as long as the generation index is generated in accordance with features of the learning data.

[4-1. Generation Index]

First, an example of information indicated by the generation index will be described. For example, when the model is trained to learn the features of the learning data, the mode used when the learning data is input to the model, the mode of the model, and the learning mode of the model (that is, the features indicated by the hyperparameters) are considered to contribute to the accuracy of the model to be finally obtained. Therefore, the information providing device 10 generates a generation index that optimizes each of modes in accordance with features of the learning data so as to improve the accuracy of the model.

For example, it is considered that the learning data includes data with various labels, that is, data indicating various features. However, selecting the learning data that is data indicating features that is not useful when classifying the data would deteriorate the accuracy of the model to be finally obtained. In view of this, the information providing device 10 decides the features of the input learning data as a mode when the learning data is input to the model. For example, the information providing device 10 decides which labeled data (that is, data indicating which feature) among the learning data is to be input. In other words, the information providing device 10 optimizes the combination of features to be input.

Furthermore, it is considered that the learning data includes data with various column types, such as data containing only numerical values and data containing character strings. When inputting such learning data into the model, the accuracy of the model is considered to change depending on whether the data is input as non-converted data or converted data in another format. For example, when inputting a plurality of types of learning data (learning data indicating different features) and when inputting learning data of character strings and learning data of numerical values, the accuracy of the model is considered to change depending on whether the case where the character strings and numerical values are input as non-converted values, the case where character strings are converted to numerical values and only the numerical values are input, or the case where numerical values are input as character strings. In view of this, the information providing device 10 decides the format of the learning data to be input to the model. For example, the information providing device 10 decides whether the learning data to be input to the model is data as numerical values or data as character strings. In other words, the information providing device 10 optimizes a column type of the features to input.

In addition, in the presence of learning data indicating different features, the accuracy of the model is considered to change depending on which combination of features is to be input at the same time. That is, in the presence of learning data indicating different features, it is considered that the accuracy of the model changes depending on which of the feature combining features (that is, the relationship between the combinations of a plurality of features) is to be used for the learning. For example, when there are pieces of learning data, that is, learning data indicating a first feature (for example, gender), learning data indicating a second feature (for example, address), and learning data indicating a third feature (for example, purchase history), the accuracy of the model is considered to change depending on whether it is a case where the learning data indicating the first feature and the learning data indicating the second feature are input at the same time, and a case where the learning data indicating the first feature and the learning data indicating the third feature are input at the same time. In view of this, the information providing device 10 optimizes the combination of features (crosses-feature) that allows the model to learn the relationships.

Here, various models project input data into a space of a predetermined dimension divided by a predetermined hyperplane, and classifies the input data depending on which space the projected position belongs to in the divided space. Therefore, when the number of dimensions of the space to which the input data is projected is lower than the optimum number of dimensions, the classification ability of the input data would deteriorate, leading to the deterioration of the accuracy of the model. In contrast, when the number of dimensions of the space to which the input data is projected is higher than the optimum number of dimensions, an internal product value with the hyperplane would change, leading to a failure in appropriate classification of data different from the data used at the time of learning. In view of these, the information providing device 10 optimizes the number of dimensions of the input data to be input to the model. For example, the information providing device 10 controls the number of nodes in an input layer included in the model so as to optimize the number of dimensions of the input data. In other words, the information providing device 10 optimizes the number of dimensions of the space to which the input data is to be embedded.

In addition to the SVM, the model includes a neural network having a plurality of intermediate layers (hidden layers) or the like. In addition, such neural networks include various types of neural networks such as a feed-forward DNN that transmits information in one direction from an input layer to an output layer, a convolutional neural network (CNN) that performs convolution of information in the intermediate layer, a recurrent neural network (RNN) having a directed cycle, and a Boltzmann machine. In addition, such various types of neural networks include long short-term memory (LSTM) and various other neural networks.

In this manner, when the types of models for learning various features of the learning data are different, the accuracy of the model is considered to change. In view of this, the information providing device 10 selects the type of model that is estimated to learn the features of the learning data with high accuracy. For example, the information providing device 10 selects the model type according to what type of label is given as the label of the learning data. As a more specific example, when there is data with a term related to "history" attached as a label, the information providing device 10 selects an RNN, which is considered to be able to better learn the features of histories, and when there is data with a term related to "image" attached as a label, the information providing device 10 selects a CNN, which is considered to be able to better learn the features of images. In addition to these, the information providing device 10 may preferably determine whether the label is a term designated in advance or a term similar to the term and select a model of a type previously associated with the term determined to be the same or similar.

In addition, a change in the number of intermediate layers of the model or the number of nodes included in one intermediate layer is considered to change the learning accuracy of the model. For example, when there is a large number of intermediate layers of the model (deep model), it is conceivable that classification based on more abstract features can be implemented. On the other hand, there might be a difficulty in propagation of local errors to the input layer in backpropagation, leading to a failure of performing the learning appropriately. In addition, when there is a small number of nodes included in the intermediate layer, a higher level of abstraction can be performed, while too small number of nodes would lead to a high possibility of loss of information necessary for classification. In view of these, the information providing device 10 optimizes the number of intermediate layers and the number of nodes included in the intermediate layer. That is, the information providing device 10 optimizes architectures of the model.

Furthermore, the accuracy of the nodes is considered to change with which nodes are to be connected with each other depending on the presence or absence of attention and on whether there is autoregression in the node included in the model. In view of this, the information providing device 10 optimizes the network such as whether there is autoregression and which nodes are to be connected to each other.

When training a model, the model optimization methods (algorithm used in the learning), the dropout rate, a node activation function, number of units, or the like are set as hyperparameters. It is considered that the accuracy of the model also changes when such hyperparameters change. In view of this, the information providing device 10 optimizes the learning mode when training the model, that is, optimizes hyperparameters.

Moreover, the accuracy of the model also changes when there is a change in the size of the model (the number of input layers, intermediate layers, output layers, and the number of nodes). In view of this, the information providing device 10 also optimizes the size of the model.

In this manner, the information providing device 10 optimizes the indexes when generating the various models described above. For example, the information providing device 10 holds in advance the conditions corresponding to each of indexes. Note that such a condition is set by, for example, an empirical rule such as the accuracy of various models generated from past learning models. The information providing device 10 determines whether the learning data satisfies each of conditions, and adopts an index preliminarily associated with the condition that the learning data satisfies or does not satisfy, as a generation index (or a candidate of the generation index). As a result, the information providing device 10 can generate a generation index capable of high accuracy learning of the features of the learning data.

As described above, when the generation index is automatically generated from the learning data and the process of creating the model following the generation index is automatically performed, the user would not have to make a judgment as to what distribution the existing data has with reference to the inside of the learning data. As a result, the information providing device 10 can reduce the time and effort required for the data scientist or the like to recognize the learning data in creating the model, and can prevent the privacy infringement caused by the recognition of the learning data.

[4-2. Generation Index in Accordance with Data Type]

Hereinafter, an example of the conditions for generating the generation index will be described. First, an example of conditions according to the types of data adopted as learning data will be described.

For example, the learning data used for learning includes integers, floating point numbers, character strings, or the like, as data. Therefore, selecting an appropriate model for the format of the input data is estimated to achieve a higher learning accuracy of the model. In view of this, the information providing device 10 generates a generation index based on whether the learning data is an integer, a floating point number, or a character string.

For example, when the learning data is an integer, the information providing device 10 generates a generation index based on the continuity of the learning data. For example, when the density of the learning data exceeds a predetermined first threshold, the information providing device 10 regards the learning data as continuous data, and generates a generation index based on whether the maximum value of the learning data exceeds a predetermined second threshold. Furthermore, when the density of the learning data is lower than the predetermined first threshold, the information providing device 10 regards the learning data as sparse learning data, and generates the generation index based on whether the number of unique values included in the learning data exceeds a predetermined third threshold.

A more specific example will be described. The following description is an example of a process of selecting a feature function out of the configuration files to be transmitted to the model generation server 2 that automatically generates a model by AutoML as a generation index. For example, when the learning data is an integer, the information providing device 10 determines whether its density exceeds the predetermined first threshold. For example, the information providing device 10 calculates, as the density, a value obtained by dividing the number of unique values among the values included in the learning data by the value obtained by adding 1 to the maximum value of the learning data.

Subsequently, when the density exceeds the predetermined first threshold, the information providing device 10 determines that the learning data is continuous learning data, and then determines whether the value obtained by adding 1 to the maximum value of the learning data exceeds the second threshold. When the value obtained by adding 1 to the maximum value of the learning data exceeds the second threshold, the information providing device 10 selects "Categorical_column_with_identity & embedding_column", as a feature function. In contrast, when the value obtained by adding 1 to the maximum value of the learning data is less than the second threshold, the information providing device 10 selects "Categorical_column_with_identity", as a feature function.

Meanwhile, when the density is less than the predetermined first threshold, the information providing device 10 determines that the learning data is sparse, and then determines whether the number of unique values contained in the learning data exceeds the predetermined third threshold. When the number of unique values included in the learning data exceeds the predetermined third threshold, the information providing device 10 selects "Categorical_column_with_hash_bucket & embedding_column", as the feature function. When the number of unique values included in the learning data is less than the predetermined third threshold, the information providing device 10 selects "Categorical_column_with_hash_bucket", as a feature function.

Furthermore, when the learning data is character strings, the information providing device 10 generates a generation index based on the number of types of the character strings included in the learning data. For example, the information providing device 10 counts the number of unique character strings (the number of pieces of unique data) contained in the learning data. When the counted number is less than a predetermined fourth threshold, the information providing device 10 selects "categorical_column_with_vocabulary_list" and/or "categorical_column_with_vocabulary_file", as a feature function. Furthermore, when the counted number is less than a fifth threshold greater than the predetermined fourth threshold, the information providing device 10 selects "categorical_column_with_vocabulary_file & embedding_column", as a feature function. Furthermore, when the counted number exceeds the fifth threshold larger than the predetermined fourth threshold, the information providing device 10 selects "categorical_column_with_hash_bucket & embedding_column" as a feature function.

Furthermore, when the learning data is a floating point number, the information providing device 10 generates a conversion index to input data that is used to input learning data into the model, as a model generation index. For example, the information providing device 10 selects "bucketized_column" or "numeric_column", as a feature function. That is, the information providing device 10 bucketizes (groups) the learning data and selects whether to input the bucket number or the numerical value as it is. The information providing device 10 may bucketize the learning data so that the range of numerical values associated with each of buckets is substantially the same, or may associate a range of numerical values to each of buckets so that the number of pieces of the learning data classified into each of buckets is substantially the same. Furthermore, the information providing device 10 may select the number of buckets or the range of numerical values associated with the buckets, as the generation index.

Furthermore, the information providing device 10 acquires learning data indicating a plurality of features, and generates a generation index indicating a feature to be learned by the model among the features of the learning data, as the model generation index. For example, the information providing device 10 decides which label of learning data to be input to the model, and generates a generation index indicating the decided label. Furthermore, the information providing device 10 generates a generation index indicating a plurality of types of learning data whose correlation is to be learned by the model, as the model generation index. For example, the information providing device 10 decides a combination of labels to be input to the model at the same time, and generates a generation index indicating the decided combination.

Furthermore, the information providing device 10 generates a generation index indicating the number of dimensions of the learning data to be input to the model, as the model generation index. For example, the information providing device 10 may decide the number of nodes in the input layer of the model in accordance with the number of pieces of unique data included in the learning data, the number of labels to be input to the model, the combination of the number of labels to be input to the model, the number of buckets, or the like.

Furthermore, the information providing device 10 generates a generation index indicating the type of the model that is to learn the features of the learning data, as the model generation index. For example, the information providing device 10 decides the type of model to be generated according to the density and sparseness of learning data that has been used as a learning target in the past, the content of labels, the number of labels, the number of combinations of labels, or the like, and then generates a generation index indicating the decided type of model. For example, as model classes in AutoML, the information providing device 10 generates a generation index indicating "BaselineClassifier", "LinearClassifier", "DNNClassifier", "DNNLinearCombinedClassifier", "BoostedTreesClassifier", "AdaNetClassifier", "RNNClassifier", "DNNResNetClassifier", "AutoIntClassifier", or the like.

The information providing device 10 may generate a generation index indicating various independent variables of the models of each of these classes. For example, the information providing device 10 may generate a generation index indicating the number of intermediate layers of the model or the number of nodes included in each of layers, as the model generation index. Furthermore, the information providing device 10 may generate a generation index indicating the connection mode between the nodes of the model or a generation index indicating the size of the model, as the model generation index. These independent variables will be appropriately selected depending on whether the various statistical features of the learning data satisfy a predetermined condition.

Furthermore, the information providing device 10 may generate, as a model generation index, a learning mode in which the model learns the features of the learning data, that is, a generation index indicating hyperparameters. For example, in the setting of the learning mode in AutoML, the information providing device 10 may generate a generation index indicating "stop_if_no_decrease_hook", "stop_if_no_increase_hook", "stop_if_higher_hook", or "stop_if_lower_hook".

That is, based on the features of the label of the learning data used for the learning and on the features of the data itself, the information providing device 10 generates a generation index indicating the features of the learning data to be learned by the model, the mode of the model to be generated, and the learning mode in which the model is trained to learn the features of the learning data. More specifically, the information providing device 10 generates a configuration file for controlling the generation of the model in AutoML.

[4-3. Order of Deciding Generation Index]

Here, the information providing device 10 may optimize the various indexes described above in parallel, or in an appropriate order. Furthermore, the information providing device 10 may be able to change the order of optimizing each of indexes. That is, the information providing device 10 may receive, from the user, the designation of the order of deciding the features of the learning data to be learned by the model, the mode of the model to be generated, and the learning mode in which the model is trained to learn the features of the learning data, and may decide each of indexes in the order of reception.

For example, when starting generation of the generation index, the information providing device 10 optimizes input features such as the features of the learning data to be input and the mode in which the learning data is to be input, and then optimizes input cross features regarding how to use features as combination of features are to be learned. Subsequently, the information providing device 10 performs selection of a model as well as optimization of a model structure. Thereafter, the information providing device 10 optimizes the hyperparameters and finishes the generation of the generation index.

Here, in the input feature optimization, the information providing device 10 may repeatedly optimize input features by selecting and correcting various input features such as the features and input modes of the learning data to be input and by selecting new input features using a genetic algorithm. Similarly, in the input cross feature optimization, the information providing device 10 may repeatedly optimize the input cross features, or may repeatedly execute model selection and model structure optimization. Furthermore, the information providing device 10 may repeatedly execute the optimization of hyperparameters. In addition, the information providing device 10 may repeatedly execute a series of processes such as input feature optimization, input cross feature optimization, model selection, model structure optimization, and hyperparameter optimization so as to optimize each of indexes.

Furthermore, for example, the information providing device 10 may perform model selection and model structure optimization after optimization of hyperparameters, or may perform optimization of input features or optimization of input cross features after model selection and model structure optimization. Furthermore, the information providing device 10 repeatedly executes input feature optimization, for example, and then repeatedly performs input cross feature optimization. Thereafter, the information providing device 10 may repeatedly execute input feature optimization and input cross feature optimization. In this manner, any setting can be adopted for which index is optimized in which order and which optimization process is to be repeatedly executed in the optimization.

5. Information Processing According to Embodiment

Hereinabove, various processes executed by the information providing device 10 have been described with reference to FIG. 1. Hereinafter, the information processing executed by the information processing device 100 and the information processing executed by the execution control apparatus 200 will be described.

[5-1. Information Processing System Configuration]

Figure 2:
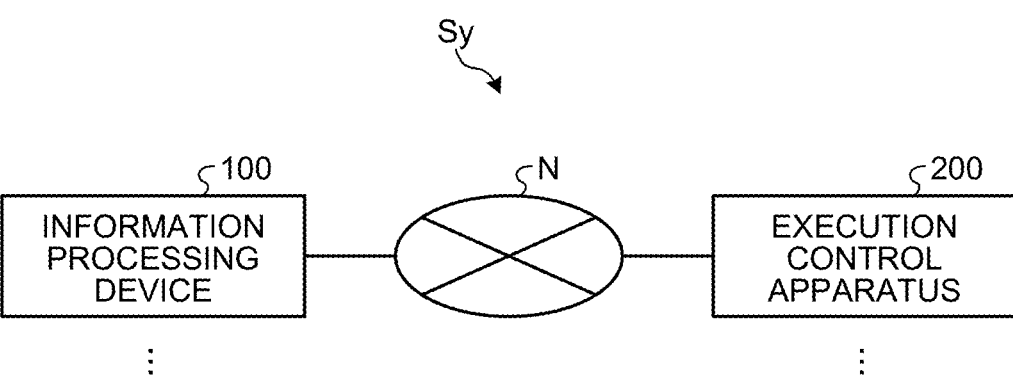
FIG. 2 is a diagram illustrating an example of an information processing system according to the embodiment.

First, prior to the description of the information processing according to the embodiment, an information processing system Sy, which is a part of the system included in the information providing system 1, will be described with reference to FIG. 2. FIG. 2 is a diagram illustrating an example of the information processing system Sy according to the embodiment. The information processing system Sy corresponds to a partial system of the information providing system 1, including the information processing device 100 and the execution control apparatus 200 alone.

As illustrated in FIG. 2, the information processing system Sy includes the information processing device 100 and the execution control apparatus 200. In the present embodiment, the information processing device 100 will be described as a server device, but may be actualized by a cloud system or the like. Furthermore, in the present embodiment, the execution control apparatus 200 will be described as a server device, but may be actualized by a cloud system or the like.

Here, as described with reference to FIG. 1, the information providing device 10 optimizes the architecture of a model according to the features of the data and automatically generates the model in order to facilitate the creation of the model.

In contrast, the information processing device 100 performs as main information processing, a process of optimizing training/generation methods such as how to train or generate a model. The information processing device 100 can also operate as the information providing device 10 when it includes a part or all of the functions of the information providing device 10. Furthermore, the information processing device 100 can also include a part or all of the functions of the model generation server 2. Furthermore, the information processing device 100 is to execute various processes illustrated in the following embodiments in addition to the processes described in FIG. 1 as those to be performed by the information providing device 10.

Furthermore, the execution control apparatus 200 performs, as main information processing, a process of optimizing an execution subject that executes processes using a model (for example, a process of predicting a specific target).

The optimization process executed by the information processing device 100 is roughly divided into: an optimization process of optimizing a training methods of how to train or generate a model; and an optimization process of optimizing data to be input to a trained model in a situation where the trained model is actually utilized. Therefore, in the following embodiment the optimization process of optimizing the training methods and the optimization process of optimizing the data to be input to a trained model, which are executed by the information processing device 100, will be first described in this order, and then, the optimization process of the execution subject by the execution control apparatus 200 will be described.

Furthermore, the optimization process of optimizing the training methods can be further classified into five optimization processes such as a first optimization to a fifth optimization, which will be described below. Accordingly, the optimization process of optimizing the training methods will be first described using FIG. 3 below, including an outline of each of optimizations, namely, the first optimization to the fifth optimization, and an example of order of execution in which the first optimization to the fifth optimization are to be executed will be described. Thereafter, a detailed example of each of the first optimization to the fifth optimization will be described based on the functional configuration diagram illustrated in FIG. 5.

[5-2. Example of Process Executed by Information Processing Device]

Figure 3:
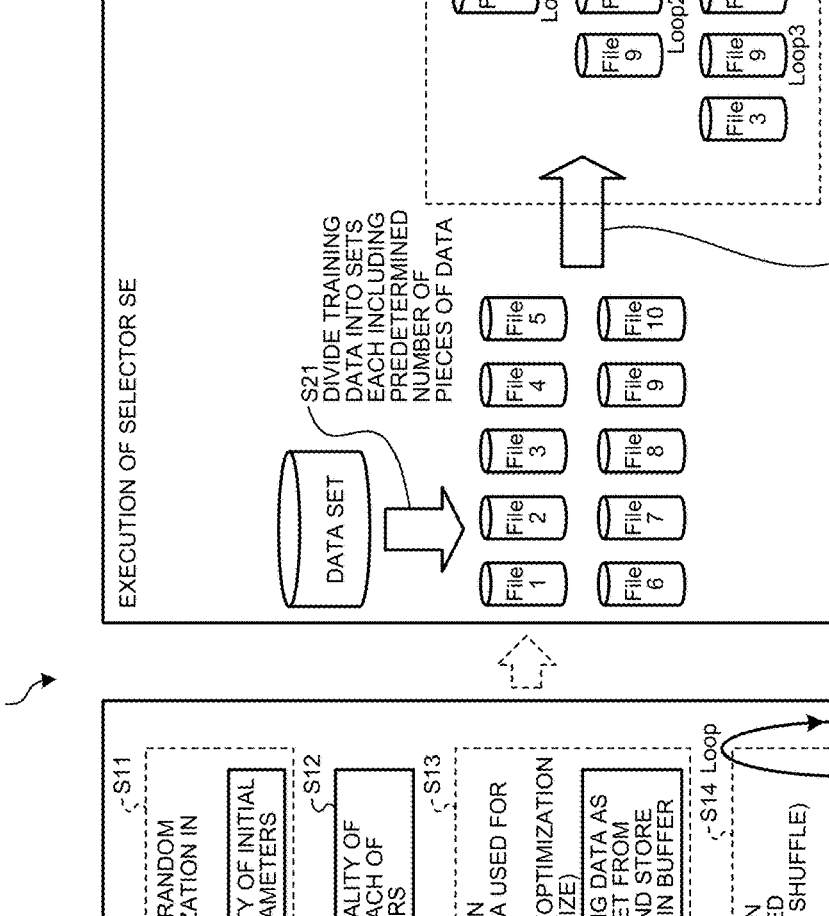
FIG. 3 is a diagram illustrating an overall picture of processes executed by an information processing device according to the embodiment.

From here, an example of the process executed by the information processing device 100 will be described with reference to FIG. 3. FIG. 3 is a diagram illustrating an overall picture of processes executed by the information processing device 100 according to the embodiment. For example, in the actual application of a model, there are motivations such as a desire to reduce the model size as much as possible, reducing unnecessary calculations to achieve a higher inference speed. Therefore, FIG. 3 illustrates a scene for optimizing the calculation graph so as to improve the size of the model and the performance in a serving environment when providing (serving) inference by the model as an API. A calculation graph is an expression of arithmetic processing using a directed graph, in which vertices (nodes) of the graph represent arithmetic content to be executed and the sides (edges) thereof represent the input/output of each of nodes. In this regard, the model is defined as, for example, a graph of tensor calculation.

Furthermore, according to the above, the information processing device 100 tunes the model so as to be able to serve a higher-performance model by optimizing the training methods. Therefore, FIG. 3 illustrates an algorithm of a series of tuning (fine tuning according to the embodiment) including various types of optimizations according to the embodiment.

Furthermore, as illustrated in FIG. 3, the fine tuning according to the embodiment is divided into processes: an optimization process of optimizing the training methods: and a tuning process of performing further fine tuning for the service by altering a part of the trained model obtained in the optimization process and retraining the model. The optimization process is executed by an optimization function (referred to as an "optimizer OP") included in the information processing device 100, for example. Furthermore, the tuning process is executed by a data selecting function (referred to as a "selector SE") of the information processing device 100.

First, the information processing device 100 generates a plurality of initial values of model parameters (for example, weights and biases) based on random numbers (pseudo-random numbers) (step S11). At this time, the information processing device 100 controls so that the model parameters are to be initialized more appropriately by executing the first optimization that optimizes the seed for obtaining the random number (that is, the random number seed). Furthermore, in this regard, the first optimization is to optimize the random number seed in the calculation graph.

In deep learning, initial values of model parameters are determined based on pseudo-random numbers, and the model is trained to learn the features of the learning data. As a result of such processes, the values of the model parameters gradually change (converge) to the values corresponding to the features of the learning data. Therefore, when the initial value of the model parameter deviates greatly from the value corresponding to the features of the learning data, the learning time will be long and the learning rate will be low. From this point of view, it is conceivable to generate a plurality of models having different initial values and adopt the model with the highest accuracy among the generated models as the learning result.

On the other hand, the relationship between the model parameter and the accuracy achieved by the set of model parameters are estimated to be a relationship that is substantially continuous, in which the closer the model parameter to the optimum value, the higher the accuracy, rather than a relationship in which the accuracy changes intermittently for each of model parameters, in consideration of the structure of the model. Furthermore, when the initial value of the model parameter is not the optimum value corresponding to the learning data but is close to the local minimum, the model parameter would stay at the local minimum, leading to a failure in accuracy improvement. Therefore, when generating a plurality of models having different initial values, it is considered to be desirable to generate an initial value group of model parameters having a certain width (that is, distribution).

In view of this, the information processing device 100 executes a first optimization so as to enable generation of a plurality of models in which a set of model parameters has a predetermined distribution. For example, when generating model parameters of each of models, the information processing device 100 generates the model parameters by using a predetermined random function from a predetermined initial value. Such a random function allows various settings including: types of distribution of random numbers to be generated such as a random number having a uniform distribution or a random number having a normal distribution, mean values of the random number to be generated from the input seed value, a range of random numbers to be generated, or the like. Accordingly, the information processing device 100 optimizes the random number seed value such as the seed value input to the random function and various settings.

More specifically, the information processing device 100 sets a plurality of random number seeds that satisfies a predetermined distribution by the first optimization. The information processing device 100 then inputs each of the set random number seeds into the random function to generate a random number corresponding to the random number seed, for each of the random number seeds. In addition, the random numbers generated by this operation will have a predetermined distribution. Therefore, the information processing device 100 can generate an initial value group of model parameters having a predetermined distribution in step S11 by using such random numbers.

Next, the information processing device 100 generates a model for each of initial values of the model parameter generated in step S11 (step S12). Specifically, the information processing device 100 generates a model having a set of model parameters for each of the sets of model parameters having a different combination from the initial value group of model parameters that fall within a predetermined distribution.

Next, the information processing device 100 randomly extracts data for the iterative learning for the current time (that is, the training data as a learning target) from the training data, and stores the extracted data in a buffer. When the learning of the features of the data stored in the buffer is completed, the information providing device 10 controls to extract new data and store the data in the buffer, and executes learning of the data stored in the buffer so as to implement iterative learning following the shuffle (step S13).

Here, when the learning data set is divided into several subsets, the best performance model is not always trained when all the subsets are used for training the model. On the other hand, when the model is trained by the iterative learning described above, it is considered that the accuracy of the model can be further improved by optimizing the combination of data included in one subset. Therefore, when performing step S13, the information processing device 100 executes the second optimization of optimizing the training data so as to determine which training data among the data set is to be used for the actual learning, and executes the third optimization of optimizing the buffer size in which shuffle is performed. In this manner, the second optimization is to optimize the data used for learning. The third optimization is to optimize the shuffle buffer size.

For example, the information processing device 100 performs the second optimization and the third optimization in step S13, thereby generating the training data (training data in accordance with the optimized buffer size) of the learning target, which is the training data used in the current iterative learning, and storing the generated training data in the buffer.

Furthermore, the information processing device 100 trains each of models generated in step S12 to learn the features of the training data stored in the buffer in step S13 (step S14).

For example, when training the model to learn the features of the training data as a learning target stored in the buffer one by one in order, the information processing device 100 shuffles the learning order (order of the training data) in the buffer. Specifically, the information processing device 100 shuffles the learning order in a random order for each of epochs.

Here, while sufficient data shuffle is considered to be important in order to train the model, simply shuffling data would cause a bias in the learning order or the data distribution for each of batches, leading to unsuccessful learning. For example, when training a model, features of the training data are to be sequentially learned, such as first training a model (correcting model parameters) using certain training data and thereafter training the model using different training data. Therefore, when the training data is time series data, it is considered that the time series of the training data will preferably be dispersed to some extent in order to achieve wide and comprehensive learning of the features of the training data. On the other hand, an existence of a large gap in time series of training data continuously input to the model might increase the correction range of the model parameters, leading to a failure in proper learning. In other words, when training the model to learn the features of the time series training data, while there is a need to use the learning data sequentially so as to have a variation in the time series to some extent in order to learn the features that are not bound by the time series, excessive variation in time series might lead to a failure in appropriately training the model. In such cases, the accuracy of the model cannot be improved.

To handle this, the information processing device 100 performs optimization of seed values for generating a random order so as to prevent occurrence of bias in the random order between the epochs (so as to achieve uniform distribution) in execution of step S14. Specifically, the information processing device 100 executes the fourth optimization of optimizing seeds for random order generation (that is, random number seeds) so as to generate an optimum random order that suppresses learning of specific training data in the same order each time. From this, the fourth optimization is defined as optimization of the random number seed in the data shuffle.

For example, as the fourth optimization, the information processing device 100 generates a random number seed in the current learning so that the random order associated with each training data is not to be biased between the epochs. The information processing device 100 then generates a random order by inputting each of generated random number seeds into the random function. Furthermore, by associating the generated random order with the training data of each of targets of learning, the information processing device 100 generates, in the buffer, final learning data as the learning target. As a result, in actual learning, learning is performed for each of sets of models and the training data, which is obtained by combining a model having each model parameter generated so as to have a predetermined distribution by the first optimization, and the training data having random order decided by the fourth optimization.

Subsequently, the information processing device 100 trains each of models to learn the features of the final learning data as a learning target in the generated random order. Specifically, when the learning of the features of the training data as a learning target is completed in the generated random order (when one epoch is completed), the information processing device 100 generates a random order again, and proceeds to the next epoch of training each of the models to learn the features of the training data in the generated random order. In this manner, the information processing device 100 repeats a loop of iterative learning by the designated number of epochs.

When the loop of the iterative learning by the designated number of epochs ends, the buffer will be emptied. Therefore, the information processing device 100 stores the unprocessed learning data among the learning data as a learning target obtained in step S13, in an empty buffer, further repeats step S14 onto the stored learning data as a learning target so as to achieve the learning of all the training data as a learning target obtained in step S13.

A detailed example of the second to fourth optimizations and a detailed example of iterative learning in steps S13 and S14 will be described below.

Furthermore, here, in the actual learning in step S14, a trial to search the hyperparameters is repeated. In this trial, the information processing device 100 executes the fifth optimization as the optimization of the trial by pruning so as to achieve an efficient search. In this regard, the fifth optimization is an optimization for an early stopping in which trials that are not expected to produce good results are stopped in an early stage without being performed to the end.

For example, the information processing device 100 allows the user to designate a constraint condition that conditions a trial that is a target of early stopping (a target to be stopped early) from the viewpoint of an evaluation value that evaluates the accuracy of the model. The information processing device 100 monitors whether the constraint condition is satisfied for each of trials. When it is determined that the constraint condition is satisfied, the information processing device 100 terminates the trial and continues the remaining trials alone. In other words, the information processing device 100 selects only trials in which the evaluation value that evaluates the accuracy of the model satisfies a predetermined condition (for example, the reverse of the constraint condition) (that is, trials not selected are subject to pruning), and continues learning on the trials that have been selected. A detailed example of the fifth optimization will be described below.

Furthermore, the information processing device 100 selects the best model from the generated models based on the accuracy of each of models trained in the learning process to which the optimization process is applied (step S15). For example, the information processing device 100 calculates the accuracy of each of models using evaluation data, and calculates an evaluation value such that the higher the variation in accuracy (the amount of improvement in accuracy), the higher the evaluation value. The information processing device 100 then selects the model for which the highest evaluation value is calculated as the best model.

Hereinabove, the training method that applies the optimization process of the optimizer OP has been described. Hereinafter, a tuning process performed by a selector SE will be described.

For example, the information processing device 100 performs a tuning process of fine tuning a best model by changing a part of the best model and re-training it by executing the selector SE. The information processing device 100 can use the training data used in the learning process to which the optimization process is applied, also in the tuning process as a grouped data set.

Figure 4:
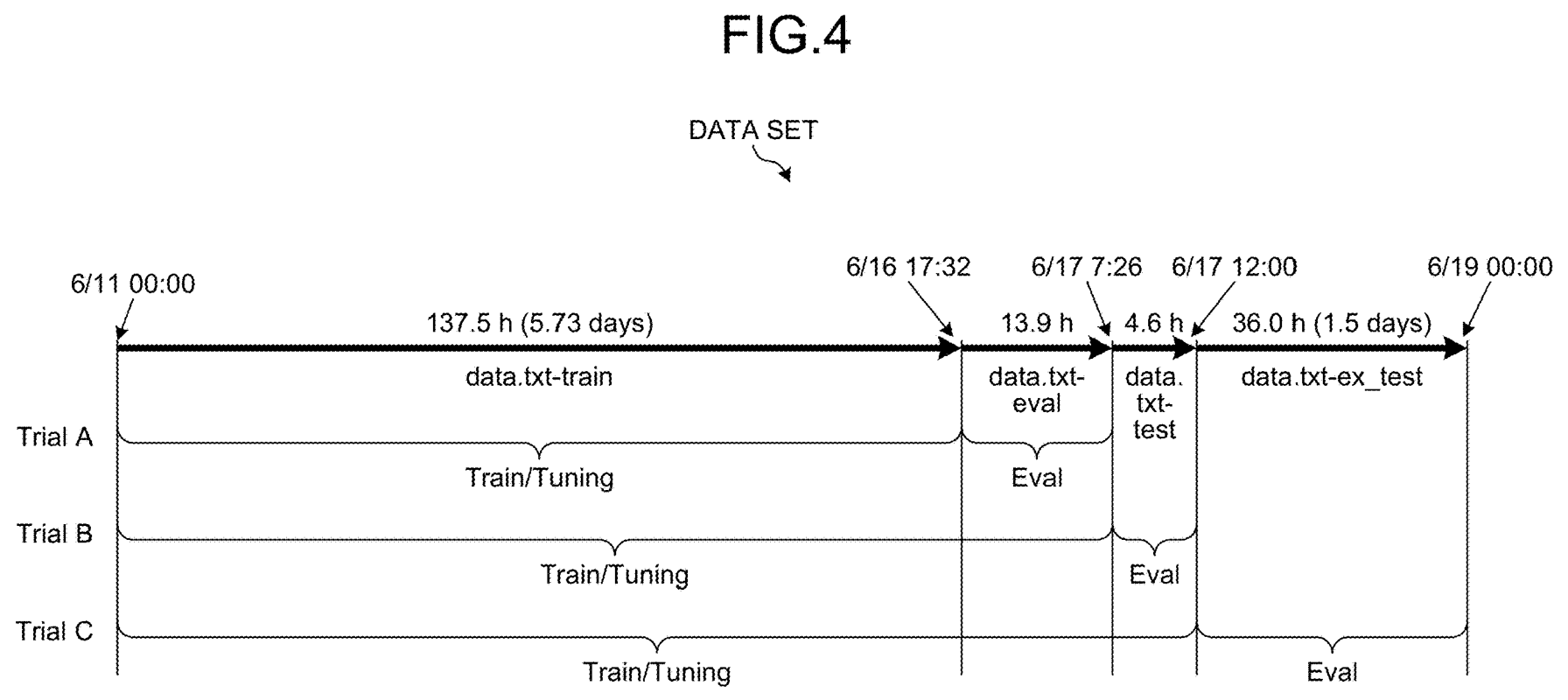

Here, the above data set is divided as illustrated in FIG. 4 for each of applications so that the tuning results (best model accuracy) can be evaluated effectively by defining each of tuning processes when training data having different ranges (time range according to time series) is used, as one trial, in the above data sets. FIG. 4 is a diagram illustrating an example of division for each of trials when the data set is divided for each of applications.

The data contained in the data set corresponds to a purchase history of purchasing a product using a predetermined service (for example, a predetermined shopping service), and has a time-series concept. Accordingly, the data contained in the data set are arranged in chronological order. According to the example in FIG. 4, the data set has a time range from "June 11th 0:00" to "June 19th 0:00", in which pieces of data from the oldest data (purchase history at June 11th 0:00) to latest data (purchase history at June 19th 0:00) are arranged in chronological order.

In addition, in this data set, as illustrated in the example of FIG. 4, the data from "June 11th 0:00" to "June 16th 17:32" is assigned as the training data for tuning for trial A. This example indicates that the process of tuning the best model using the data from "June 11th 0:00" to "June 16th 17:32" as training data is defined as trial A.

In the example of FIG. 4, the data from "June 16th 17:32" to "June 17th 7:26" are assigned as evaluation data for trial A. This example is an example of determination that the best model after tuning performed in trial A will be evaluated by using the data from "June 16th 17:32" to "June 17th 7:26".

In addition, in the example illustrated in FIG. 4, the data from "June 17th 7:26" to "June 19th 0:00" is assigned as test data for trial A. This example illustrates an example of determination that the best model after tuning performed in trial A would be evaluated by using the data from "June 17th 7:26" to "June 19th 0:00" as testing data with an unknown label.

In the example illustrated in FIG. 4, the data from "June 11th 0:00" to "June 17th 7:26" is assigned as the training data for tuning for trial B. This example indicates that the process of tuning the best model using the data from "June 11th 0:00" to "June 17th 7:26" as training data is defined as trial B.

In addition, in the example of FIG. 4, the data from "June 17th 7:26" to "June 17th 12:00" is assigned as evaluation data for trial B. This example is an example of determination that the best model after tuning performed in trial B will be evaluated by using the data from "June 17th 7:26" to "June 17th 12:00".

In addition, in the example illustrated in FIG. 4, the data from "June 17th 12:00" to "June 19th 0:00" is assigned as test data for trial B. This example is an example of determination that the best model after tuning performed in trial B would be evaluated by using the data from "June 17th 12:00" to "June 19th 0:00" as testing data with an unknown label.

In addition, in the example illustrated in FIG. 4, the data from "June 11th 0:00" to "June 17th 12:00" is assigned as the training data for tuning for trial C. This example indicates that the process of tuning the best model using the data from "June 11th 0:00" to "June 17th 12:00" as training data is defined as trial C.

In addition, in the example of FIG. 4, the data from "June 17th 12:00" to "June 19th 0:00" is assigned as evaluation data for trial C. This example is an example of determination that the best model after tuning performed in trial C will be evaluated by using the data from "June 17th 12:00" to "June 19th 0:00".

The assignment illustrated in FIG. 4 is an example. For example, what type of data is defined as training data, what type of data is defined as evaluation data, and what type of data is defined as testing data may be appropriately set out of the data sets according to the tuning process and may be appropriately changed according to the convenience of an administrator of the model.

Returning to FIG. 3, the information processing device 100 uses the training data illustrated in FIG. 4 to perform the tuning process by iterative learning described below for the best model, and repeats evaluation using the evaluation data and the testing data illustrated in FIG. 4. Furthermore, the information processing device 100 performs such a series of processes for each of trials. Furthermore, since the series of processes is identical regardless of the trial, an example of the series of processes will be described below for trial A.

For example, the information processing device 100 divides the training data into a set formed with a predetermined number of pieces of data (step S21). The learning data for each of sets is managed in a file corresponding to the set, for example. For example, although the information processing device 100 can divide the training data into several hundred sets (for example, 500 sets), FIG. 3 illustrates an example in which the training data is divided into 10 sets for simplification of explanation. Specifically, FIG. 3 illustrates File "1" to File "10" as an example of the 10 sets. In addition, a predetermined number of pieces of training data is stored in each of the files.

In such a state, the information processing device 100 randomly selects one set from individual sets obtained by dividing the data and adds the one set to a learning data list (step S22). Every time of adding the set, the information processing device 100 trains the best model to learn the features of the training data in the set that has been added this time (step S23). For example, the information processing device 100 performs training using only one epoch of the training data in the set that has been added this time. Subsequently, the information processing device 100 repeats a series of processes of evaluating the accuracy of the trained best model using the evaluation data and the testing data (step S24).

In this regard, the example of FIG. 3 illustrates an example in which the information processing device 100 selects File "6" in the first step S22 and adds the selected File "6" to the learning data list. Furthermore, the example illustrates an example in which the information processing device 100 trains, in the first step S23, the best model to learn the features of the training data included in File "6" which is a set that has been added this time. Furthermore, the example illustrates an example in which the information processing device 100 has evaluated, in first step S24, the best model that has learned the features of the training data included in File "6" by using the evaluation data and the testing data.

Furthermore, the example of FIG. 3 illustrates an example in which the information processing device 100 further selects File "9" in the second step S22 and adds the selected File "9" to the learning data list. Furthermore, the example illustrates an example in which the information processing device 100 trains, in the second step S23, the best model to learn the features of the training data included in File "9" which is a set that has been added this time. In addition, the example illustrates an example in which the information processing device 100 has evaluated, in second step S24, the best model that has learned the features of the training data included in File "6" and File "9" so far by using the evaluation data and the testing data.

Furthermore, the example of FIG. 3 illustrates an example in which the information processing device 100 further selects File "3" in the third step S22 and adds the selected File "3" to the learning data list. Furthermore, the example illustrates an example in which the information processing device 100 trains, in the third step S23, the best model to learn the features of the training data included in File "3" which is a set that has been added this time. In addition, the example illustrates an example in which the information processing device 100 has evaluated, in third step S24, the best model that has learned the features of the training data included in Files "6", "9" and "3" so far by using the evaluation data and the testing data.

More specifically regarding the loop from steps S22 to S24, the information processing device 100 randomly selects one data file from the training data, adds the selected data file to the learning data list of Model Config, and then trains the best model using one epoch of the training data contained in the added data file.

In addition, the information processing device 100 randomly selects one new data file for each of Model Config files judged to be in the top 5 based on the evaluation results so far, and adds the selected data file in the learning data list of Model Config. Subsequently, the information processing device 100 trains the best model using one epoch of training data included in the learning data list in which one data file has been increased.

Furthermore, the information processing device 100 continues the loop from steps S22 to S24 until it is determined that the performance (accuracy) of the best model would not be further improved based on the evaluation result.

In addition, the information processing device 100 can process the best model with the maximum improved performance as a serving target. For example, the information processing device 100 provides the best model whose performance has been improved by fine tuning according to the embodiment in response to an access from the user. Such an information processing device 100 would eliminate the necessity for the user to spend time and effort to improve the model, enabling focusing on adjustment of the data input to the model.

6. Configuration of Information Processing Device

Figure 5:
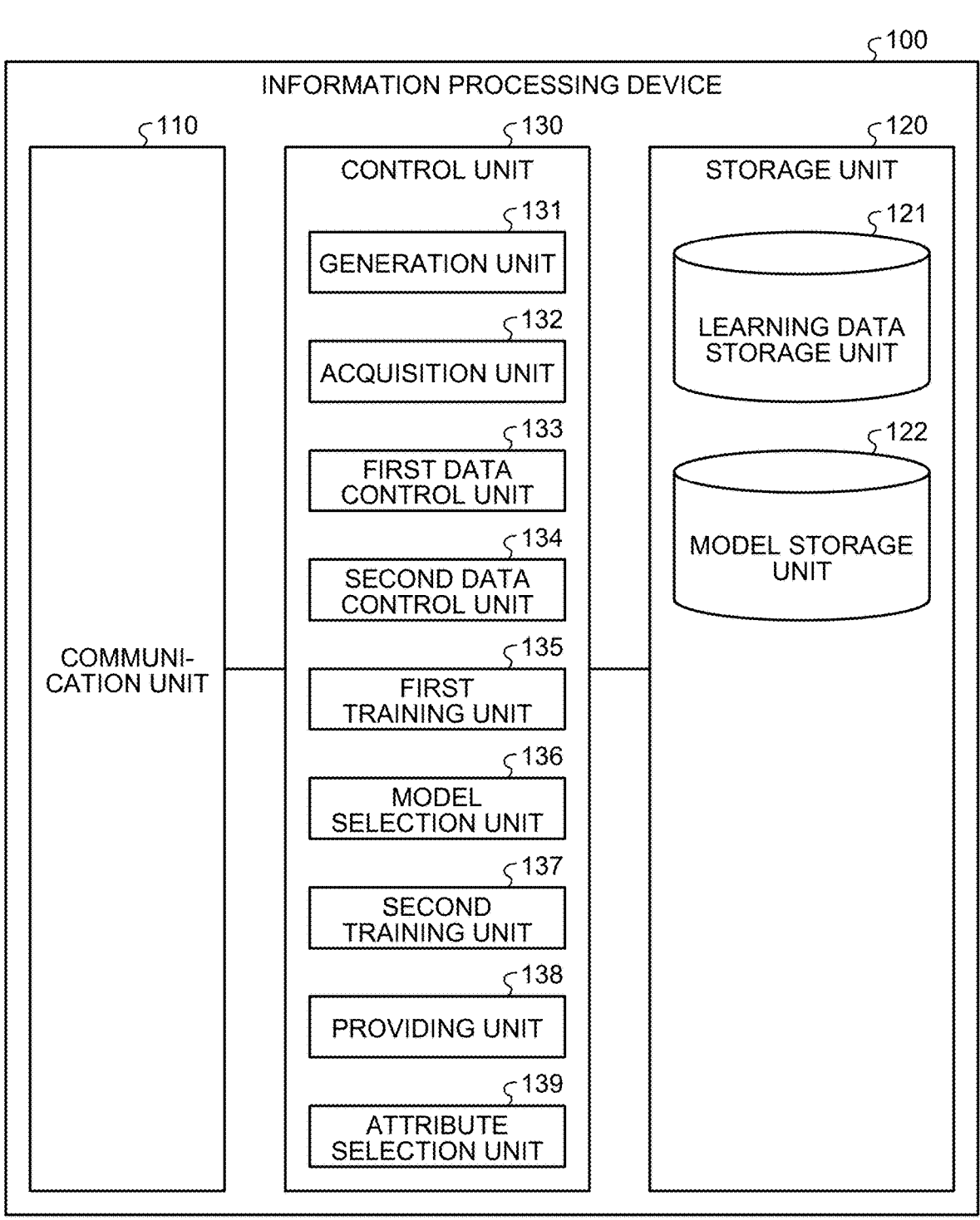
FIG. 5 is a diagram illustrating a configuration example of the information processing device according to the embodiment.

Next, the information processing device 100 according to the embodiment will be described with reference to FIG. 5. FIG. 5 is a diagram illustrating a configuration example of the information processing device 100 according to the embodiment. As illustrated in FIG. 5, the information processing device 100 includes a communication unit 110, a storage unit 120, and a control unit 130.

(Communication Unit 110)

The communication unit 110 is actualized by, for example, a network interface card (NIC), or the like. The communication unit 110 is connected to the network N by wired or wireless connection, and transmits/receives information to/from, for example, the model generation server 2, the terminal device 3, the information providing device 10, and the execution control apparatus 200.

(Storage Unit 120)

The storage unit 120 is actualized by a semiconductor memory element such as random access memory (RAM) or flash memory, or by a storage device such as a hard disk or an optical disk. The storage unit 120 has a learning data storage unit 121 and a model storage unit 122.

(Learning Data Storage Unit 121)

The learning data storage unit 121 stores various types of data related to learning. For example, the learning data storage unit 121 stores learning data in a state of being divided into training data, evaluation data, and testing data.

For example, the information processing device 100 divides all the learning data into training data, evaluation data, and testing data, and registers these pieces of data obtained by the division in the learning data storage unit 121. For example, the information processing device 100 can divide all the learning data by using an arbitrary method. For example, the information processing device 100 can divide all the training data by using the Hold-out method, the Cross Validation method, the Leave One-out method, or the like.

Figure 6:
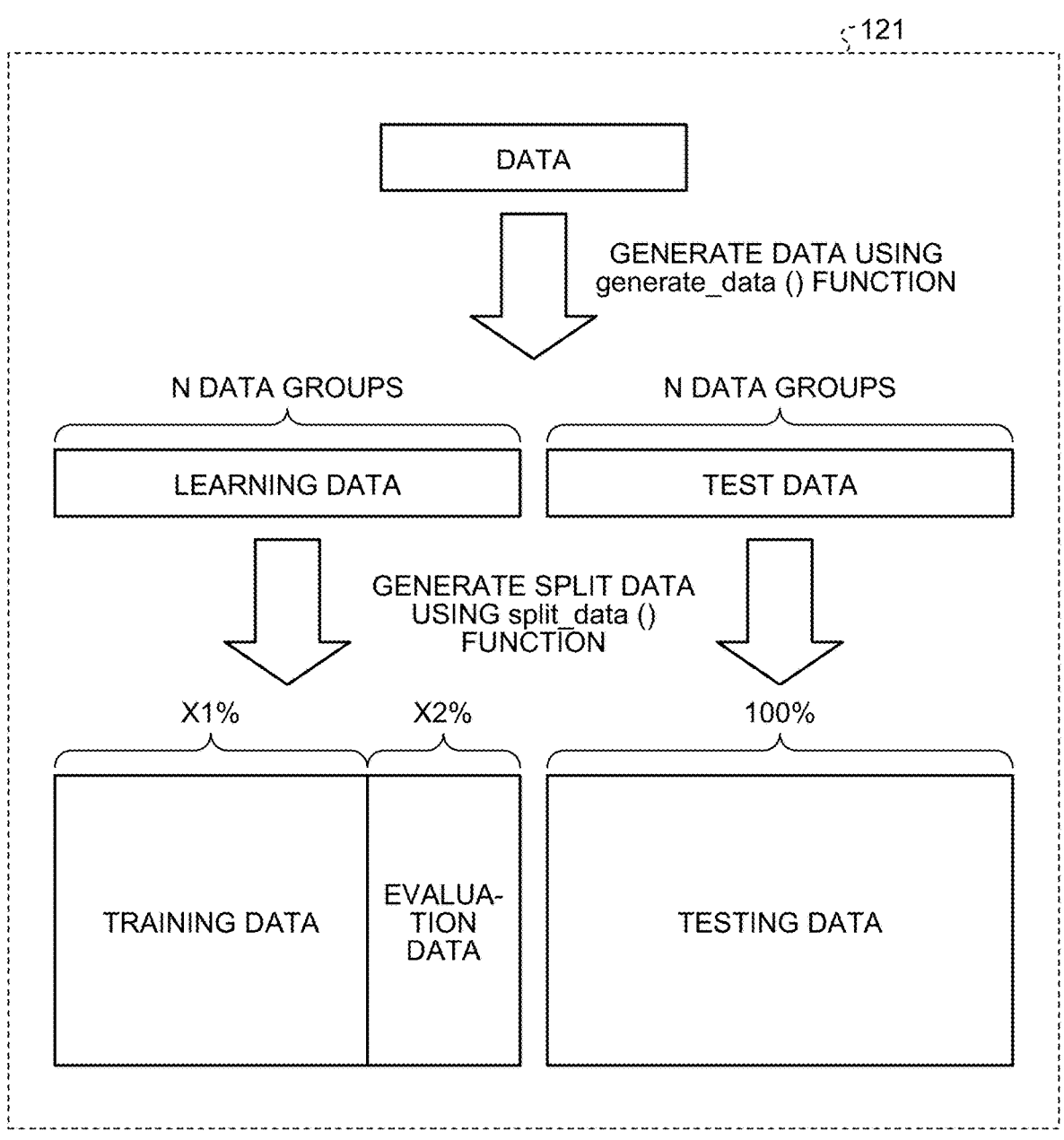
FIG. 6 is a diagram conceptually illustrating the division of a data set.

Here, FIG. 6 is used to illustrate an example of dividing the learning data. FIG. 6 is a diagram conceptually illustrating the division of a data set. As illustrated in FIG. 6, using a generate_data ( ) function, the information processing device 100 generates learning data including N data groups and test data including N data groups, from a data set (data).

Furthermore, in such a state, the information processing device 100 uses a split_data ( ) function to divide the learning data including N data groups into training data and evaluation data. For example, the information processing device 100 divides the learning data so that the training data and the evaluation data can be obtained at a ratio of "N1:N2" (actually, 7:3, etc.). Furthermore, the information processing device 100 defines all of the test data including N data groups as testing data.

Furthermore, the information processing device 100 registers the training data, the evaluation data, and the testing data obtained in this manner in the learning data storage unit 121.

(Model Storage Unit 122)

The model storage unit 122 stores information related to the model. For example, the model storage unit 122 saves the model updated for each epoch in a checkpoint file format. For example, the information processing device 100 saves parameters in the middle of learning at regular intervals in the model storage unit 122 and generates checkpoints.

(Control Unit 130)

The control unit 130 is actualized by execution of various programs stored in the storage device inside the information processing device 100 by a central processing unit (CPU), a micro processing unit (MPU), or the like, by using RAM as a work area. Furthermore, the control unit 130 is actualized by an integrated circuit such as an application specific integrated circuit (ASIC) or a field programmable gate array (FPGA), for example.

As illustrated in FIG. 3, the control unit 130 includes a generation unit 131, an acquisition unit 132, a first data control unit 133, a second data control unit 134, a first training unit 135, a model selection unit 136, a second training unit 137, a providing unit 138, and an attribute selection unit 139, so as to implement or execute the functions and actions of information processing described below. The internal configuration of the control unit 130 is not limited to the configuration illustrated in FIG. 5, and may be any other configuration as long as it performs information processing described below. Furthermore, the connection relationship of each processing unit included in the control unit 130 is not limited to the connection relationship illustrated in FIG. 5, and may be another connection relationship.

(Generation Unit 131)

The generation unit 131 is a processing unit that performs the processes of steps S11 and S12 described with reference to FIG. 3. Accordingly, the generation unit 131 performs the processes of steps S11 and S12 by using the first optimization algorithm.

Specifically, the generation unit 131 generates a plurality of models having different parameters. For example, the generation unit 131 generates a plurality of input values (random number seeds) to be input to a predetermined first function that calculates a random number value based on the input value, and generates, for each of the generated input values, a plurality of models having parameters (for example, weights and biases) corresponding to the random number values (pseudo-random numbers) output from the predetermined first function when the input values have been input.

In this regard, the generation unit 131 generates, as input values to be input to the predetermined first function, a plurality of input values such that the random number value output by the predetermined first function satisfies a predetermined condition. For example, the generation unit 131 generates a plurality of input values such that the random number value falls within a predetermined range. Furthermore, for example, the generation unit 131 generates a plurality of input values such that the distribution of random number values has a predetermined probability distribution.

Furthermore, for example, the generation unit 131 generates a plurality of input values such that a mean value of the random number values becomes a predetermined value. Here, an input value is a parameter input to a random function (an example of a predetermined first function), and corresponds to a random number seed.

For example, the generation unit 131 selects, as a predetermined first function, a function in which the distribution of the random number values output when the input value has been input indicates a predetermined probability distribution (for example, uniform distribution) and generates a plurality of models having parameters corresponding to the random number value output from the selected function.

In addition, the generation unit 131 can register each of the generated models in the model storage unit 122.
(Acquisition Unit 132)

The acquisition unit 132 acquires various types of information and passes the acquired information to an optimum processing unit. For example, the acquisition unit 132 acquires training data from the learning data storage unit 121 when optimization or learning is performed using the training data. The acquisition unit 132 then outputs the acquired training data to a processing unit that performs optimization or learning.
(First Data Control Unit 133)

The first data control unit 133 optimizes data used for learning by using the second optimization algorithm when the process of step S13 described with reference to FIG. 3 is performed.

Specifically, the first data control unit 133 divides predetermined learning data (training data) used for training a model to learn the features into a plurality of sets in chronological order. For example, the first data control unit 133 divides the training data into a set having a predetermined number of pieces of data.

In addition, the first data control unit 133 selects sets actually used for training the model from the sets obtained by dividing the training data into the plurality of sets in chronological order. For example, the first data control unit 133 selects sets in which the training data included is newer in time series, from among the sets obtained by dividing the training data into the plurality of sets in chronological order.

The first data control unit 133 may randomly select a set to be used for training the model from among the sets obtained by dividing the training data into the plurality of sets in chronological order.

Furthermore, the first data control unit 133 may select a set having the number designated by the user from among the sets obtained by dividing the training data into the plurality of sets in chronological order. For example, the first data control unit 133 selects, in chronological order, sets in which the training data included is newer in time series, from among the sets obtained by dividing the training data into the plurality of sets in chronological order until the number of selected sets reaches a number designated by the user.

In addition, the first data control unit 133 generates one data group by connecting the selected sets. For example, the first data control unit 133 generates one data group by connecting them in order of selection. Furthermore, the first data control unit 133 can pass the generated data group to the second data control unit 134, for example, so that the generated data group can be used for training the model.
(Second Data Control Unit 134)

The second data control unit 134 optimizes the shuffle buffer size by using the third optimization algorithm when the process of step S13 described with reference to FIG. 3 is performed. For example, the second data control unit 134 generates training data having a size equal to the size of the shuffle buffer as optimization of the shuffle buffer size, and stores the generated data into the shuffle buffer as training data as a learning target which is the training data used in the current iterative learning.

For example, the second data control unit 134 divides the data group generated by the first data control unit 133 into a plurality of sets each including training data having a size equal to the size of the shuffle buffer.

For example, the second data control unit 134 divides the data group generated by the first data control unit 133 into a plurality of sets in chronological order. For example, the second data control unit 134 divides the data group generated by the first data control unit 133 into a set having a number of pieces of training data designated by the user. Furthermore, for example, the second data control unit 134 may divide the learning data groups generated by the first data control unit 133 into a plurality of sets so that the number of pieces of training data included falls within a range designated by the user.

In addition, the second data control unit 134 stores one set corresponding to the time series of the included training data among the sets obtained by the division into the shuffle buffer as training data as a learning target which is the training data to be used in the current iterative learning. Specifically, the second data control unit 134 stores, in the shuffle buffer, the set with the oldest time series of the included training data among the sets obtained by the division, as the training data as a learning target.
(First Training Unit 135)

The first training unit 135 trains each of the plurality of models generated by the generation unit 131 to learn the features of a part of the predetermined learning data.

For example, the first training unit 135 trains each of the plurality of models generated by the generation unit 131 to learn the features of the training data (training data as a learning target) stored in a buffer (shuffle buffer) by the second data control unit 134. Accordingly, for example, the first training unit 135 trains the model to learn the features of the training data included in each of sets by using the sets in order from the set in which the learning data included is older in time series, among the sets selected by the first data control unit 133.

Furthermore, for example, the first training unit 135 trains the model to learn the features of the training data (training data as learning target) included in the set in a predetermined order for each of sets obtained by the division by the second data control unit 134. For example, the first training unit 135 trains the model to learn the features of the training data included in the set in order from the set according to the time series among the sets obtained by the division by the second data control unit 134. As an example, in the first training unit 135 trains the model to learn the features of the training data included in the set in order from the oldest time series of the included training data, among the sets obtained by the division by the second data control unit 134.

Furthermore, the first training unit 135 may train the model to learn the features of the training data included in the set in a random order for each of sets obtained by division by the second data control unit 134.

Here, when training each of the models to learn the features of the training data as described above, the first training unit 135 shuffles the learning order for each of pieces of the training data stored in the shuffle buffer at a current point. The first training unit 135 then associates the learning order obtained by shuffling with the training data to generate final training data for as the learning target. Subsequently, the first training unit 135 trains the model to learn the training data as the learning target one by one in the order of learning obtained by the shuffling. Furthermore, the first training unit 135 defines this series of processes related to the shuffle as one epoch, and repeats this series of processes for a designated number of epochs, for example. The first training unit 135 can generate the final training data as a learning target each time by shuffling the learning order every time the epoch is updated.

For example, the first training unit 135 uses the fourth optimization algorithm to perform data shuffle optimization of shuffling the training data in the shuffle buffer.

For example, using the fourth optimization algorithm, the first training unit 135 generates a random number seed in the current epoch for each of epochs for iterative learning so as to prevent occurrence of a bias in the random order associated with each of pieces of the training data between the epochs. The first training unit 135 then inputs the individual generated random number seeds into the random function to generate a random order. Furthermore, by associating the generated random order with each of pieces of the training data as a learning target, the first training unit 135 generates, in the shuffle buffer, final learning data as a learning target.

Subsequently, the first training unit 135 trains each of models to learn the features of the final training data as the learning target in the generated random order. Specifically, when the learning of the features of the training data as a learning target is completed in the generated random order (when one epoch is completed), the first training unit 135 generates a random order again, and proceeds to the next epoch of training each of the models to learn the features of the training data in the generated random order.

In addition, in the actual learning process in which each model learns the features of the training data within the shuffle buffer size, trials for searching hyperparameters are repeated. At this time, in order to achieve an efficient search, the first training unit 135 performs the fifth optimization related to the early stopping in which the trial that is not expected to have a good result is to be terminated (pruned) without continuing the trial to the end.

According to the fifth optimization, the first training unit 135 performs the following process for each of the plurality of models generated by the generation unit 131. For example, a trial is a search for the optimum combination from hyperparameter combinations by applying the hyperparameter combination to the model and repeating learning for each of the hyperparameter combinations. That is, a trial is execution of optimization regarding the set of hyperparameters.

Accordingly, among the trials (trials with different hyperparameter combinations), the first training unit 135 selects a plurality of trials in which an evaluation value for evaluating the accuracy of the model in the hyperparameter combination corresponding to the trial satisfies a predetermined condition. The first training unit 135 then continues to train the model in the selected trial to learn the features of the training data as the learning target.

For example, the first training unit 135 selects a plurality of trials in which the mode based on the change in the evaluation value satisfies a predetermined mode. For example, the first training unit 135 selects a plurality of trials in which the mode based on the change in the evaluation value during iterative learning of the features of the training data as a learning target a predetermined number of times satisfies a predetermined mode. For example, the first training unit 135 selects a trial that satisfies a plurality of conditions designated by the user.

On the other hand, the first training unit 135 stops processing (performs pruning) on the trial in which the evaluation value for evaluating the accuracy of the model in the hyperparameter combination corresponding to the trial does not satisfy the predetermined condition, among individual trials (trials with different hyperparameter combinations), and stops continuation of the trial.

Furthermore, for example, the first training unit 135 can selects any of the models according to the accuracy of the trained model for each of combinations of the trials having different parameter combinations and the training data as a learning target.

(Model Selection Unit 136)

Based on the accuracy of each of the plurality of models generated by the generation unit 131, the model selection unit 136 selects the model (best model) evaluated to have the highest accuracy from the plurality of models. For example, the model selection unit 136 selects the best model among the plurality of models based on the accuracy of each of the models generated by the generation unit 131, being the models trained by the learning process to which the optimization process is applied. For example, the model selection unit 136 calculates the accuracy of each of models using evaluation data, and calculates an evaluation value such that the higher the variation in accuracy (the amount of improvement in accuracy), the higher the evaluation value. The model selection unit 136 then selects the model for which the highest evaluation value is calculated as the best model.

In addition, the model selection unit 136 may select one of the models according to the accuracy of the model trained by the first training unit 135 for each of combinations of the model having different parameters and the training data. Furthermore, while the above example describes a case where the first training unit 135 selects the trial using the fifth optimization algorithm, the model selection unit 136 may select the trial using the fifth optimization algorithm.

(Second Training Unit 137)

The second training unit 137 performs the tuning process described in steps S21 to S24 of FIG. 3, for example. Specifically, the second training unit 137 trains the model (best model) selected by the model selection unit 136 to learn the training data used in the optimization process. Accordingly, by using the training data used in the optimization process, the second training unit 137 performs a tuning process of fine tuning the model for better serviceability by re-training, with a partial modification, the model (best model) selected by the model selection unit 136.

(Providing Unit 138)

The providing unit 138 processes the best model whose performance has been improved to the maximum by the second training unit 137, as a serving target. Specifically, the providing unit 138 provides the best model whose performance has been improved by fine tuning according to the embodiment in response to access from the user.

(Attribute Selection Unit 139)

When predicting a target (for example, click through rate for advertising content) using a trained model, there are cases where data having a specific attribute (for example, category) among the data to be input for prediction is not input (that is, masked) while only the remaining data is input, will achieve more accurate results compared to the case where all data are input.

Therefore, it is considered to be possible to improve the accuracy of the model by performing optimization of the data that should be input to the trained model by determining the attribute of data, that is, determining the data with a certain attribute not to be input to the trained model, out of the candidate data for input. Therefore, the attribute selection unit 139 selects a target attribute which is the attribute as non-input target data, that is, which of the data having a certain attribute is not to be input to the model, among the input candidate data that has a possibility of being input to the model (best model, for example) trained by the training unit (for example, the first training unit 135). For example, the attribute selection unit 139 selects a combination of target attributes.

For example, the attribute selection unit 139 measures the accuracy of the model when inputting training data having attributes other than the target attribute among the candidates of the combination of the target attributes into the model for each of the candidates, and selects a combination of target attributes from the candidates based on a measurement result.

The providing unit 138 may also provide the user with information indicating attributes other than the target attribute selected by the attribute selection unit 139. For example, the providing unit 138 provides information related to the accuracy of the model when inputting training data having attributes other than the target attribute selected by the attribute selection unit 139 into the model, as information indicating attributes other than the target attribute selected by the attribute selection unit 139.

7. Example of Optimization Process According to Embodiment

Hereinafter, an example of each of the optimization algorithms according to the embodiment, namely the first optimization algorithm, the second optimization algorithm, the third optimization algorithm, the fourth optimization algorithm, and the fifth optimization algorithm, will be described.

Although the example of FIG. 3 illustrates the first optimization algorithm to the fifth optimization algorithm continuously executed in a series of learning processes, the first optimization algorithm to the fifth optimization algorithm may be executed independently, or may be executed in combination in any manner. For example, it is allowable to take a configuration in which only the first optimization algorithm is executed in the learning process as illustrated in FIG. 3 or take a configuration in which only the second and third algorithms are executed.

[7-1-1. First Optimization Algorithm]

In deep learning, the optimum model parameters are obtained by repeatedly updating model parameters (for example, weights and biases). Accordingly, an initial value of the model parameter is set in advance so that the model parameter is updated. In this setting, the learning result of the neural network changes depending on the set initial value of the model parameter. Therefore, it is considered necessary to perform optimization so that an appropriate initial value is set.

For example, in deep learning, pseudo-random numbers are often used to initialize model parameters. In the setting, when the variation of the initial values is too large or too small, the learning rate would be low and the accuracy of the model would not be improved in some cases. For this reason, it is important to set the initial values of the model parameters more appropriately. The first optimization algorithm is an algorithm for optimizing the random number seed, which is the source of the pseudo-random number, so that a more appropriate initial value can be generated as the initial value of the model parameter.

Accordingly, the generation unit 131 uses the first optimization algorithm to optimize the random number seed that is the source of the initial values for the model parameters so as to suppress occurrence of variation in the initial values of the model parameters due to the complete randomness of the initial values of the model parameters. In other words, the generation unit 131 optimizes the random number seed so that the distribution of the generated model parameters falls within a predetermined distribution.

For example, the generation unit 131 generates a plurality of random number seeds such that the initial value of the model parameter falls within a predetermined range. Furthermore, for example, the generation unit 131 generates a plurality of random number seeds in which the distribution of the initial values of the model parameters indicates a predetermined probability distribution (for example, uniform distribution or normal distribution). Furthermore, the generation unit 131 generates a plurality of random number seeds such that the mean value obtained by averaging the initial values of each of model parameters becomes a predetermined value, for example.

Subsequently, by inputting the generated random number seed into the random function for each of the random number seeds, the generation unit 131 generates an initial value of the model parameter corresponding to each of random number seeds from the output random numbers.

For example, when generating model parameters having a distribution indicating a uniform distribution in response to an instruction from the user, it is possible to select for the generation unit 131, as a random function (initialization function), an initialization function "glorot_uniform" for initialization by the uniform distribution of Glorot (also referred to as uniform distribution of Xavier). The uniform distribution of Glorot corresponds to the uniform distribution having a range [limit, −limit] when limit is sqrt (6/(fan_in+fan_out)).

For example, when generating model parameters having a distribution indicating a uniform distribution in response to an instruction from the user, it is possible to select for the generation unit 131, as a random function (initialization function), an initialization function "he_uniform" for initialization by the uniform distribution of He. The uniform distribution of He corresponds to the uniform distribution having a range [limit, −limit] when limit is sqrt (6/fan_in).

Subsequently, the generation unit 131 generates an initial value of the model parameter from the random number (pseudo-random number) output by inputting the generated random number seed into the selected initialization function. In addition, the distribution of random numbers and model parameters obtained here indicates a uniform distribution.

In addition, the generation unit 131 generates a model each having an initial value of the model parameter. Specifically, the generation unit 131 generates a model for each of initial values of the model parameter. For example, the generation unit 131 generates a model having a set of model parameters having different combinations for each of sets of the model parameters among the initial value group of the model parameters which fall within a predetermined distribution (for example, uniform distribution, normal distribution, or a mean value).

[7-1-2. Fourth Optimization Algorithm]

In order to train the model, it is important that the data is shuffled well in the shuffle buffer. In addition, simply shuffling the data might cause a bias in the learning order and data distribution for each batch, for example, leading to a failure of proper learning. In such cases, the accuracy of the model cannot be improved.

In view of this, the first training unit 135 uses the fourth optimization algorithm to perform optimization of data shuffle of shuffling the training data in the shuffle buffer.

Specifically, the first training unit 135 optimizes the seed value used when generating the random order. For example, using the fourth optimization algorithm, the first training unit 135 generates a random number seed in the current learning for each of epochs for iterative learning so as to prevent occurrence of a bias in the random order associated with each of pieces of the training data between the epochs. The first training unit 135 then inputs the individual generated random number seeds into the random function to generate a random order. Furthermore, by associating the generated random order with each of pieces of the training data as a learning target, the first training unit 135 generates, in the shuffle buffer, final learning data as a learning target.

In this regard, for example, the first training unit 135 generates, for each of epochs for iterative learning, a plurality of random number seeds in which the random order indicates a predetermined probability distribution (for example, uniform distribution or normal distribution) so as to suppress occurrence of biased random order associated with each of pieces of training data between the epochs.

The first training unit 135 can use an optimization function related to data shuffle, such as dataset=dataset.shuffle (buffer_size, seed=seed, reshuffle_each_iteration=True), to perform data shuffle optimization corresponding to the current shuffle buffer size.

[7-1-3. Example of Experimental Results of Using First and Fourth Optimization Algorithms]

Next, an example of the effect of execution of the first and fourth optimization algorithms will be described with reference to FIGS. 7 to 9.

Figure 7:
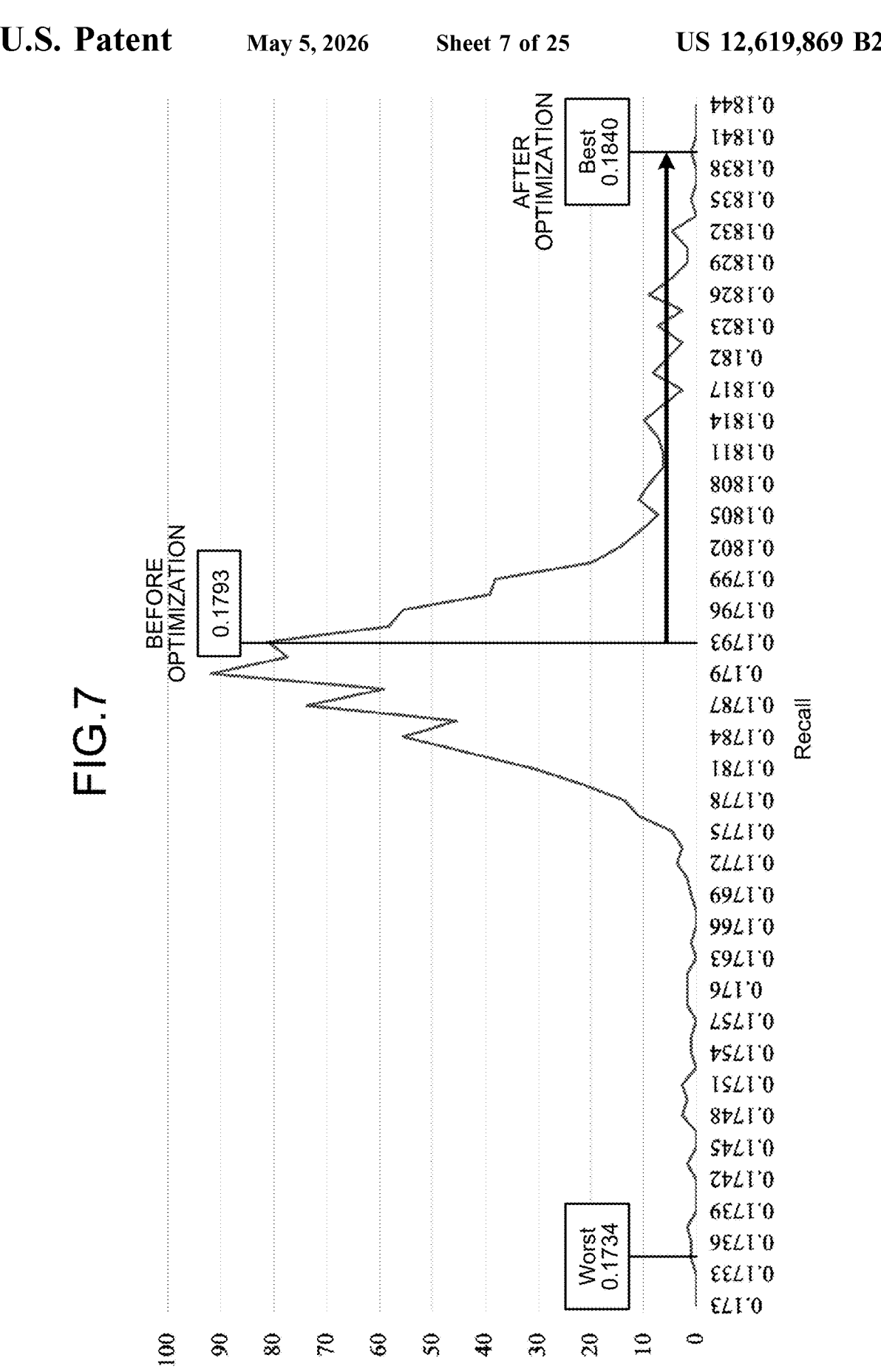
FIG. 7 is a diagram (1) illustrating a change in model performance when first and fourth optimization algorithms are executed.

FIG. 7 is a diagram (1) illustrating a change in model performance when the first and fourth optimization algorithms are executed. Specifically, FIG. 7 illustrates, in a histogram, a result of comparison of accuracy distribution of an identical model between a case where the first and fourth optimization algorithms have been executed for the model and a case where these have not been executed for the model.

In the example of FIG. 7, the training data used is unified and the trial count is also unified (for example, 1000 times) between the case where there is execution and the case where there is no execution regarding the first and fourth optimization algorithms. The histogram illustrated in FIG. 7 is a result of plotting recalls on the horizontal axis and trial counts on the vertical axis.

The histogram illustrated in FIG. 7 indicates that the recall is "0.1793" even in the best trial with no execution of the first or fourth optimization algorithm, whereas the recall improved to "0.1840" in the best trial with execution of the first and fourth optimization algorithms. In this regard, according to the experimental results, it was found that the accuracy of the model is improved by executing the first and fourth algorithms. That is, from the experimental results, it was found that the performance of the model can be improved by optimizing the calculation graph and the random number seeds in data shuffle.

Figure 8:
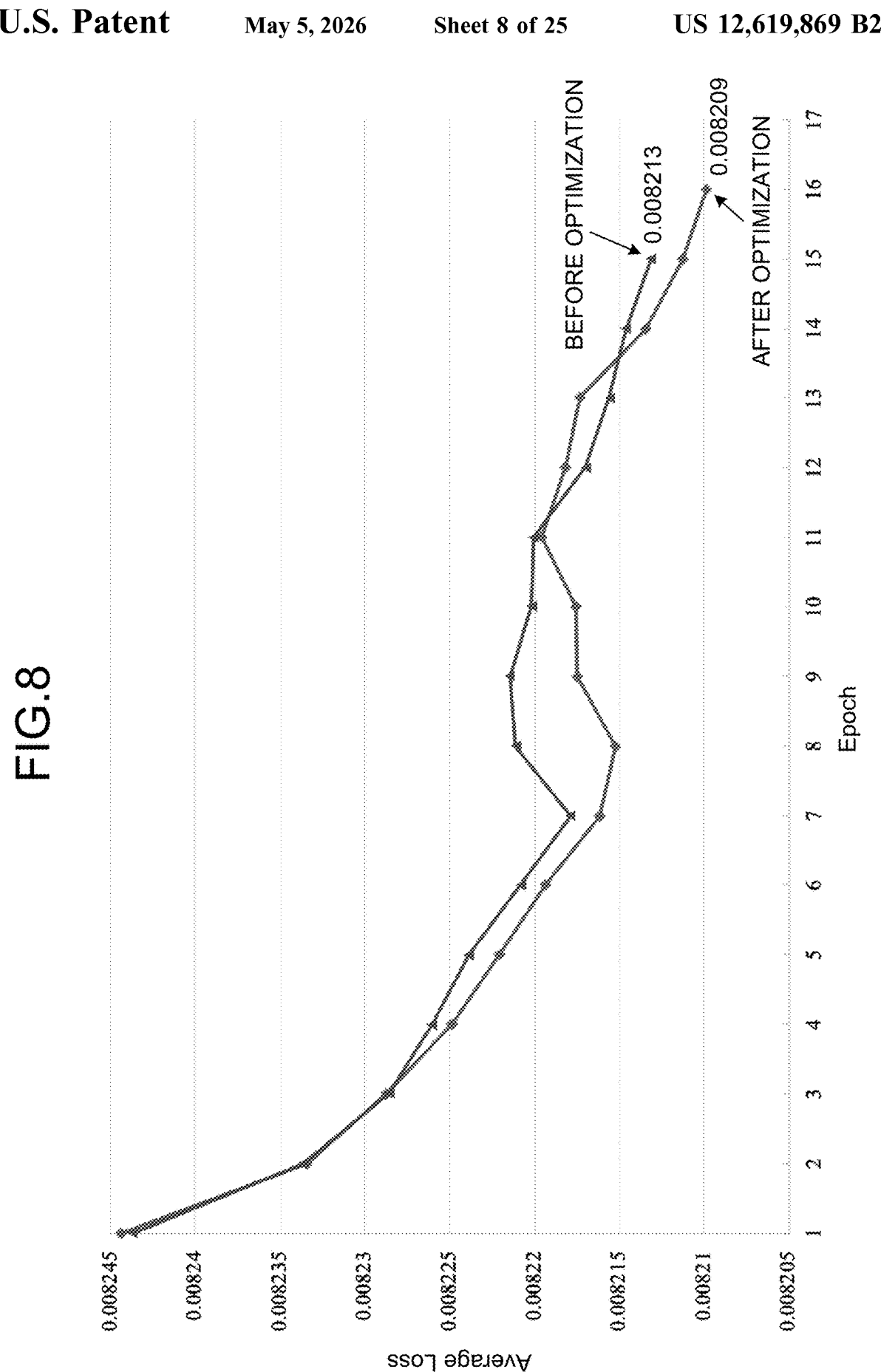
FIG. 8 is a diagram (2) illustrating a change in model performance when the first and fourth optimization algorithms are executed.

FIG. 8 is a diagram (2) illustrating a change in model performance when the first and fourth optimization algorithms are executed. Specifically, FIG. 8 illustrates a graph of comparison of how the model accuracy changes between a case where the first and fourth optimization algorithms are executed and the case where these algorithms are not executed, for an identical model. The graph illustrated in FIG. 8 is a result of plotting epochs on the horizontal axis and average loss on the vertical axis.

The graph illustrated in FIG. 8 indicates that the average loss was suppressed to "0.008213" by repeated learning with no execution of the first and fourth optimization algorithms, whereas the average loss is further suppressed to "0.008208" by repeated learning with execution of the first and fourth optimization algorithms. In this regard, according to the experimental results, it was found that the accuracy of the model is improved by executing the first and fourth algorithms. That is, from the experimental results, it was found that the performance of the model can be improved by optimizing the calculation graph and the random number seeds in data shuffle.

Furthermore, verification is performed as to whether the performance of the model changes in a case where only one of the first optimization algorithm or the fourth optimization algorithm is executed, or where the first and fourth optimization algorithms are executed in combination. FIG. 9 is a diagram illustrating a comparative example comparing the performance of models according to the combination of the first and fourth optimization algorithms.

Figure 9:
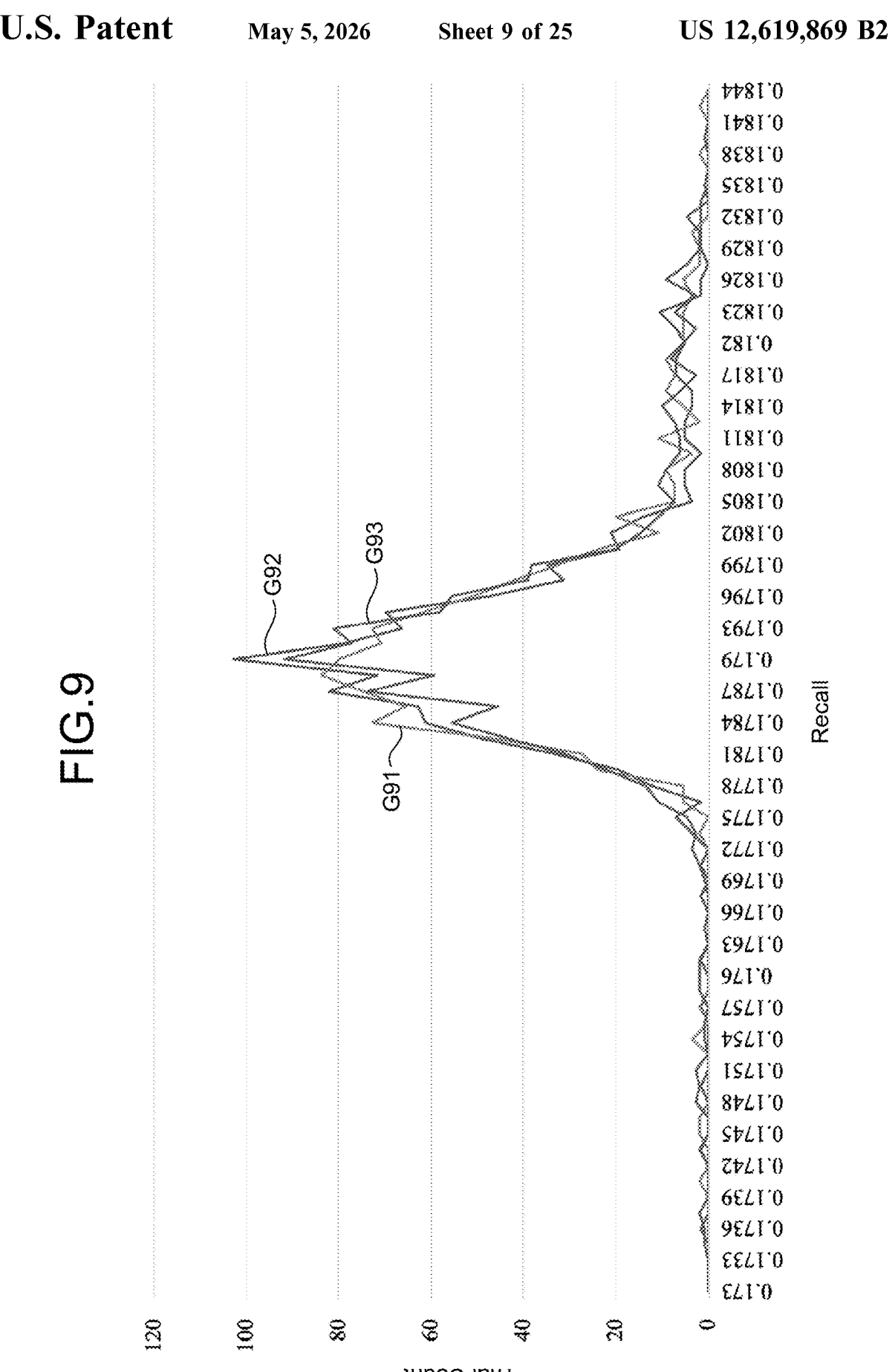
FIG. 9 is a diagram illustrating a comparative example comparing the performance of models according to the combination of the first and fourth optimization algorithms.

FIG. 9 illustrates three graphs (graph G91, graph G92, and graph G93) plotting the recalls in the horizontal axis and the trial counts in the vertical axis. The model used in the experiment, the training data, and the trial counts in graph G91, graph G92, and graph G93 are unified.

Furthermore, graph G91 is a histogram illustrating the accuracy distribution of the model when only the first optimization algorithm is executed. Graph G92 is a histogram illustrating the accuracy distribution of the model when only the fourth optimization algorithm is executed. Graph G93 is a histogram illustrating the accuracy distribution of the model when the first and fourth optimization algorithms are executed.

It is observed from comparison that graphs G91 to G93 all have a substantially similar accuracy distribution. Therefore, the experimental result has revealed that there is no significant difference between the case where only the first optimization algorithm is executed, the case where only the fourth optimization algorithm is executed, and the case where the first and fourth optimization algorithms are executed and that performance of the models can be maintained in any of these cases.

[7-2. Second Optimization Algorithm]

In deep learning, the learning data set is divided into several subsets, and each of the subsets is all delivered to the learning as the epoch progresses. However, when all subsets are used for model training, the best performance model is not always trained. Furthermore, as the amount of learning data increases, the time spent on learning and the occupation of computer resources become problems. Therefore, it is required to narrow down the effective subset to be used for learning and improve the efficiency of learning. The second optimization algorithm is an optimization process that has been realized based on such a premise. In the following, an example of the second optimization algorithm described so far will be described in more detail with reference to FIG. 10.

Figure 10:
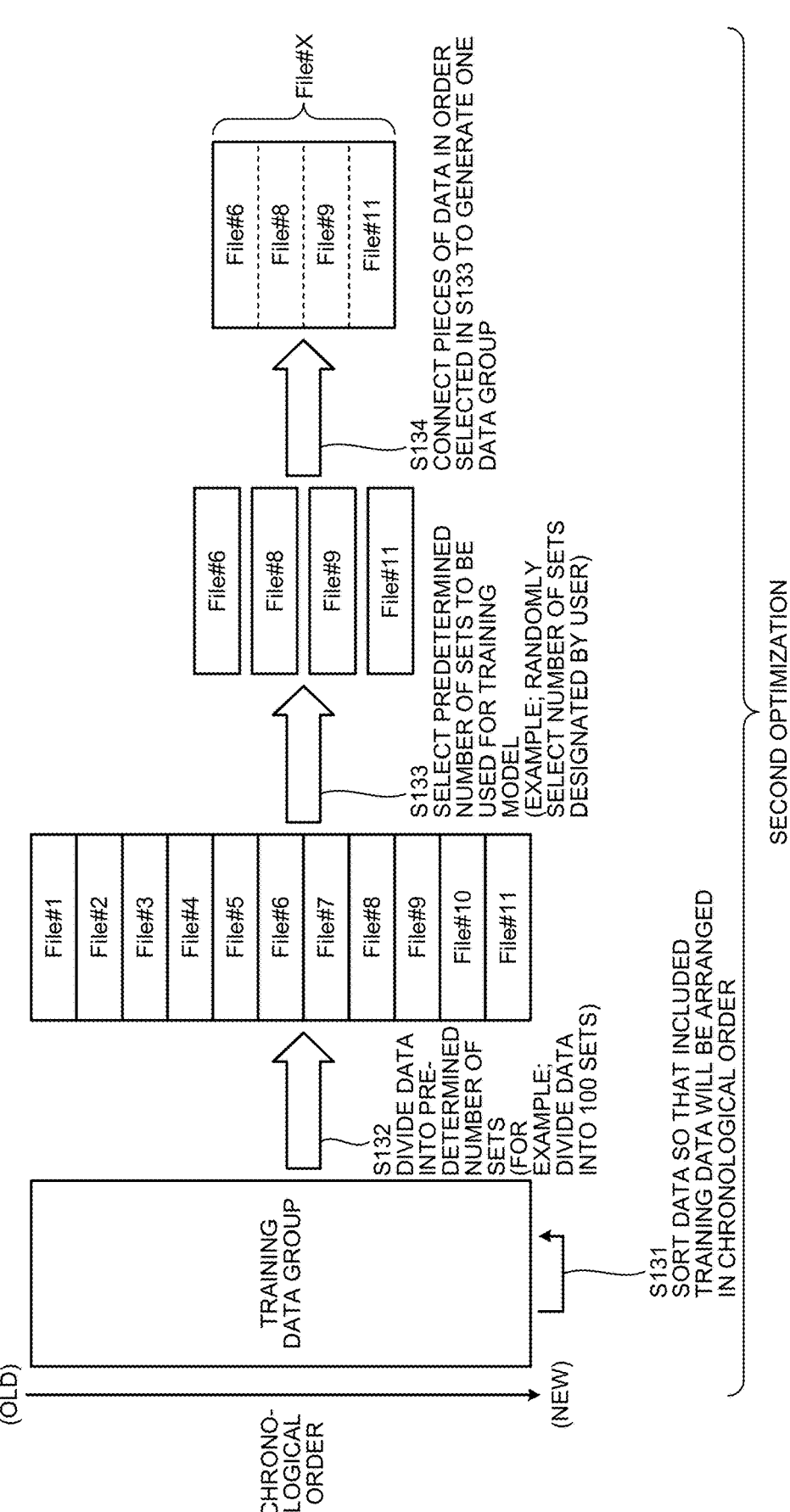
FIG. 10 is a diagram illustrating an example of a second optimization algorithm.

FIG. 10 is a diagram illustrating an example of the second optimization algorithm. A series of processes illustrated in FIG. 10 corresponds to the processes in step S13 illustrated in FIG. 3.

First, the acquisition unit 132 acquires training data from the learning data storage unit 121, and outputs the acquired training data to the first data control unit 133. Having received the training data from the acquisition unit 132, the first data control unit 133 executes the following process by using the second optimization algorithm.

Here, as explained with reference to FIG. 6, the training data has the concept of time series. More specifically, since the training data group is constituted with a predetermined number of pieces of training data, each of pieces of the training data is associated with time information as a history, for example.

Accordingly, the first data control unit 133 first sorts the included training data so as to be arranged in chronological order (S131). Next, the first data control unit 133 divides the training data group in a state where the included training data is sorted, into a predetermined number of sets (step S132). For example, the first data control unit 133 can divide the training data group into a predetermined number of sets so that a predetermined number of pieces of training data (for example, a number designated by the user) is equally included in one set. Furthermore, the first data control unit 133 may divide the training data group into a predetermined number of sets so that one set includes a number of pieces of training data within a predetermined range.

FIG. 10 illustrates an example in which the first data control unit 133 divides the training data group files into data files namely, "File #1", "File #2", "File #3", "File #4", "File #5", "File #6", "File #7", "File #8", "File #9", "File #10", and "File #11", each of which obtained corresponding to each of the sets.

In addition, each of these data files contains pieces of training data arranged in chronological order. Therefore, according to the example of FIG. 10, the larger the file number of the data file, the newer the time series of the included training data. For example, when comparing one set of "File #2" with the other set of "File #3", "File #3" is considered to be the set in which the time series of the included training data is newer.

Next, the first data control unit 133 selects a predetermined number of sets to be used for training the model from all the sets obtained by the division in step S132 (step S133). For example, the first data control unit 133 randomly selects sets to be used for training the model from all the sets obtained by the division in step S132 until the number of the selected sets reaches a predetermined number. As an example, the first data control unit 133 randomly selects sets from among all the sets obtained by the division in step S132 until the number reaches a predetermined number (for example, the number designated by the user). Alternatively, the first data control unit 133 randomly selects sets in order of the set in which the training data included is newer in time series (File #11 in the example of FIG. 10) until the number reaches a predetermined number (for example, the number designated by the user). FIG. 10 illustrates an example in which the first data control unit 133 selects, in the first loop, four sets of "File #11", "File #9", "File #8", and "File #6" in order of selection, that is, randomly selecting in order from the set having a newer time series of the included training data (in order of selection in time series).

Furthermore, as will be described below, the process from step S133 is repeated until the designated number of loops is reached. Specifically, an operation of randomly selecting sets from among the sets obtained by division in step S132 and currently unselected sets until a predetermined number is reached, or an operation of randomly selecting sets in order from the set in which the learning data included is newer in time series from among the sets obtained by the division in step S132 and currently unselected sets until a predetermined number is reached, will be repeated for each of loops until the designated number of loops is reached. Accordingly, for example, there is a possibility, in the second loop, that "File #7", "File #5", and "File #4" will be randomly selected, beginning with "File #10", for example.

In addition, next, the first data control unit 133 generates one data group by connecting the sets selected in step S133 (step S134). For example, the first data control unit 133 generates one data group by connecting the sets selected in step S133 in the selection order. Furthermore, the order of selection referred to here corresponds to the order of selection in step S133, and specifically, the order of selection in which the set to be used for training the model is selected in the order in which the time series of the included training data is newest.

Furthermore, the first data control unit 133 can pass this data group to the second data control unit 134 so that the training data included in the generated data group can be used for learning. The example of FIG. 10 is an example in which the first data control unit 133 has passed the "File #X", which is a data file storing the generated data group, to the second data control unit 134. As illustrated in FIG. 10, the files are arranged in the order of selection, that is, "File #6", "File #8", "File #9", and "File #11" in "File #X". That is, in the "File #X", the pieces of training data are arranged in the order of selection.

[7-3-1. Third Optimization Algorithm]

When training a model in deep learning, proper batch processing of the data set and iterative learning on the model are considered important in order to improve the accuracy of the model. In addition, the order in which each of subsets obtained by batch processing of the learning data set is to be learned is considered to contribute to the performance of the model. The third optimization algorithm is an optimization process that has been realized based on such a premise. In the following, an example of the third optimization algorithm described so far will be described in more detail with reference to FIG. 11.

FIG. 11 is a diagram illustrating an example of the third optimization algorithm. FIG. 11 also illustrates the fourth optimization algorithm. Furthermore, a series of processes illustrated in FIG. 11 corresponds to the processes from steps S13 to S14 illustrated in FIG. 3.

For example, the second data control unit 134 optimizes the shuffle buffer size by using the third optimization algorithm. For example, the second data control unit 134 generates training data having a size equal to the size of the shuffle buffer as optimization of the shuffle buffer size, and stores the generated data into the shuffle buffer as training data as a learning target which is the training data used in the current iterative learning. For example, the second data control unit 134 continues to execute the following process in step S134 of FIG. 10 as an example of such a process.

For example, the second data control unit 134 divides the training data group which is grouped as "File #X" (here, individual pieces of training data are arranged in the order of selection) into a predetermined number of sets (step S135). For example, the second data control unit 134 divides the training data group into a predetermined number of sets so that a predetermined number of pieces of training data (for example, a number designated by the user) is equally included in one set. Furthermore, the second data control unit 134 may divide the training data group into a predetermined number of sets so that one set includes a number of pieces of training data within a predetermined range.

For example, the user can use various hyperparameters such as upper limit (maxValue), lower limit (minValue), minimumUnit, or the like to designate details of division, that is, how the training data group included in "File #X" will be divided. In other words, the user can designate the shuffle buffer size using the above hyperparameters or the like. Therefore, the second data control unit 134 can optimize the shuffle buffer size based on the division details designated by the user. For example, the second data control unit 134 selects a shuffle buffer size according to the division details designated by the user, and divides the training data group included in "File #X" in accordance with the selected shuffle buffer size.

For example, here is an assumable example of prescription in which the above hyperparameters are used to optimize the shuffle buffer size capable of storing "10,000" records to the shuffle buffer size that corresponds to "2,500" records. In such a case, the second data control unit 134 divides 10,000 training data groups into 2,500 training data groups.

Here, an experiment has revealed that the accuracy of the model changes depending on the manner of division including how may pieces of training data should be included in one set, that is, how to set the shuffle buffer size. While the experimental result obtained by this experiment will be described in FIG. 12, this experimental result may be reflected in the third optimization algorithm, for example. Specifically, the second data control unit 134 may optimize the shuffle buffer size (the number of pieces of training data included in one set) by using the third optimization algorithm that reflects the experimental results illustrated in FIG. 12.

Furthermore, FIG. 11 illustrates an example in which the second data control unit 134 has divided the training data group included in the "File #X" into four training data groups, which are obtained as: a training data group #1 (Data #1), a training data group #2 (Data #2), a training data group #3 (Data #3), and a training data group #4 (Data #4). Furthermore, according to the example of FIG. 11, the training data group #1 is stored in "File #X1", the training data group #2 is stored in "File #X2", the training data group #3 is stored in "File #X3", and the training data group #4 is stored in "File #X4", by the second data control unit 134.

Furthermore, the example of FIG. 11 is an example in which each of the training data groups is arranged from the top in the order in which the training data group sets have been obtained by the division in step S135 (order of division).

Next, the second data control unit 134 extracts one set according to the order of division from the unprocessed sets that have been obtained by the division in step S135 and have not been used for the training at the current point, and stores the extracted one set in the shuffle buffer as the training data as a learning target, which is the training data used in the current iterative learning (step S136).

According to the example of FIG. 11, the second data control unit 134 extracts "File #X1", which is a set first obtained by the division. The second data control unit 134 then stores the training data included in the extracted "File #X1" in the shuffle buffer as the training data as a learning target.

Furthermore, as in step S136, following the state in which the training data of the size (number) corresponding to the shuffle buffer size optimized by the third optimization algorithm has been stored in the shuffle buffer, the first training unit 135 executes the following process after step S136.

Specifically, using the fourth optimization algorithm, the first training unit 135 performs data shuffle optimization of shuffling the training data as the learning target stored in the shuffle buffer. The first training unit 135 then trains each of models to learn the training data as the final learning target generated by the optimization.

For example, the first training unit 135 generates final learning data as a learning target by randomly deciding the learning order using the fourth optimization algorithm (step S141). That is, the first training unit 135 uses the fourth optimization algorithm to decide the random order to generate the final learning data as a learning target.

Specifically, using the fourth optimization algorithm, the first training unit 135 generates a random number seed (seed as a base for random order) in the current learning for each of epochs for iterative learning so as to prevent occurrence of a biased random order associated with each of pieces of the training data between the epochs. The first training unit 135 then inputs the individual generated random number seeds into the random function to generate a random order. Furthermore, by associating the generated random order with each of pieces of the training data as a learning target, the first training unit 135 generates, in the shuffle buffer, final learning data as a learning target.

Next, the first training unit 135 trains each of the models to sequentially learn the features of the training data as a learning target (training data contained in "File #X1" stored in the shuffle buffer) in the learning order (random order) generated in step S141 (step S142).

Here, with steps S136 to S142 defined as one epoch, the first training unit 135 performs iterative learning by a predetermined number of epochs for the set obtained by the division in step S135. Specifically, with steps S136 to S142 defined as one epoch, the first training unit 135 performs iterative learning by the number of epochs designated by the user using the set obtained by the division in step S135.

Accordingly, the first training unit 135 first determines whether all of the sets obtained by the division in step S135 have been processed by one epoch (step S143). Specifically, the first training unit 135 determines whether all the sets ("File #X1" to "File #X4" in the example of FIG. 11) obtained by the division in step S135 have been used in the learning that defines processes of steps S136 to S142 as one epoch.

While continuously determining that all the sets obtained by the division in step S135 have not been processed by one epoch (step S143; No), the first training unit 135 controls to repeat the series of processes in step S136 to step S142.

Furthermore, having determined that all of the sets obtained by the division in step S135 have been processed by one epoch (step S143; Yes), the first training unit 135 determines whether the sets obtained by the division in step S135 have reached the designated number of epochs (step S144). Specifically, the first training unit 135 determines whether the iterative learning has been performed for the designated number of epochs (for example, designated by the user) using the sets obtained by the division in step S135.

The first training unit 135 repeats a series of processes from step S136 to step S142 while determining that the designated number of epochs has not been reached (step S144; No).

In contrast, when it is determined that the designated number of epochs has been reached (step S144; Yes), the model selection unit 136 selects the best model at the current point based on the accuracy of each of the trained models at the current point (step S145). For example, the model selection unit 136 calculates the accuracy of each of models using evaluation data, and calculates an evaluation value such that the higher the variation in accuracy (the amount of improvement in accuracy), the higher the evaluation value.

The model selection unit 136 then selects the model for which the highest evaluation value is calculated as the best model. The method for selecting the best model is not limited to such a method. Furthermore, in order to obtain a model with higher accuracy, a series of processes from step S133 are repeated until the designated number of loops is reached.

Therefore, the first training unit 135 then determines whether the number of loops, which is the number of times the process is repeated (looped) from step S133, has been reached (step S146). The number of loops is a hyperparameter that can be designated by the user.

Accordingly, the first training unit 135 controls to repeat a series of processes from step S136 while determining that the designated number of times of loops has not been reached (step S146; No). This point will be described in more detail with reference to the example of FIG. 10.

For example, when it is determined that the designated number of loops has not been reached, the first data control unit 133 performs the process of step S133 of randomly selecting in order the sets obtained by the division in step S132 which are the sets currently unselected up to the current point until the designated number of loops is reached. Here, for example, the set used by the best model for training is to be held in the processes from step S133 executed from the second loop. Specifically, in the processes from step S133 executed from the second loop, a new set of data used for learning is to be added to the set used by the best model for training. Accordingly, from the second loop, the first data control unit 133 selects sets of training data to be added to the set used by the best model for training.

Furthermore, as in the above example, there is a possibility, in the second loop, that "File #7", "File #5", and "File #4" will be randomly selected, beginning with "File #10", for example.

Furthermore, according to the examples so far, when the designated number of loops is reached, the model selection unit 136 can select the model having the highest accuracy at this point.

[7-3-2. Example of Experimental Results Regarding Third Optimization Algorithm]

Figure 12:
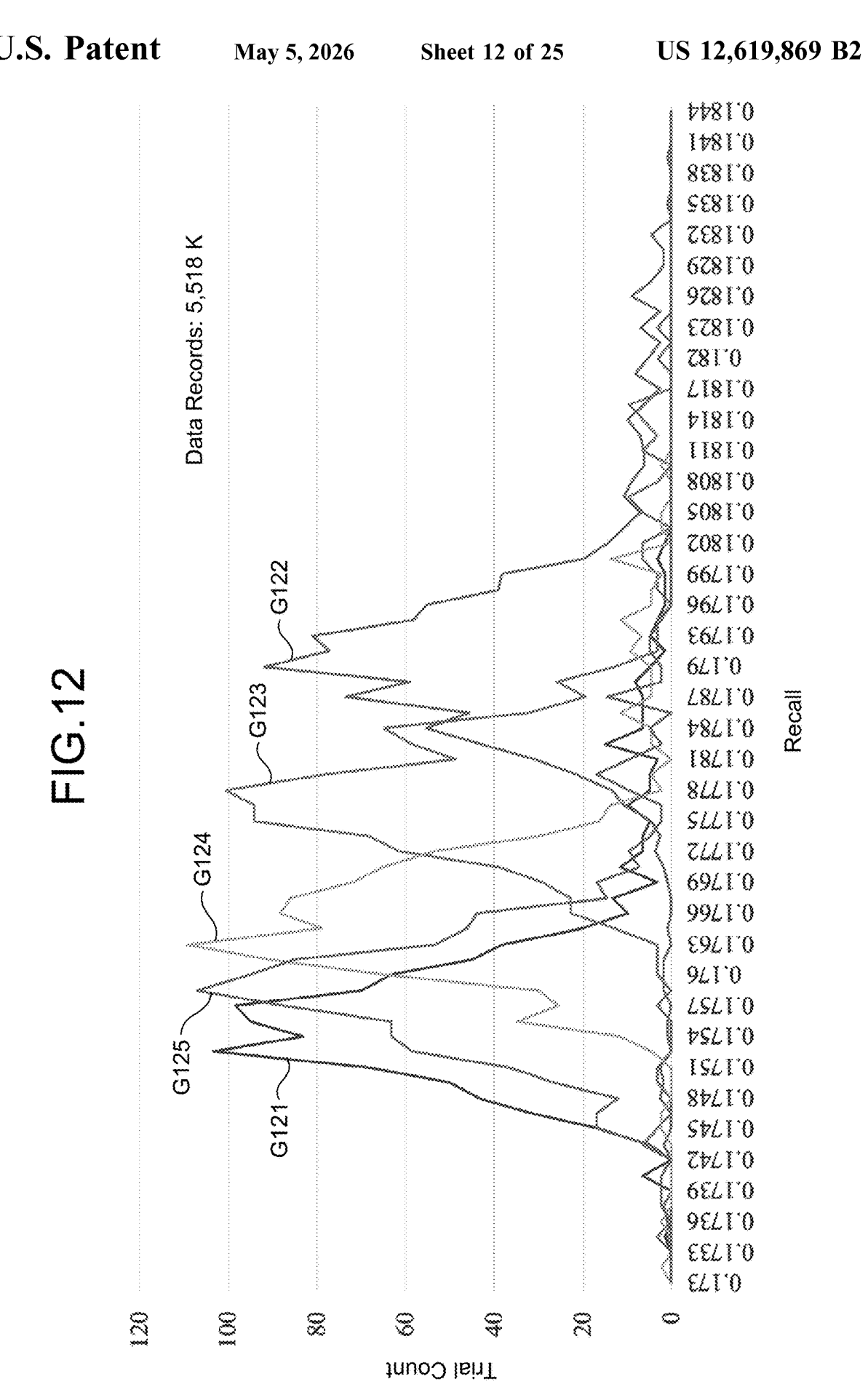
FIG. 12 is a diagram illustrating a comparative example in which the performance of the model is compared for individual shuffle buffer sizes.

In application of the third optimization algorithm, the experiments have verified that how to determine the number of pieces of training data that should be included in one set in the division, that is, how to optimize the shuffle buffer size, would determine effectiveness to improve the accuracy of the model. FIG. 12 is a diagram illustrating a comparative example in which the performance of the model is compared for individual shuffle buffer sizes.

FIG. 12 illustrates five graphs (graph G121, graph G122, graph G123, graph G124, and graph G125) plotting the recalls in the horizontal axis and the trial counts in the vertical axis. In the graphs G121 to G125, the model used in the experiment, the training data, and the trial counts are unified.

Furthermore, graph G121 is a histogram illustrating the accuracy distribution of the model when the shuffle buffer size is set to "1,000K" for a certain set including the training data. Graph G122 is a histogram illustrating the accuracy distribution of the model when the shuffle buffer size is set to "2,000K" for a similar set. Graph G123 is a histogram illustrating the accuracy distribution of the model when the shuffle buffer size is set to "3,000K" for a similar set. Graph G124 is a histogram illustrating the accuracy distribution of the model when the shuffle buffer size is set to "4,000K" for a similar set. Graph G125 is a histogram illustrating the accuracy distribution of the model when the shuffle buffer size is set to "6,000K" for a similar set.

Comparison of the graphs G121 to G125 reveals that the accuracy of the model is different from each other. This suggests that optimizing the shuffle buffer size would improve the performance of the model. This reveals that optimizing the shuffle buffer size by executing the third optimization algorithm may improve the performance of the model. Incidentally, the third optimization algorithm can be said to be an idea that was conceived from the experimental results as illustrated in FIG. 12.

Furthermore, the third optimization algorithm may reflect the experimental results illustrated in FIG. 12. Specifically, the second data control unit 134 may optimize the shuffle buffer size (the number of pieces of training data included in one set) by using the third optimization algorithm that reflects the experimental results illustrated in FIG. 12.

Regarding this point, since the number of data records is "5,518K in the example of FIG. 12, the model performance for the shuffle buffer size "6,000K" that can store all the data was expected to be the best. However, as illustrated in FIG. 12, in practice, the experiment has revealed that the shuffle buffer size of "2,000K" may improve the performance of the model most. Therefore, based on such experimental results, for example, the third optimization algorithm may be an algorithm that optimizes the shuffle buffer size to "2,000K". Furthermore, the third optimization algorithm may be an algorithm that optimizes to set the size of ⅓ of the total size (total number) of the training data as the shuffle buffer size.

In addition, using the example of FIG. 11, the user can appropriately examine how to divide the training data group included in "File #X" based on the experimental results. For example, the user will be able to examine more appropriate values as various hyperparameters such as upper limit (maxValue), lower limit (minValue), minimumUnit, and so on.

[7-4-1. Fifth Optimization Algorithm]

In deep learning, the model is repeatedly trained to search for the optimum hyperparameters in order to obtain the desired accuracy and generalization performance, in which one trial might take several hours depending on the algorithm used, the amount of data, or the calculation environment. For example, in grid research, optimum parameters are selected by searching all possible hyperparameters. In such a case, the increased types of hyperparameters would increase the number of combinations, leading to the problems such as time and computer resource occupancy. The fifth optimization algorithm is an optimization process that has been realized based on such a premise. In the following, an example of the fifth optimization algorithm described so far will be described in more detail with reference to FIG. 13.

FIG. 13 is a diagram illustrating an example of conditional information regarding the fifth optimization algorithm. In a learning process, a trial to search the hyperparameters is to be repeated. In this trial, the fifth optimization algorithm is executed as optimization of the trial by pruning so as to achieve an efficient search. Specifically, the first training unit 135 uses the fifth optimization algorithm to perform optimization of the trial referred to as early stopping without continuation to the end, for the trials that are not expected to produce good results.

In addition, for example, the information processing device 100 enables the user to set a constraint condition that conditions a trial that is a target of early stopping (a target to be stopped early) from a viewpoint of an evaluation value that evaluates the accuracy of the model. For example, the information processing device 100 enables setting to combine a plurality of such constraint conditions. FIG. 13 illustrates an example of constraint condition that can be set by the user. The constraint conditions illustrated in FIG. 13 are only examples, and the user can set any number of arbitrary combinations of the constraint conditions for the information processing device 100. Furthermore, although not illustrated in FIG. 5, the information processing device 100 may further have a reception unit that receives the setting of constraint conditions.

Furthermore, the first training unit 135 determines, for each of trials (trials with different hyperparameter combinations), whether the evaluation value (evaluation value for evaluating the accuracy of the model) in the hyperparameter combination corresponding to the trial satisfies the constraint conditions. At a point where it is determined that the constraint conditions are satisfied, the first training unit 135 stops the trial for the determination target. The first training unit 135 then continues only the remaining trials that has not been stopped.

Hereinafter the constraint conditions illustrated in FIG. 13 will be described. FIG. 13 illustrates an example of a stop condition (constraint condition) that conditions a trial to stop (prune) the learning process earlier than it reaches all epochs. Specifically, FIG. 13 illustrates five stop conditions C1 to C5.

According to the stop condition C1, the conditions are set as "function: stop_if_no_decrease_hook", "mtric_name: avarage_loss", "max_epochs_without_decrease: 3", and "min_epochs: 1". Such an example indicates that the stop condition C1 "conditions to stop trials in which the average loss has not decreased (accuracy has no improvement) during a maximum of three epochs".

In addition, according to the stop condition C2, the conditions are set as "function: stop_if_no_decrease_hook", "mtric_name: auc", "max_epochs_without_increase: 3", and "min_epochs: 1". Such an example indicates that the stop condition C2 "conditions to stop trials in which auc has not increased (accuracy has no improvement) during a maximum of three epochs".

In addition, according to the stop condition C3, the conditions are set as "function: stop_if_lower_hook", "mtric_name: accuracy", "threshold: 0.8", and "min_epochs: 3". Such an example indicates that the stop condition C3 "conditions to stop the trials whose accuracy does not exceed the threshold 0.8 at three epochs or later".

In addition, according to the stop condition C4, conditions are set as "function: stop_if_higher_hook", "mtric_name: loss", "threshold: 300", and "min_epochs: 5". Such an example indicates that the stop condition C4 "conditions to stop the trial whose loss exceeds the threshold 300 at five epochs or later".

In addition, according to the stop condition C5, the conditions are set as "function: stop_if_not_in_top_k_ hook", "mtric_name: auc", "top_k: 10", and "epochs: 3". Such an example indicates that the stop condition C5 "conditions to stop the trials in which auc is not in the top 10 at the point of three epochs".

[7-4-2. Example of Experimental Results when Using Fifth Optimization]

Subsequently, with reference to FIG. 14, an example of a process of stopping the trial will be described using the fifth optimization algorithm. FIG. 14 is a diagram illustrating an example of the fifth optimization algorithm. The example of FIG. 14 illustrates a scene in which the fifth optimization algorithm is applied in a state where stop conditions C6 and C7 are combined.

According to the stop condition C6, the conditions are set as "function: stop_if_not_in_top_k_hook", "mtric_name: recall", "top_k: 8", and "epochs: 3". Such an example indicates that the stop condition C6 "conditions to stop the trials in which recall is not in the top 8 at the point of three epochs".

According to the stop condition C7, the conditions are set as "function: stop_if_not_in_top_k_hook", "mtric_name: recall", "top_k: 4", and "epochs: 6". Such an example indicates that the stop condition C7 "conditions to stop the trials in which recall is not in the top 4 at the point of six epochs".

Furthermore, FIG. 14 illustrates an example of a state where individual trials having different combinations of hyperparameters are processed in parallel using a predetermined number (for example, 16) of devices, and in this state, the first training unit 135 monitors fluctuations of the recalls, which are evaluation values (evaluation values to evaluate the accuracy of the model) for combinations of the hyperparameters corresponding to the trials, for each of the trials, and determines whether the mode based on the fluctuations of the recalls (order of trials in the example of FIG. 14) satisfies the stop conditions C6 and C7.

In such a state, the first training unit 135 stops the trial in which the recall is not in the top 8 at the point of three epochs based on the stop condition C6. In addition, the first training unit 135 stops the trial in which the recall is not in the top 4 at the point of six epochs.

In this manner, the experimental result has revealed that performing optimization of the trial by performing early stopping on the trial that is not expected to improve the performance of the model by using the fifth optimization algorithm can improve the processing time by 45%. Specifically, the experimental result has revealed that processing time can be improved by 45% by the fifth optimization algorithm that combines a plurality of stop conditions that condition trial that is not expected to improve the performance of the model and performs early stopping on the trial. In this regard, according to the fifth optimization algorithm, it is possible to solve problems such as time and computer resource occupancy.

In addition, the user might be required to set effective stop conditions so that computer resources can be used efficiently. In this regard, the information processing device 100 may provide information to support the user to examine what types of stop conditions should be set. For example, the information processing device 100 provides a screen that displays the current optimization status for each trial so that the user can visually recognize the optimization status. For example, the information processing device 100 can deliver a screen displaying the current optimization status for each trial to the terminal device 3 in response to the access from the terminal device 3 possessed by the user.

According to such an information processing device 100, it is possible to facilitate visual recognition of a trial that is not expected to improve the performance of the model. This makes it possible to examine effective stop conditions as to what types of stop conditions should be set to perform early stopping on the trial that is not expected to improve the performance of the model.

The screen displaying the optimization status may be provided by, for example, the providing unit 138, or may be provided by another processing unit.

[7-5-1. Optimization of Mask Target]

So far, the first optimization algorithm to the fifth optimization algorithm have been described as algorithms for optimizing the training method. In addition to these optimizations, the information processing device 100 may optimize the data as a mask target, that is, as to which of the input candidate data to be input to the trained model should not be input to the model. Specifically, the information processing device 100 uses an algorithm for optimizing the mask target to select non-input target data that is not to be input to the model from among the input candidate data to be input to the trained model.

When predicting a target using a trained model, for example, there are cases where using an input method in which data having a specific attribute (for example, category) among the data to be input for prediction is not input (that is, masked) while only the remaining data is input, will achieve more accurate results compared to the case where all data are input. In other words, there is a case where the accuracy of the trained model can be improved by not inputting (that is by masking) the data with a specific attribute (for example, category) and inputting only the remaining data, rather than inputting all the data.

According to this, it is considered necessary to perform optimization of the data that should be input to the trained model by determining the attribute of data, that is, determining the data with a certain attribute not to be input to the trained model, out of the candidate data for input. The mask target optimization algorithm is an optimization process that has been realized based on such a premise.

For example, using the mask target optimization algorithm, the attribute selection unit 139 selects a target attribute which is the attribute as non-input target data, that is, which of the data having a certain attribute is not to be input to the model, among the candidate input data to be input to the trained model. For example, the attribute selection unit 139 measures the accuracy of the model when inputting training data having attributes other than the target attribute among the candidates of the combination of the target attributes into the model for each of the candidates, and selects a combination of target attributes from the candidates based on a measurement result.

Here, regarding the prediction of a target (for example, click through rate for advertisement) using the best model selected by the model selection unit 136, it was hypothesized that the case where data having a specific attribute among the testing data to be used for prediction is defined as non-input target data while only the remaining testing data other than the non-input target data is input to the best model, will achieve better prediction results compared to the case where testing data are input.

Figure 15:
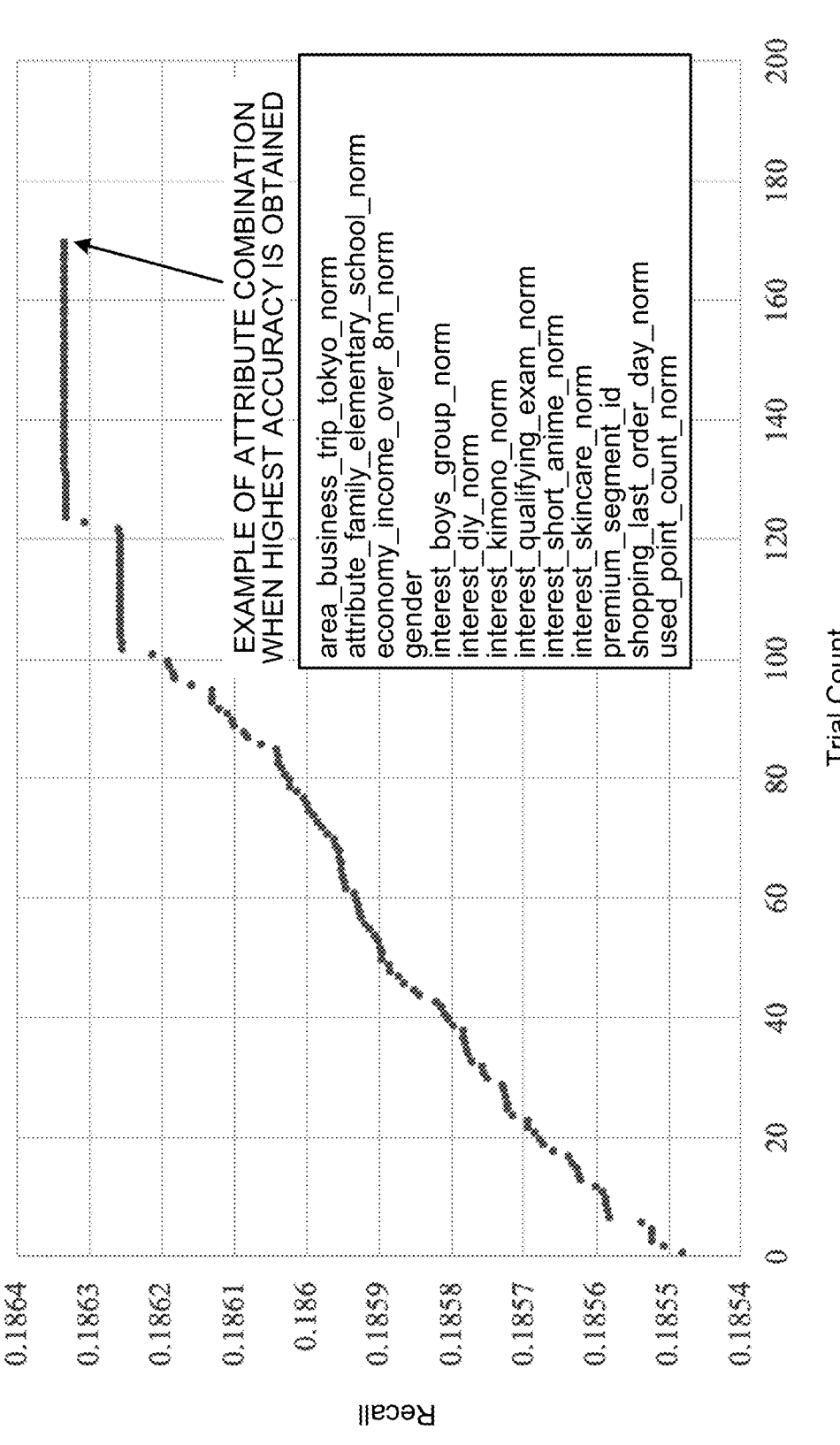
FIG. 15 is a diagram illustrating an example of an optimization algorithm for optimizing a mask target.

FIG. 15 illustrates an example of performing which mask target optimization, using the experimental results in which the effect of the mask target optimization algorithm is verified based on the hypothesis. FIG. 15 is a diagram illustrating an example of an optimization algorithm for optimizing a mask target.

Here, the training data (which may be evaluation data) used in the optimization process so far has a plurality of attributes. For example, training data is classified into various categories such as training data related to "business", training data related to "economy", training data related to "gender", and training data related to "user's interests". Accordingly, the training data has an attribute as a category like this, for example.

Therefore, for example, for each of combinations of categories that can be established for the category in the training data, the attribute selection unit 139 measures the accuracy (recall) of the model when the training data included in other categories, that is, the category other than the category in the combination, is input into the best model.

Subsequently, based on the measurement result, that is, based on which combination of the category combinations has been excluded when the highest accuracy can be obtained, for example, the attribute selection unit 139 selects a target category (target attribute), which is a target being non-input target data, representing the data of which category (attribute) is not to be input into the best model, out of the testing data paired with this training data (refer to FIG. 6).

Furthermore, in this regard, the attribute selection unit 139 automatically searches for a combination of categories (attributes) that improves performance of the model when masked. For example, the attribute selection unit 139 can use a genetic algorithm to search for a combination of categories (attributes) that improves the performance of the model when masked.

FIG. 15 plots the recalls in trials for each of search (trials) by the attribute selection unit 139. In addition, FIG. 15 illustrates an example of a combination of attributes when the highest accuracy is obtained. For convenience of explanation, the combination of categories is defined as "combination CB".

Based on the fact that the combination CB was excluded from the combination of categories when the highest accuracy is obtained, the attribute selection unit 139 defines the data included in the category in the combination CB as non-input target data that is not to be input to the best model. That is, by selecting the combination CB as the target attribute from among the combinations of categories, the attribute selection unit 139 decides to mask the data included in the category in the combination CB when inputting the testing data to the best model.

Furthermore, the providing unit 138 can provide information indicating the category other than the category selected by the attribute selection unit 139, and the best model. The information indicating the category other than the category selected by the attribute selection unit 139 may be, for example, information regarding the accuracy of the best model when the training data included in the category other than the category selected by the attribute selection unit 139 is input to the best model, and may be the recalls illustrated in FIG. 15, for example.

In addition, based on the fact that the information is provided using the optimization of the mask target, it is possible, for example, for a user when the user wants to predict the target using the best model, to recognize that data having a specific attribute needs to be masked and the remaining data is only required to be input instead of inputting all the data of the testing data prepared. In addition, as a result, the user can obtain a more proper prediction result than when all the testing data is used. In this regard, the information processing device 100 having an optimization function of optimizing the mask target can support the user to obtain a more proper result by using the trained model.

[7-5-2. Example of Experimental Results when Optimizing Mask Target]

Figure 16:
FIG. 16 is a diagram illustrating a comparative example in which the accuracy of the model is compared between a case where a mask target optimization is executed and a case where the mask target optimization is not executed.

As described above, when the mask target optimization is executed, part of the testing data will not be input. This decreases the number of pieces of testing data actually input to be less than the number in an initial case where the mask target optimization is not performed. To handle this concern, an experiment was conducted to verify whether the accuracy of the model would be affected by reducing the number of pieces of input testing data due to optimization of the mask target. FIG. 16 is a diagram illustrating a comparative example in which the accuracy of the model is compared between a case where a mask target optimization is executed and a case where the mask target optimization is not executed.

FIG. 16 illustrates a comparison between an evaluation result (recall) as a result of evaluation of the model using the evaluation data used during training and evaluation results (recalls) as a result of evaluation of the model using remaining data, that is the data excluding the data having selected attributes due to the optimization of the mask target for the evaluation data, as testing data. According to the comparative example illustrated in FIG. 16, the experiment has revealed that the versatility of the model is maintained even with the execution of optimization of the mask target.

The above example is an example in which the information processing device 100 decides the attribute of data, that is, which data having a certain attribute is not to be input to the trained model, among the input candidate data to be input to the trained model, and by this decision, the information processing device 100 controls to mask the data having the determined attribute and utilize only the data having attributes other than the decided attribute. Alternatively, however, rather than controlling to mask some of the pieces of input candidate data input to the trained model, the information processing device 100 may control to execute learning using mask target optimization during the learning using the fifth optimization algorithm described above, for example.

Specifically, the information processing device 100 further includes a determination unit that decides a plurality of new combinations of target attributes based on the combinations of target attributes in a plurality of models having accuracy that satisfies a predetermined condition and that determines whether the accuracy of each of the models satisfies the predetermined condition when the learning data having an attribute other than the target attributes in the decided combinations is input to the plurality of models. The first training unit 135 trains the model determined by the determination unit to satisfy the predetermined condition to learn the learning data. The first training unit 135 may perform this process of the determination unit.

8. Configuration of Execution Control Apparatus

Hereinabove, the description has focused on the information processing device 100 having the optimizer OP function, which is a function of performing the first optimization algorithm to the fifth optimization algorithm and the mask target optimization algorithm. Hereinafter, the execution control apparatus 200 will be described. First, the background to the realization of the execution control apparatus 200 will be described.

For example, in a case where a certain object is predicted using a trained model, a computer performs a prediction process of whether certain image data is the same as the correct image data by using the trained model. This prediction process includes, for example, a plurality of processes such as a process of extracting features from an image, that is, from a two-dimensional array of pixels, a process of detecting a portion having a matching feature from another image, or the like.

Each of processes included in the prediction process is executed by a processor included in the computer, in which the processing time spent on the entire prediction process varies depending on which of the devices constituting the processor performs which process.

Therefore, in order to further reduce the processing time spent on the entire prediction process, it would be important to optimize the execution subject of the process so as to assign the optimum device (arithmetic unit) for executing the process to each of the processes included in the prediction process. However, it is impossible for a computer to dynamically judge the optimal execution subject.

Based on such a premise, the execution control apparatus 200 performs a process of optimizing an execution subject that executes a process using a model (for example, a process of predicting a specific target). Specifically, the execution control apparatus 200 decides an execution subject to execute a process using the model (for example, a process of predicting a specific target) based on the features of the trained model, and optimizes the execution subject. Accordingly, the execution control apparatus 200 has an execution subject optimization algorithm.

Figures 17, 18:
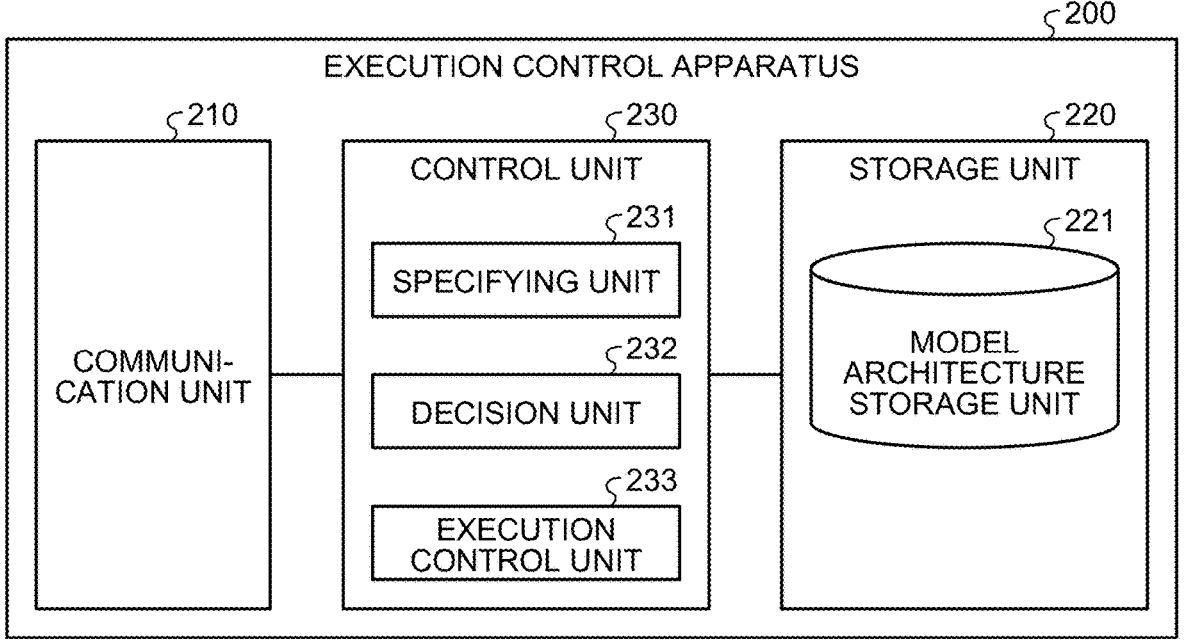
FIG. 17 is a diagram illustrating a configuration example of an execution control apparatus according to the embodiment.
FIG. 18 illustrates an example of a model architecture storage unit according to the embodiment.

First, the execution control apparatus 200 according to the embodiment will be described with reference to FIG. 17. FIG. 17 is a diagram illustrating a configuration example of the execution control apparatus 200 according to the embodiment. As illustrated in FIG. 17, the execution control apparatus 200 includes a communication unit 210, a storage unit 220, and a control unit 230.

(Storage Unit 220)

The storage unit 220 is actualized by a semiconductor memory element such as RAM and flash memory, or a storage device such as a hard disk and an optical disk. The storage unit 120 includes a model architecture storage unit 221.

(Model Architecture Storage Unit 221)

The model architecture storage unit 221 stores architectures of neural networks. Here, FIG. 18 illustrates an example of the model architecture storage unit 221 according to the embodiment. In the example of FIG. 18, the model architecture storage unit 221 has items such as "model ID" and "architecture information".

The "model ID" indicates identification information that identifies the model. The "architecture information" is information indicating the features of the model identified by the "model ID". Specifically, the "architecture information" is information indicating the overall structure including the learning mechanism by the model identified by the "model ID".

The example of FIG. 18 illustrates an example in which the model ID "MD #1" and the architecture information "architecture #1" are associated with each other. This example illustrates an example in which the architecture of the model identified by the model ID "MD #1" is "architecture #1". While FIG. 18 illustrates the architecture of the neural network conceptually as "architecture #1", proper information indicating neural network architecture is registered as architecture, in practice.

(Control Unit 230)

The control unit 230 is actualized by executing various programs stored in the storage device inside the execution control apparatus 200 by the CPU, MPU, or the like, using the RAM as a work area. Furthermore, the control unit 130 is realized by, for example, an integrated circuit such as an ASIC or an FPGA.

As illustrated in FIG. 17, the control unit 230 has a specifying unit 231, a decision unit 232, and an execution control unit 233, and implements or executes the functions and operations of information processing described below. The internal configuration of the control unit 230 is not limited to the configuration illustrated in FIG. 17, and may be any other configuration as long as it performs information processing described below. Furthermore, the connection relationship of each processing unit included in the control unit 230 is not limited to the connection relationship illustrated in FIG. 17, and may be other connection relationships.

(Specifying Unit 231)

The specifying unit 231 specifies the features of a model (trained model) to be used when a plurality of arithmetic units having different architectures each executes a predetermined process (for example, a process such as estimation using a model). For example, the specifying unit 231 specifies the features of a plurality of processes executed as a model, as the features of the model.

(Decision Unit 232)

The decision unit 232 decides an arithmetic unit as an execution target, that is, which of the plurality of arithmetic units is to execute the process using the model based on the features of the model specified by the specifying unit 231. For example, the decision unit 232 decides an arithmetic unit as an execution target to execute a process, for each of a plurality of processes, from among the plurality of arithmetic units, based on the features of the plurality of processes specified by the specifying unit 231.

For example, the decision unit 232 decides an arithmetic unit as an execution target from among a plurality of arithmetic units, namely, a first arithmetic unit which is guaranteed to output an identical value when an identical process is executed using identical data, and a second arithmetic unit which is not guaranteed to output an identical value when an identical process is executed using identical data.

Furthermore, for example, the decision unit 232 decides the arithmetic unit as an execution target from among a plurality of arithmetic units, namely, the first arithmetic unit that performs scalar operations or the second arithmetic unit that performs vector operations.

Furthermore, for example, the decision unit 232 decides the arithmetic unit as an execution target from among the plurality of arithmetic units, namely, the first arithmetic unit adopting an out-of-order method or the second arithmetic unit not adopting the out-of-order method.

That is, the decision unit 232 decides the arithmetic unit as the execution target from either a central processing unit (CPU) having a branch prediction function as the first arithmetic unit or an image arithmetic unit (GPU) having no branch prediction function as the second arithmetic unit. For example, when the model is a model for multi-class classification, the decision unit 232 decides an image arithmetic unit as the arithmetic unit as an execution target. In contrast, when the model is a model for two-class classification, the decision unit 232 decides a central processing unit as the arithmetic unit as an execution target.

(Execution Control Unit 233)

The execution control unit 233 causes the arithmetic unit decided by the decision unit 232 to execute the process using a model.

[9-1. Example of Operation of Execution Control Apparatus]

Hereinafter, an example of processes performed by the execution control apparatus 200 using the optimization algorithm of the execution subject will be described.

There is an exemplary case where a user desires to operate a model having performance improved by fine tuning by the information processing device 100 described above, in a production environment (for example, a server or an edge device). Specifically, there is assumable case where the user desires to operate a model having performance improved by fine tuning by the information processing device 100 on a server corresponding to a predetermined service.

In the following, a case where the model (for example, the best model) is model MD1 (model identified by model ID "MD #1") which is a model for multi-class classification (pattern PT1) and a case where the model is model MD2 (model identified by model ID "MD #2") which is a model for two-class classification (pattern PT2) will be described separately.

Note that both the process using the model MD1 and the process using the model MD2 are prediction processes for predicting a predetermined target. Furthermore, in the above example, the prediction process using the model MD1 and the prediction process using the model MD2 are performed by a server (for example, an API server) corresponding to the production environment of the user.

(Pattern PT1)

The specifying unit 231 refers to the model architecture storage unit 221 using the model ID "MD #1" and specifies an architecture of the neural network corresponding to the model MD1. For this architecture, an arithmetic unit as an execution target that executes a process is defined for each of a plurality of processes executed as a model (for example, a process of extracting features from an image and a process of detecting a part having matching features from another image). For example, in such an architecture, only one of a GPU and a CPU is defined as the arithmetic unit as an execution target to execute the process, for each of the plurality of processes executed as a model. Therefore, the specifying unit 231 specifies, for example, an architecture indicating each of processes included in a prediction process among the architectures of the neural network corresponding to the model MD1.

Furthermore, the decision unit 232 decides the arithmetic unit as an execution target, that is, which arithmetic unit of the GPU or the CPU is to execute the process, based on the architecture for each of processes specified by the specifying unit 231. For example, when execution of a process A1, which is one process specified by the specifying unit 231, by the GPU is defined for the architecture corresponding to the process A1, the decision unit 232 decides the GPU as the arithmetic unit as an execution target to execute the process A1. In addition, for example, when execution of a process A2, which is another process specified by the specifying unit 231, by the CPU is defined for the architecture corresponding to the process A2, the decision unit 232 decides the CPU as the arithmetic unit of an execution target to execute the process A2.

In such a state, for example, the execution control unit 233 controls the user's API server to have the GPU execute the process A1 and the CPU execute the process A2.

(Pattern PT2)

The specifying unit 231 refers to the model architecture storage unit 221 using the model ID "MD #2" and specifies an architecture of the neural network corresponding to the model MD2. Similar to this architecture, an arithmetic unit as an execution target that executes the process is defined for each of a plurality of processes executed as a model (for example, a process of extracting features from an image and a process of detecting a part having matching features from another image). That is, in such an architecture, only one of a GPU and a CPU is defined as the arithmetic unit as an execution target to execute the process, for each of the plurality of processes executed as a model. Accordingly, the specifying unit 231 specifies, for example, an architecture indicating each of processes included in a prediction process among the architectures of the neural network corresponding to the model MD2.

Furthermore, the decision unit 232 decides the arithmetic unit as an execution target, that is, which arithmetic unit of the GPU or the CPU is to execute the process, based on the architecture for each of processes specified by the specifying unit 231. For example, when execution of a process B1, which is one process specified by the specifying unit 231, by the CPU is defined for the architecture corresponding to the process B1, the decision unit 232 decides the CPU as the arithmetic unit of an execution target to execute the process B1. In addition, for example, when execution of a process B2, which is another process specified by the specifying unit 231, by the GPU is defined for the architecture corresponding to the process B2, the decision unit 232 decides the GPU as the arithmetic unit of an execution target to execute the process B2.

The processes of the decision unit 232 will be described in more detail with reference to FIG. 19. FIG. 19 is a diagram illustrating an example of a model architecture associated with information indicating an execution target arithmetic unit. FIG. 19 is supposed to illustrate an architecture corresponding to the process A1 among the architectures of the neural network corresponding to the model MD1. As illustrated in FIG. 19, information indicating the arithmetic unit as an execution target to execute the process A1 is preliminarily incorporated in the architecture corresponding to the process A1 among the neural network architectures corresponding to the model MD1. Specifically, in the example of FIG. 19, the architecture corresponding to the process A1 is preliminarily associated with a description that defines execution of the process A1 by the GPU. Accordingly, the decision unit 232 can decide the GPU as the arithmetic unit as an execution target to execute the process A1 based on such a description.

In order for the execution control apparatus 200 to operate as described above using the execution subject optimization algorithm, information indicating an arithmetic unit as an execution target to undergo execution of the process needs to be incorporated for each of architectures linked to each of the processes using the model among the neural network architectures corresponding to the trained model. That is, for each of processes, the arithmetic unit as an execution target to execute the process needs to be given as a rule-based system.

Therefore, in order to realize such a rule based system, an experiment was conducted to verify how much difference occurs in processing time when processes using a model for multi-class classification are executed individually by a GPU and a CPU. In addition, an experiment was conducted to verify how much difference occurs in the processing time when processes using a model for two-class classification are executed individually by a GPU and a CPU.

[9-2. Example of Experimental Results on Execution Subject Optimization Algorithm]

Hereinafter, using FIGS. 20 to 24, an example of effects when the processes using the model are executed individually by a GPU and a CPU will be described.

(Model for Multi-Class Classification)

First, with reference to FIGS. 20 and 21, an example of effects when the processes using a model for multi-class classification are executed individually by a GPU and a CPU will be described. Here, for each of models for multi-class classification for each of predetermined services, an experiment was conducted to examine the degree of improvement in the performance (processing time) by controlling the GPU side to execute the processes, which are arbitrary combinations of processes initially executed on the CPU side, for each of the combinations. FIG. 20 illustrates the experimental results at this time.

FIG. 20 is a diagram illustrating a state of performance improvement by experiments using a model for multi-class classification. For example, FIG. 20 illustrates individual elements when the best result is obtained among the experimental results obtained from the above experiment.

In the example of FIG. 20, for the model corresponding to the service SV1 (model "1"), an experiment was conducted to examine the degree of improvement in the performance (processing time) by controlling the GPU side to execute the processes, which are arbitrary combinations of processes initially executed on the CPU side, for each of the combinations. As illustrated in FIG. 20, by controlling the GPU side to execute some of the processes initially performed on the CPU side, it is found that the performance is improved by up to "30.8%" (processing rate improvement or processing time reduction by "30.8%") after optimization as compared to before the optimization. It was also found that that the GPU usage rate had changed from "28%" (before optimization) to "38%" (after optimization).

Moreover, in the example of FIG. 20, for the model corresponding to the service SV2 (model "2"), an experiment was conducted to examine the degree of improvement in the performance (processing time) by controlling the GPU side to execute the processes, which are arbitrary combinations of processes initially executed on the CPU side, for each of the combinations. As illustrated in FIG. 20, by controlling the GPU side to execute some of the processes initially performed on the CPU side, it is found that the performance is improved by up to "44.2%" (processing rate improvement or processing time reduction by "44.2%") after optimization as compared to before the optimization. It was also found that that the GPU usage rate had changed from "15%" (before optimization) to "42%" (after optimization).

Moreover, in the example of FIG. 20, for the model corresponding to the service SV3 (model "3"), an experiment was conducted to examine the degree of improvement in the performance (processing time) by controlling the GPU side to execute the processes, which are arbitrary combinations of processes initially executed on the CPU side, for each of the combinations. As illustrated in FIG. 20, by controlling the GPU side to execute some of the processes initially performed on the CPU side, it is found that the performance is improved by up to "12.3%" (processing rate improvement or processing time reduction by "12.3%") after optimization as compared to before the optimization. It was also found that the GPU usage rate had changed from "15%" (before optimization) to "18%" (after optimization).

Moreover, in the example of FIG. 20, for the model corresponding to the service SV4 (model "4"), an experiment was conducted to examine the degree of improvement in the performance (processing time) by controlling the GPU side to execute the processes, which are arbitrary combinations of processes initially executed on the CPU side, for each of the combinations. As illustrated in FIG. 20, by controlling the GPU side to execute some of the processes initially performed on the CPU side, it is found that the performance is improved by up to "65.1%" (processing rate improvement or processing time reduction by "65.1%") after optimization as compared to before the optimization. It was also found that the GPU usage rate had changed from "54%" (before optimization) to "56%" (after optimization).

Moreover, as illustrated in the example of FIG. 20, for the model corresponding to the service SV5 (model "5"), an experiment was conducted to examine the degree of improvement in the performance (processing time) by controlling the GPU side to execute the processes, which are arbitrary combinations of processes initially executed on the CPU side, for each of the combinations. As illustrated in FIG. 20, by controlling the GPU side to execute some of the processes initially performed on the CPU side, it is found that the performance is improved by up to "39.1%" (processing rate improvement or processing time reduction by "39.1%") after optimization as compared to before the optimization. It was also found that the GPU usage rate had changed from "39%" (before optimization) to "45%" (after optimization).

In addition, according to the above experimental results, even when the model differs depending on the service, for the model for multi-class classification, it turns out that the performance can reliably be improved, with an average performance improvement by "38.8%", by executing, on the GPU side, some of the processes initially performed on the CPU side.

In addition, according to the experimental results illustrated in FIG. 20, the best optimization can be achieved by using a rule-based system incorporating information indicating the arithmetic unit "GPU" into an architecture linked to the process which has been executed by a GPU when the best performance was achieved, among the neural network architectures corresponding to the model for multi-class classification.

Next, an example of experimental details will be described focusing on an experiment conducted for the model corresponding to the service SV1 (model "1") among the experiments conducted for individual models corresponding to individual services illustrated in FIG. 20. FIG. 21 is a diagram illustrating an example of experimental details regarding an experiment conducted onto a model corresponding to the service SV1. FIG. 21 illustrates the details of the experiment when the performance was improved by up to "30.8%".

Figure 21:
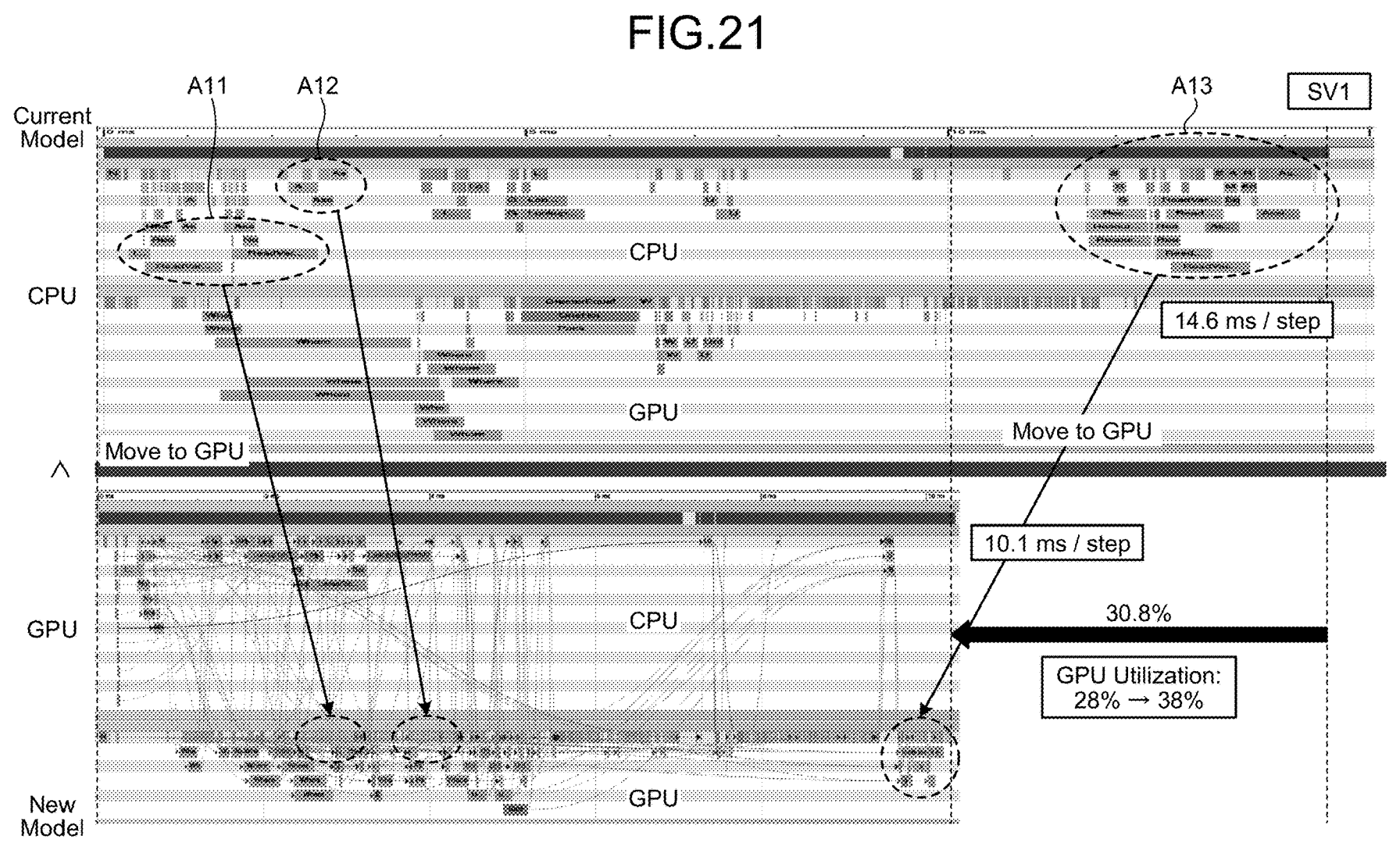

The example of FIG. 21 illustrates an example of conducting an experiment of forcibly transferring process A11, process A12, and process A13 out of the arbitrarily combined processes initially conducted on the CPU side, to the GPU side so that the processes are to be performed on the GPU side.

In this manner, in the model corresponding to service SV1, which is a model for multi-class classification, the execution control apparatus 200 will be able to have a higher performance optimization algorithm by incorporating information indicating the arithmetic unit "GPU" into the architecture linked with the process A11, process A12, and the process A13. Accordingly, as a result, for example, it is possible to effectively improve the performance of a user-side computer (for example, a server or an edge device) used for operating the model corresponding to the service SV1 in the production environment.

(Model for Two-Class Classification)

Next, with reference to FIGS. 22 and 23, an example of effects when the processes using a model for two-class classification are executed individually by a CPU and a GPU will be described. Here, for each of models for two-class classification for each of predetermined services, an experiment was conducted to examine the degree of improvement in the performance (processing time) by controlling the CPU side to execute specific processes initially executed on the GPU side. FIG. 22 illustrates the experimental results at this time.

FIG. 22 is a diagram illustrating a state of performance improvement by experiments using a model for two-class classification. For example, FIG. 22 illustrates individual elements when the best result is obtained among the experimental results obtained from the above experiment.

In the example of FIG. 22, for the model corresponding to the service SV6 (model "6"), an experiment was conducted to examine the degree of improvement in the performance (processing time) by controlling the CPU side to execute specific processes initially executed on the GPU side. As illustrated in FIG. 22, by controlling the CPU side to execute specific processes initially performed on the GPU side, it is found that the performance is improved by up to "50.3%" (processing rate improvement or processing time reduction by "50.3%") after optimization as compared to before the optimization.

Moreover, in the example of FIG. 22, for the model corresponding to the service SV7 (model "7"), an experiment was conducted to examine the degree of improvement in the performance (processing time) by controlling the CPU side to execute specific processes initially executed on the GPU side. As illustrated in FIG. 22, by controlling the CPU side to execute specific processes initially performed on the GPU side, it is found that the performance is improved by up to "30.2%" (processing rate improvement or processing time reduction by "30.2%") after optimization as compared to before the optimization.

In addition, according to the above experimental results, even when the model differs depending on the service, for the model for two-class classification, it turns out that the performance can reliably be improved by executing, on the CPU side, specific processes initially performed on the GPU side. In addition, it was found that parallel computing by the CPU is effective for most of the processes using the model for two-class classification.

In addition, according to the experimental results illustrated in FIG. 22, the best optimization can be achieved by using a rule-based system incorporating information indicating the arithmetic unit "CPU" into an architecture linked to the process which has been executed by a CPU when the best performance was achieved, among the neural network architectures corresponding to the model for two-class classification.

Next, an example of experimental details will be described focusing on an experiment conducted for the model corresponding to the service SV6 (model "6") among the experiments conducted for individual models corresponding to individual services illustrated in FIG. 22. FIG. 23 is a diagram illustrating an example of the experimental details regarding an experiment conducted onto a model corresponding to the service SV6. FIG. 23 illustrates the details of the experiment when the performance was improved by up to "50.3%".

Figure 23:
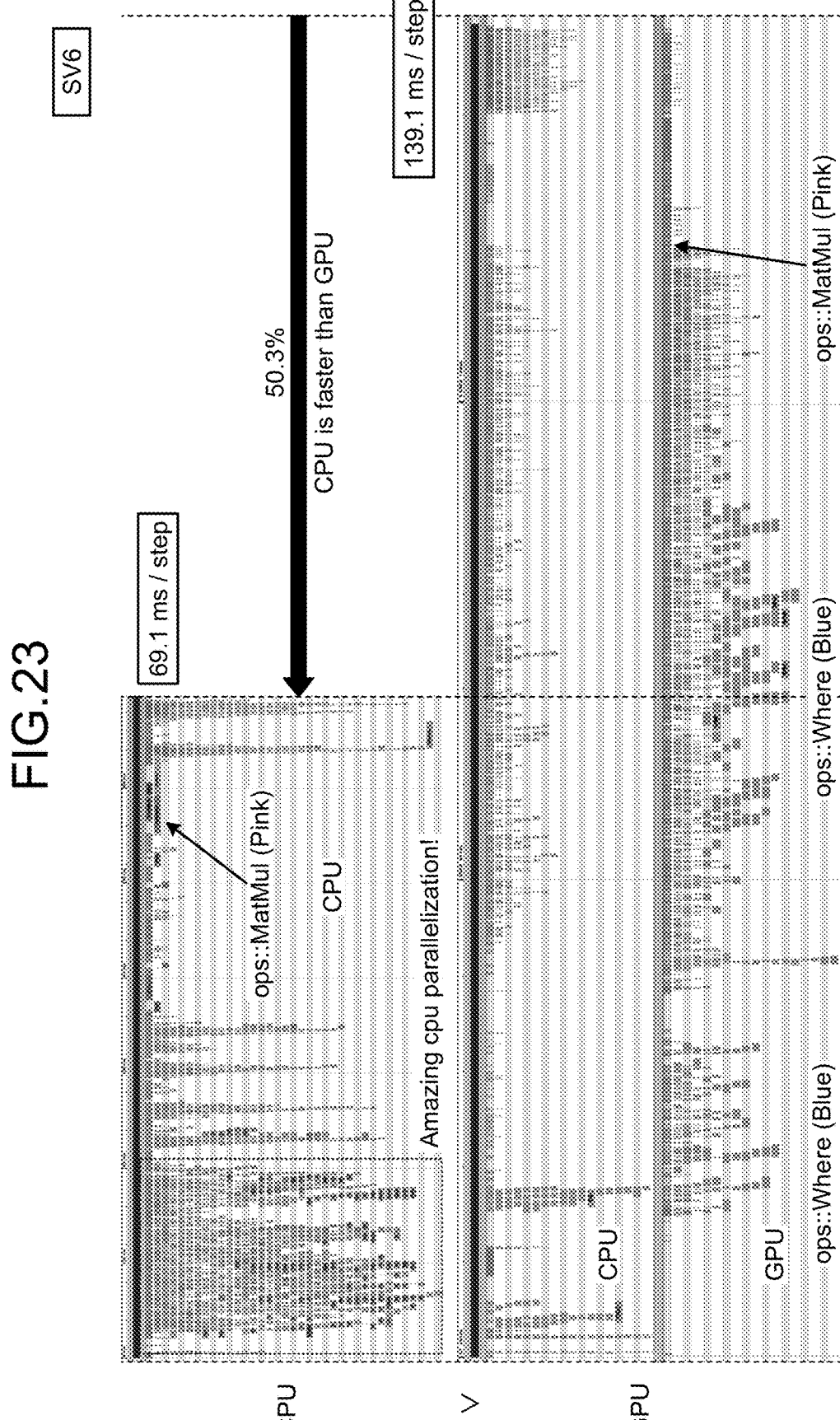
FIG. 23 is a diagram illustrating an example of experimental details of an experiment conducted onto a model corresponding to service SV6.

The example of FIG. 23 illustrates an example of experiment of controlling the CPU side to execute the process requiring a MATMUL computation, out of the processes initially performed on the GPU side.

In this manner, in the model corresponding to the service SV6, which is a model for two-class classification, the execution control apparatus 200 will be able to have a higher performance optimization algorithm by incorporating information indicating the arithmetic unit "CPU" into the architecture linked with the process requiring MATMUL computation. Accordingly, as a result, for example, it is possible to effectively improve the performance of a user-side computer (for example, a server or an edge device) used for operating the model corresponding to the service SV6 in the production environment.

In addition, regardless of the model corresponding to the service SV6, with the use of a rule-based system by incorporating the information indicating the arithmetic unit "CPU" into the architecture linked with the process requiring MATMUL computation, out of the architectures of the model for two-class classification, it is possible to effectively improve the performance of the user's computer (for example, server or edge device).

10. Processing Flow of Information Processing Device

Hereinabove, algorithms of the optimization processes performed by the information processing device 100 and the execution control apparatus 200 have been described. Next, a procedure of the processes executed by the information processing device 100 will be described. Specifically, a procedure in which the information processing device 100 performs a series of tuning (fine tuning according to the embodiment) processes including the first optimization process to the fifth optimization process will be described.

Figure 24:
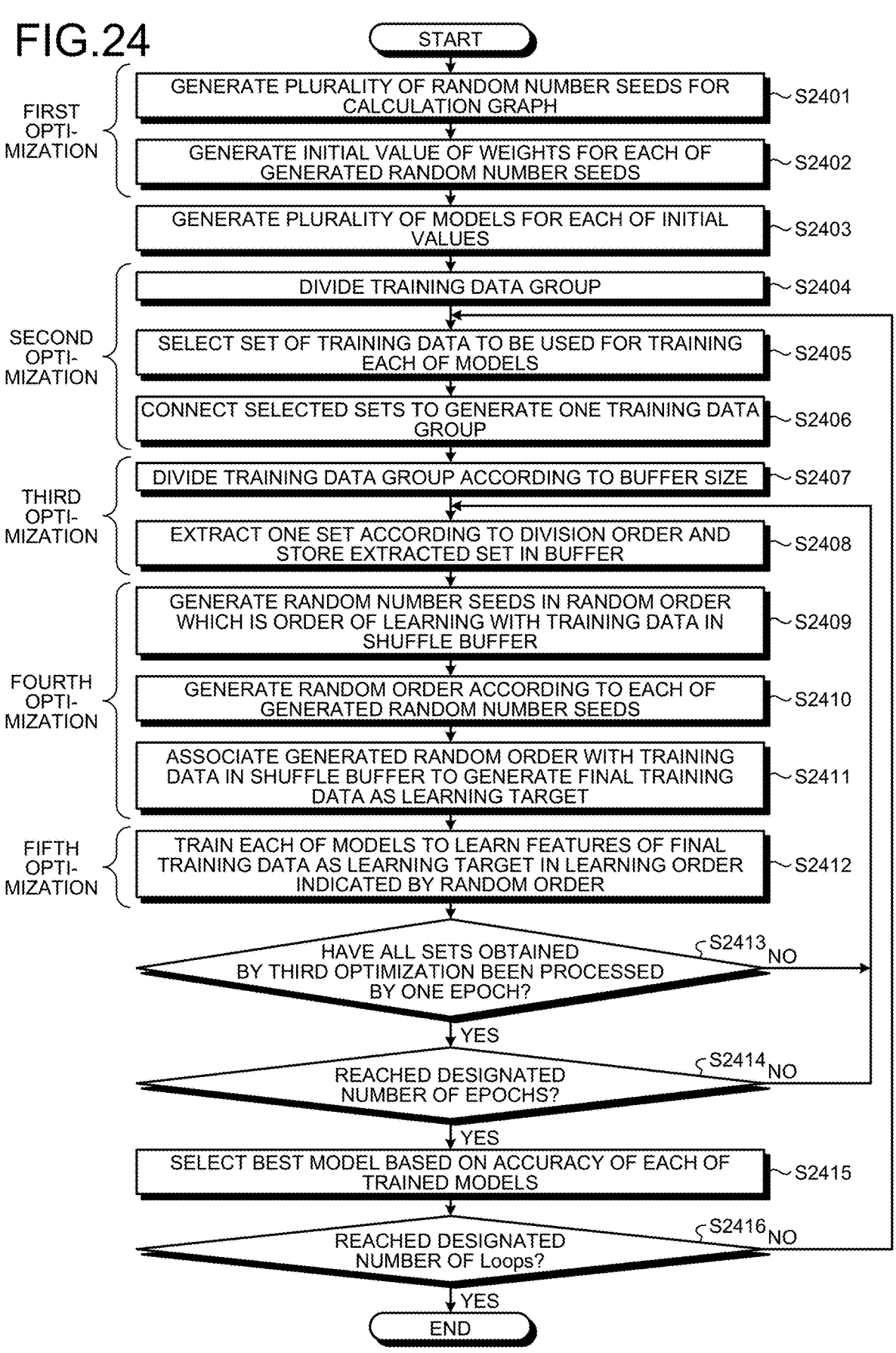
FIG. 24 is a flowchart illustrating an example of a flow of fine tuning according to the embodiment.

FIG. 24 is a flowchart illustrating an example of a flow of fine tuning according to the embodiment. Note that FIG. 24 illustrates a portion of the fine tuning according to the embodiment that is executed by the optimization function (optimizer OP) of the information processing device 100.

First, the generation unit 131 performs steps S2401 and S2402 using an algorithm (first optimization algorithm) that optimizes the random number seed used to generate a model (calculation graph).

Specifically, the generation unit 131 generates a plurality of random number seeds for a calculation graph (step S2401). For example, the generation unit 131 generates a plurality of random number seeds optimized so that the initial values of weight have a uniform distribution. In addition, the generation unit 131 generates an initial value of the weight for each of the generated random number seeds (step S2402). For example, the generation unit 131 generates a weight for each of a plurality of pseudo-random numbers obtained as an output by inputting a generated random number seed into a random function, which are pseudo-random numbers in a range of a uniform distribution. In addition, the initial values of the weight obtained in this manner also have a uniform distribution.

Then, the generation unit 131 generates a plurality of models according to individual initial values generated in step S2402 (step S2403). In the example of FIG. 24, the weight is illustrated as an example of the model parameter. However, the model parameter may be a weight or a bias, for example. In such a case, the generation unit 131 may generate a model having a set of model parameters having different combinations (for example, a set of weight and bias) for each of the sets, among the initial value group of the model parameters generated in step S2402.

Next, the first data control unit 133 performs the following steps S2404 to S2406 using an algorithm for optimizing the training data used for training the model (second optimization algorithm).

Specifically, the first data control unit 133 divides the training data group sorted so that the included pieces of training data are arranged in chronological order, into a predetermined number of sets (step S2404). The first data control unit 133 then selects sets of training data to be used for training each of models generated in step S2403 from among the sets obtained by the division in step S2404 (step S2405). For example, the first data control unit 133 randomly selects sets to be used for training the model from all the sets obtained by the division in step S2404 until the number of the selected sets reaches a predetermined number. For example, the first data control unit 133 randomly selects sets from among the sets obtained by the division in step S2404, being unselected sets at a current point up to the time until the designated number of loops is reached. In addition, the first data control unit 133 may randomly select a set in order from the newer sets in time series of the learning data included, from among the sets obtained by the division in step S2404, being the unselected sets at a current point up to the time until the designated number of loops is reached, until a predetermined number (for example, the number designated by the user) is reached.

Subsequently, the first data control unit 133 generates one training data group by connecting the sets of training data selected in step S2405 (step S2406). For example, the first data control unit 133 generates one training data group by connecting the sets selected in step S2405 in the order of current selection.

Next, the second data control unit 134 performs the following steps S2407 and S2408 using an algorithm for optimizing the shuffle buffer size (third optimization algorithm).

Specifically, the second data control unit 134 divides the training data group generated by the first data control unit 133 in step S2406 (step S2407). For example, the second data control unit 134 divides the training data group generated by the first data control unit 133 as a process of generating training data having a size equal to the size of the shuffle buffer. For example, the second data control unit 134 can divide the training data group generated by the first data control unit 133 into a predetermined number of sets for each of divided sets so that a predetermined number of pieces of training data (for example, a number designated by the user) is equally included in each of the sets after the division.

The second data control unit 134 then extracts one set according to the order (division order) obtained by the division at this time from among the sets obtained by the division in step S2407, and stores the training data contained in the extracted one set into the shuffle buffer as training data as a learning target (step S2408). For example, the second data control unit 134 extracts one set according to the division order from among the unprocessed sets that are obtained by the division in step S2407 and are not used for learning at the current point. Subsequently, the second data control unit 134 stores the extracted one set into the shuffle buffer as the training data as a learning target, which is the training data used in the current iterative learning.

Next, the first training unit 135 performs the following steps S2409 to S2411 using an algorithm (fourth optimization algorithm) of optimizing the random number seed (random number seed of data shuffle) when shuffling and determining the learning order at training with the training data in the shuffle buffer in order.

Specifically, the first training unit 135 generates random number seeds in a random order, which is the learning order of the training data in the shuffle buffer (step S2409). For example, the first training unit 135 generates a random number seed (original seed of random order) in the current learning for each of epochs for iterative learning so as to prevent occurrence of a bias in the random order associated with each of pieces of the training data between the epochs.

Moreover, the first training unit 135 generates a random order according to each of the random number seeds generated in step S2409 (step S2410). For example, the first training unit 135 generates a random order by inputting each of random number seeds into a random function. Then, the first training unit 135 associates the generated random order with the training data in the shuffle buffer to generate the final training data as the learning target in the shuffle buffer (step S2411).

In addition, the first training unit 135 trains each of models to learn the features of the final training data as a learning target in the learning order indicated by the random order determined in step S2410 (step S2412). In addition, in repetition of trials to search for hyperparameters in the learning here, in order to implement efficient search, the first training unit 135 executes the fifth optimization as the optimization of the trial by pruning so as to perform early stopping without continuing to the end, on the trials that are not expected to produce good results.

Furthermore, the first training unit 135 performs iterative learning by a designated number of epochs for the set obtained by the division in step S2407, with steps S2408 to S2412 defined as one epoch. Specifically, with steps S2408 to S2412 defined as one epoch, the first training unit 135 performs iterative learning by the number of epochs designated by the user using the set obtained by the division in step S2407.

Therefore, next, was the first training unit 135 determines whether all the sets obtained by the above third optimization (specifically, the sets obtained by the division in step S2407) have been processed by one epoch (step S2413). Specifically, the first training unit 135 determines whether all the sets obtained by the division in step S2407 have been used for the learning with steps S2408 to S2412 defined as one epoch. While continuously determining that all the sets obtained by the division in step S2407 have not been processed by one epoch (step S2413; No), the first training unit 135 repeats the series of processes in step S2408 to step S2412 until all the sets can be determined to have been processed by one epoch.

In contrast, having determined that all of the sets obtained by the division in step S2407 have been processed by one epoch (step S2413; Yes), the first training unit 135 determines whether the sets obtained by the division in step S2407 have reached the designated number of epochs (step S2414). Specifically, the first training unit 135 determines whether the iterative learning has been performed for the designated number of epochs using the sets obtained by the division in step S2407.

While continuously determining that the designated number of epochs has not been reached (step S2414; No), the first training unit 135 repeats a series of processes from step S2408 until the designated number of epochs can be determined to be reached.

In contrast, when it is determined that the designated number of epochs has been reached (step S2414; Yes), the model selection unit 136 selects the best model at the current point based on the accuracy of each of the trained models at the current point (step S2415). Here, as described with FIG. 11, in order to obtain a model with higher accuracy, a series of processes from step S2408 are repeated until the designated number of loops is reached.

Accordingly, the first training unit 135 next determines whether the number of loops, which is the number of times designated to repeat (loop) the series of processes from step S2408, has been reached (step S2416). While continuously determining that the designated number of times of loops has not been reached (step S2416; No), the first training unit 135 repeats a series of processes from step S2408. In contrast, when it is determined that the designated number of loops has been reached (step S2416; Yes), the first training unit 135 ends the process at this point.

Furthermore, at this time when the processing is completed, the best model selected by the model selection unit 136 can be the model with highest accuracy among the models selected for each of loops.

Furthermore, the second training unit 137 corresponds to a selector function (selector SE) of the information processing device 100 in the fine tuning according to the embodiment, and the tuning process described in steps S21 to S24 in FIG. 3 will continue, although not illustrated in FIG. 24. Specifically, the second training unit 137 performs the tuning process on the best model selected by the model selection unit 136.

11. Example of Experimental Results Related to Fine Tuning

Subsequently, an example of effects of execution of the fine tuning according to the embodiment will be described with reference to FIGS. 25A to 25C.

Figure 25A:
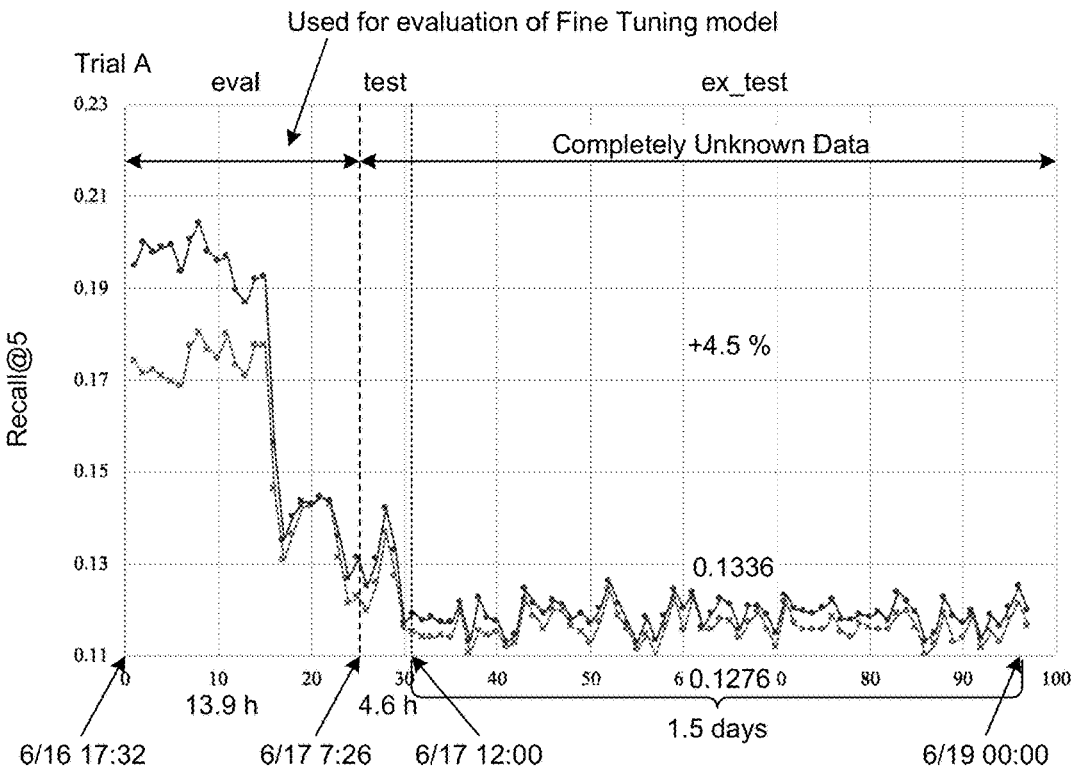
FIG. 25A is a diagram illustrating a comparative example (1) in which the accuracy of the model is compared between a case where fine tuning according to the embodiment is executed and a case where the fine tuning according to the embodiment is not executed.

FIG. 25A is a diagram illustrating a comparative example (1) in which the accuracy of the model is compared between a case where the fine tuning according to the embodiment is executed and a case where the fine tuning according to the embodiment is not executed. Specifically, FIG. 25A illustrates a comparative example illustrating a result of comparison between the evaluation results corresponding to trial A when fine tuning was executed and the evaluation results corresponding to trial A when fine tuning was not executed.

Corresponding to the example of FIG. 4, in the example of FIG. 25A, accuracy of the best model was evaluated using the data from "June 16th 17:32" to "June 17th 7:26" out of data sets, as evaluation data. In addition, in the example of FIG. 25A, the accuracy of the best model was evaluated using the data from "June 17th 7:26" to "June 19th 0:00" out of data sets, as the testing data with unknown labels. According to the example of FIG. 25A, the evaluation result obtained from such evaluation has revealed that the accuracy of the best model is improved by "4.5%" by performing the fine tuning according to the embodiment.

Figure 25B:
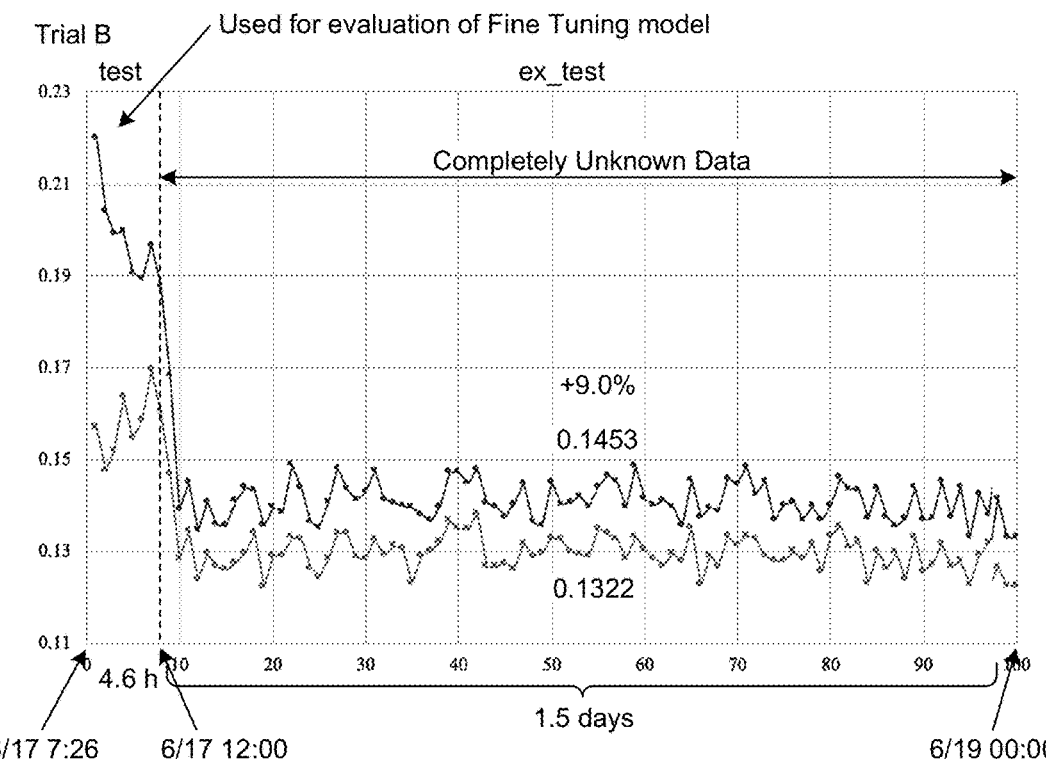
FIG. 25B is a diagram illustrating a comparative example (2) in which the accuracy of the model is compared between a case where fine tuning according to the embodiment is executed and a case where the fine tuning according to the embodiment is not executed.

FIG. 25B is a diagram illustrating a comparative example (2) in which the accuracy of the model is compared between a case where the fine tuning according to the embodiment is executed and a case where the fine tuning according to the embodiment is not executed. Specifically, FIG. 25B illustrates a comparative example illustrating a result of comparison between the evaluation results corresponding to trial B when fine tuning was executed and the evaluation results corresponding to trial B when fine tuning was not executed.

Corresponding to the example of FIG. 4, in the example of FIG. 25B, accuracy of the best model was evaluated using the data from "June 17th 7:26" to "June 17th 12:00" out of data sets, as evaluation data. In addition, in the example of FIG. 25B, the accuracy of the best model was evaluated using the data from "June 17th 12:00" to "June 19th 0:00" out of the data sets, as the testing data with unknown labels. According to the example of FIG. 25B, the evaluation result obtained from such evaluation has revealed that the accuracy of the best model is improved by "9.0%" by performing the fine tuning according to the embodiment.

Figure 25C:
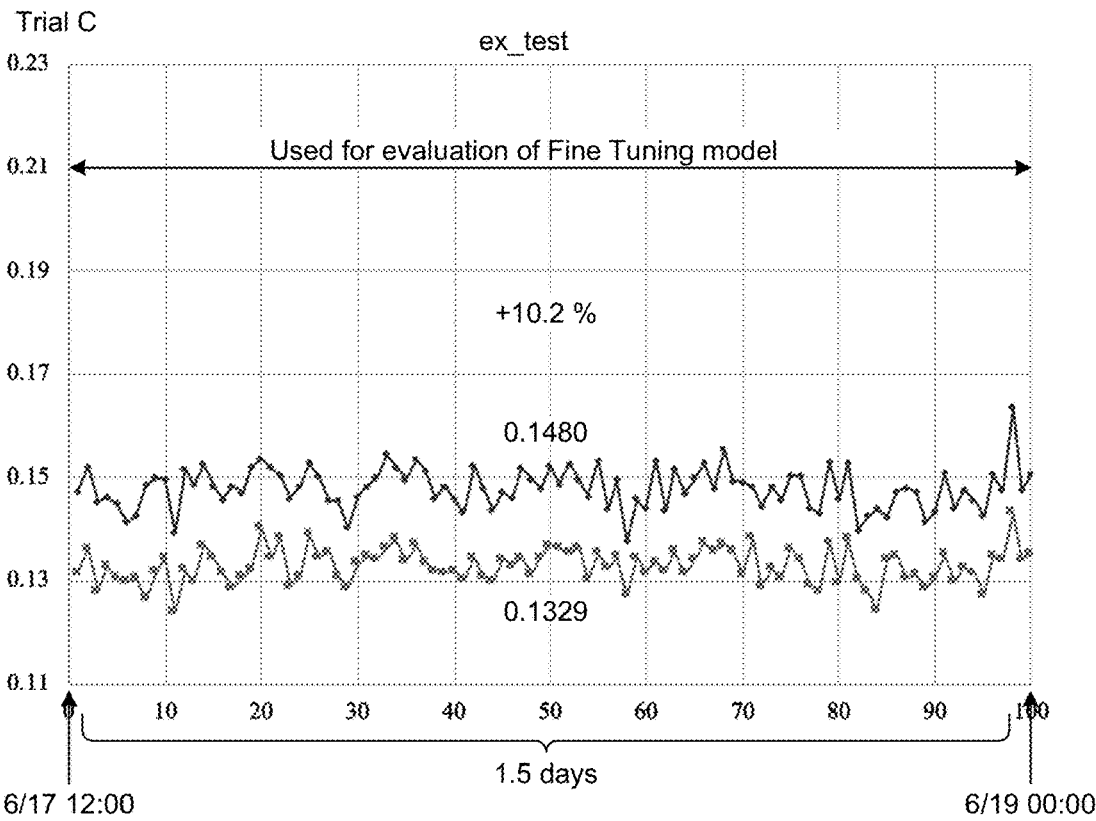
FIG. 25C is a diagram illustrating a comparative example (3) in which the accuracy of the model is compared between a case where fine tuning according to the embodiment is executed and a case where the fine tuning according to the embodiment is not executed.

FIG. 25C is a diagram illustrating a comparative example (3) in which the accuracy of the model is compared between a case where the fine tuning according to the embodiment is executed and a case where the fine tuning according to the embodiment is not executed. Specifically, FIG. 25C illustrates a comparative example illustrating a result of comparison between the evaluation results corresponding to trial C when fine tuning was executed and the evaluation results corresponding to trial C when fine tuning was not executed.

Corresponding to the example of FIG. 4, in the example of FIG. 25C, accuracy of the best model was evaluated using the data from "June 17th 12:00" to "June 19th 0:00" out of data sets, as evaluation data. According to the example of FIG. 25C, the evaluation result obtained from such evaluation has revealed that the accuracy of the best model is improved by "10.2%" by performing the fine tuning according to the embodiment.

In addition, according to the example of FIGS. 25A to 25C, the effects of fine tuning ware verified from various aspects by appropriately changing the time ranges in consideration of the setting of time ranges; namely, how to set the time range to be defined as training data, the time range to be defined as evaluation data, and the time range to be defined as evaluation data with unknown labels, within the data sets in time series.

In addition, the evaluation results illustrated in FIGS. 25A to 25B have revealed that no matter how the data set is used for the intended use, it is possible to maintain the performance improvement by execution of fine tuning according to the embodiment compared with the case where the fine tuning according to the embodiment is not executed. In this regard, it was demonstrated that the accuracy of the model can be improved by the information processing device 100 according to the embodiment.

12. Others

Furthermore, among the processes described in the above-described embodiment, all or a part of the processes described as being automatically performed can also be manually performed, or all or a part of the processes described as being manually performed can also be automatically performed using known methods. In addition, the processing procedure, specific names, and information including various types of data and parameters illustrated in the above descriptions and drawings can be arbitrarily altered or modified unless otherwise specified. For example, the various types of information illustrated in individual figures is not limited to the illustrated information.

Furthermore, individual components of each of the illustrated devices are given as a functional concept, and do not necessarily have to be physically configured as illustrated in the figures. That is, the specific form of distribution/integration of each of devices is not limited to the one illustrated in the figure. All or part of the device is functionally or physically distributed/integrated in arbitrary units depending on various loads and usage conditions.

In addition, the above-described embodiments can be appropriately combined as long as the processes do not contradict each other.

13. Program

Figure 26:
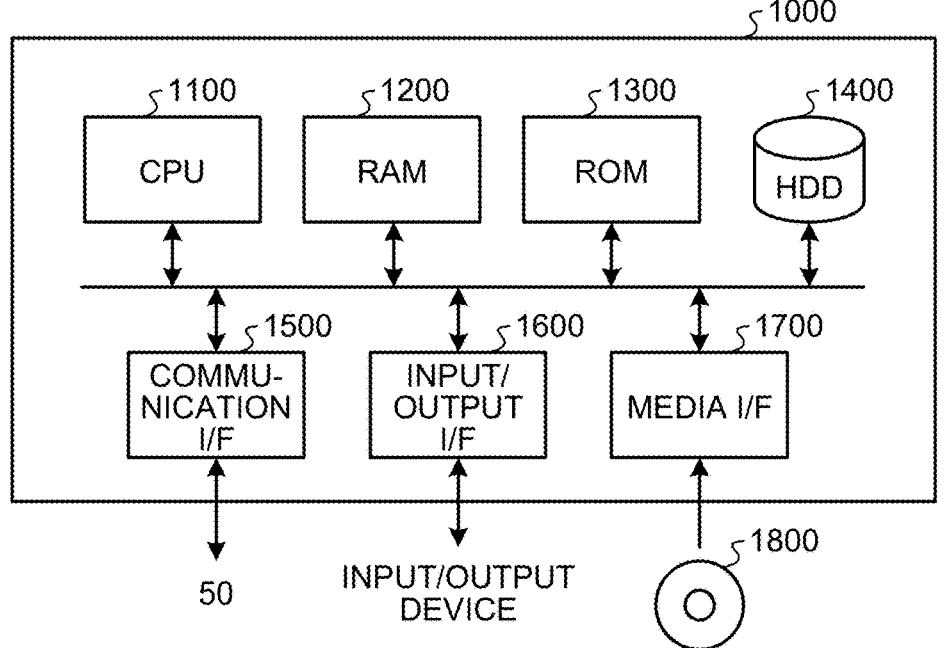
FIG. 26 is a hardware configuration diagram illustrating an example of a computer.

Furthermore, the information processing device 100 and the execution control apparatus 200 according to the above embodiment are actualized by a computer 1000 having a configuration as illustrated in FIG. 26, for example. FIG. 26 is a hardware configuration diagram illustrating an example of the computer 1000. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates based on the program stored in the ROM 1300 or the HDD 1400, and controls individual parts. The ROM 1300 stores a boot program executed by the CPU 1100 when the computer 1000 starts up, a program that depends on the hardware of the computer 1000, or the like.

The HDD 1400 stores a program executed by the CPU 1100, data used by such a program, or the like. The communication interface 1500 receives data from other devices via a communication network 50 and transfers the data to the CPU 1100, and transmits the data generated by the CPU 1100 to other devices via the communication network 50.

The CPU 1100 controls an output device such as a display or a printer and an input device such as a keyboard or a mouse via the input/output interface 1600. The CPU 1100 acquires data from the input device via the input/output interface 1600. Furthermore, the CPU 1100 outputs the generated data to the output device via the input/output interface 1600.

The media interface 1700 reads programs or data stored in a recording medium 1800 and provides the programs or data to the CPU 1100 via the RAM 1200. The CPU 1100 loads such a program from the recording medium 1800 onto the RAM 1200 via the media interface 1700, and executes the loaded program. The recording medium 1800 is an optical recording medium such as a Digital Versatile Disc (DVD) or Phase change rewritable Disk (PD), a magneto-optical recording medium such as a Magneto-Optical disk (MO), a tape medium, a magnetic recording medium, or a semiconductor memory, for example.

For example, when the computer 1000 functions as the information processing device 100 according to the embodiment, the CPU 1100 of the computer 1000 actualizes the function of the control unit 130 by executing the program loaded on the RAM 1200. In addition, the data in the storage unit 120 is stored in the HDD 1400.

Furthermore, for example, when the computer 1000 functions as the execution control apparatus 200 according to the embodiment, the CPU 1100 of the computer 1000 actualizes the function of the control unit 230 by executing the program loaded on the RAM 1200. In addition, the data in the storage unit 220 is stored in the HDD 1400.

The CPU 1100 of the computer 1000 reads these programs from the recording medium 1800 for execution, but as another example, these programs may be acquired from another device via the communication network 50.

14. Effects (Effect of One Aspect of Information Processing Device 100 According to Embodiment (Part 1))

As described above, the information processing device 100 (one example of the learning apparatus) according to the embodiment includes the generation unit 131, the first training unit 135, the model selection unit 136, and the second training unit 137. The generation unit 131 generates a plurality of models having different parameters. The first training unit 135 trains each of the plurality of models generated by the generation unit 131 to learn the features of a part of the predetermined learning data. The model selection unit 136 selects one of the models according to the accuracy of the model trained by the first training unit 135. The second training unit 137 trains the model selected by the model selection unit 136 to learn the features of the predetermined learning data.

According to such an information processing device 100, it is possible to provide a user with a model having improved accuracy and improved performance, making it possible to effectively support the user in actual application of the model to a specific service.

Furthermore, the generation unit 131 generates a plurality of input values to be input to a predetermined first function that calculates a random number value based on the input value, and generates, for each of the generated input values, a plurality of models having parameters corresponding to the random number values output from the predetermined first function when the input values have been input.

According to such an information processing device 100, the accuracy of the model can be improved.

Furthermore, the generation unit 131 generates, as input values to be input to the predetermined first function, a plurality of input values such that the random number value output by the predetermined first function satisfies a predetermined condition.

According to such an information processing device 100, it is possible to control the variation in the initial values of the model parameters, leading to the improvement of the accuracy of the model.

Moreover, the generation unit 131 generates a plurality of input values such that the random number value falls within a predetermined range.

According to such an information processing device 100, it is possible to control to achieve a uniform distribution of variation in the initial values of the model parameters, leading to the improvement of the accuracy of the model.

Furthermore, the generation unit 131 generates a plurality of input values such that the distribution of random number values has a predetermined probability distribution.

According to such an information processing device 100, it is possible to control to achieve a uniform distribution of variation in the initial values of the model parameters, leading to the improvement of the accuracy of the model.

Furthermore, the generation unit 131 generates a plurality of input values such that a mean value of the random number values becomes a predetermined value.

According to such an information processing device 100, it is possible to control to achieve a uniform distribution of variation in the initial values of the model parameters, leading to the improvement of the accuracy of the model.

Furthermore, the generation unit 131 selects, as a predetermined first function, a function in which the distribution of the random number values output when the input value has been input indicates a predetermined probability distribution and generates a plurality of models having parameters corresponding to the random number value output from the selected function.

According to such an information processing device 100, it is possible to control to achieve a uniform distribution of variation in the initial values of the model parameters, leading to the improvement of the accuracy of the model.

In addition, the first training unit 135 (an example of a selection unit) selects a plurality of models whose evaluation values for evaluating the accuracy satisfy predetermined conditions from among the trained models, and trains the plurality of selected models to learn the features of a part of the predetermined learning data.

According to such an information processing device 100, it is possible to treat the trials for searching hyperparameters such that the trials that satisfy the stop condition defined by using the evaluation value of the model are to be stopped early, while the trials that do not satisfy the stop condition (a plurality of models whose evaluation values for evaluating the accuracy satisfy predetermined conditions) are to be continued. This makes it possible to solve the problems related to time and computer resource occupancy, and in addition, possible to improve the accuracy of the model by using early pruning of the trials that are not expected to produce good results.

In addition, the first training unit 135 selects a plurality of models in which the mode based on the change in the evaluation value during iterative learning of the features of a part of the predetermined learning data a predetermined number of times satisfies the predetermined mode.

According to such an information processing device 100, it is possible to perform operations, in repeated learning by application of individual trials each having a different combination of hyperparameters, such that the trials that satisfy the stop condition are to be stopped early, while the trials that do not satisfy the stop condition (a plurality of models whose evaluation values for evaluating the accuracy satisfy predetermined conditions) are to be continued. This makes it possible to solve the problems related to time and computer resource occupancy, and in addition, possible to improve the accuracy of the model by using early pruning of the trials that are not expected to produce good results.

In addition, the first training unit 135 selects a model that satisfies a plurality of conditions designated by the user, as the predetermined condition.

According to such an information processing device 100, by combining a plurality of stop conditions that conditions the trials that are not expected to improve the performance of the model to be stopped at an early stage, which are stop conditions defined by using the evaluation values of the model, it is possible to further improve the accuracy of the model as compared with the case of using a general early stopping algorithm.

Furthermore, the first training unit 135 may generate a plurality of input values to be input to a predetermined second function that calculates a random number value based on the input value, and may generate, for each of the generated input values, a part of the predetermined learning data based on the random number values output from the predetermined second function when the input values have been input. In this regard, the first training unit 135 may be an example of the learning data generation unit.

In addition, according to such an information processing device 100, it is possible to solve the problem of a failure of proper learning due to the biased learning order in which the model is trained using the training data, leading to the improvement of the accuracy of the model.

Furthermore, the first training unit 135 generates a plurality of input values to be input to a predetermined second function for each of times of repeated learning and thereby generates learning data as a learning target in the learning. The first training unit 135 then trains the model using this learning data generated for the learning, for each of times of the repeated learning.

According to such an information processing device 100, it is possible to decide the learning order in the current epoch so that the learning order to be associated with each of pieces of the training data between the epochs is not biased, for each of epochs for iterative learning.

Furthermore, as part of the predetermined learning data, the first training unit 135 generates learning data in which random number values are associated as a learning order.

According to such an information processing device 100, it is possible, for example, to associate an optimized learning order with each of pieces of the training data in the shuffle buffer, making it possible to solve the problem of a failure of proper learning due to the biased learning order in which the model is trained using the training data.

In addition, the model selection unit 136 selects one of the models according to the accuracy of the model trained by the first training unit 135 for each of combinations of the model having different parameters and the predetermined learning data.

According to such an information processing device 100, it is possible to select a model having further improved performance from among the models having different parameters, as the best model, and to provide the selected best model to the user.

(Effect of One Aspect of Information Processing Device 100 According to Embodiment (Part 2))

As described above, the information processing device 100 (one example of the learning apparatus) according to the embodiment has the second data control unit 134. The second data control unit 134 divides the predetermined learning data used for training the model to learn their features into a plurality of sets in chronological order, and controls, for each of the divided sets, so that the features of the learning data included in the set are learned by the model by the first training unit 135 in a predetermined order. In this regard, the second data control unit 134 is a processing unit corresponding to an example of a dividing unit and a training unit.

Moreover, according to such an information processing device 100, it is possible to optimize the shuffle buffer size based on the fact that the accuracy of the model changes depending on the shuffle buffer size, and possible to divide training data according to the optimized shuffle buffer size, making it possible to improve the accuracy of the model.

Furthermore, for each of sets obtained by division, the second data control unit 134 controls so as to train the model to learn, in a random order, the features of the learning data included in the set.

According to such an information processing device 100, the accuracy of the model can be improved.

Furthermore, in order from a set according to the time series among the sets obtained by the division, the second data control unit 134 controls to train the model to learn the features of the learning data included in the set.

According to such an information processing device 100, the tendency of the features of the training data can be calculated with high accuracy by the learning in order from the old training data in the time series to the new training data in the time series, making it possible to improve the accuracy of the model.

Furthermore, the second data control unit 134 divides the predetermined learning data into a set having a number of pieces of learning data designated by the user.

According to such an information processing device 100, after a user verifies how the accuracy of the model changes depending on the shuffle buffer size, the user can divide the training data based on a result obtained from this verification. This makes it possible to improve usability in shuffle buffer size optimization.

In addition, the second data control unit 134 divides predetermined learning data into a plurality of sets so that the number of pieces of the learning data included in each of the sets obtained by the division of the predetermined learning data falls within a range designated by the user.

According to such an information processing device 100, for example, when it is difficult to designate an appropriate number, the user can also designate a range with a good prospect, making it possible to improve the usability in the shuffle buffer size optimization.

(Effect of One Aspect of Information Processing Device 100 According to Embodiment (Part 3))

As described above, the information processing device 100 (an example of the learning apparatus) according to the embodiment includes the first data control unit 133. The first data control unit 133 divides predetermined learning data for training the model to learn features of their data into a plurality of sets in chronological order, and selects sets to be used for training the model from among the divided sets. In addition, using the sets from among the selected sets in order from the set in which the learning data included is older in time series, the first data control unit 133 controls to train the model to learn the features of the learning data included in each of the sets by the first training unit 135. In this regard, the first data control unit 133 is a processing unit corresponding to an example of a dividing unit, a selection unit, and a training unit.

According to such an information processing device 100, the training data actually used for learning, among the data set, can be optimized, making it possible to improve the accuracy of the model.

Furthermore, the first data control unit 133 divides a predetermined learning data into a set having a predetermined number of pieces of learning data.

According to such an information processing device 100, the data set can be divided so that each set obtained by the division includes a predetermined number of pieces of training data, making it possible to optimize each of the sets including the training data actually used for learning.

In addition, the first data control unit 133 randomly selects sets to be used for training the model from among the divided sets.

According to such an information processing device 100, it is possible to perform unbiased selection as to which set is to be defined as a set that includes the training data actually used for learning from among the sets obtained by the division.

In addition, the first data control unit 133 selects sets in which the learning data included is newer in time series, from among the divided sets.

According to such an information processing device 100, it is possible to control to achieve learning of the features of the more recent training data, leading to improvement of the accuracy of the model.

Furthermore, the first data control unit 133 selects a number of sets designated by the user from among the divided sets.

According to such an information processing device 100, it is possible to improve the usability when dividing a data set.

For example, the first data control unit 133 selects, in chronological order, the sets in which the learning data included is newer in time series, from among the divided sets until the number of the selected sets reaches a number designated by the user.

According to such an information processing device 100, it is possible to achieve the learning of the features of the training data so as to improve the accuracy of the model to the maximum in the training data designated by the user.

(Effect of One Aspect of Information Processing Device 100 According to Embodiment (Part 4))

As described above, the information processing device 100 (an example of the classification apparatus) according to the embodiment includes the first training unit 135 (may be the second training unit 137), the attribute selection unit 139, and the providing unit 138. The first training unit 135 trains the model to learn the features of the learning data having a plurality of attributes. The attribute selection unit 139 selects a target attribute which is the attribute as non-input target data, that is, which of the data having a certain attribute is not to be input to the model, among the input candidate data that has a possibility of being input to the model trained by the first training unit 135. The providing unit 138 provides information indicating attributes other than the target attribute selected by the attribute selection unit 139, and a model.

According to such an information processing device 100, a user can recognize that, when the user desires to use a trained model, data having a specific attribute needs to be masked and the remaining data is only required to be input instead of inputting all the data of the testing data prepared. In addition, as a result, the user can obtain a more proper output result than when all the testing data is used. In this regard, the information processing device 100 will be able to support the user to obtain a more proper result by using a trained model.

Furthermore, the attribute selection unit 139 selects a combination of target attributes.

According to such an information processing device 100, the accuracy of the model for all possible combinations of the target attribute is measured and the accuracy of the model can be compared between the combinations. This makes it possible to judge with high accuracy which training data corresponding to which combination should not be input to the model in order to obtain the highest accuracy.

Furthermore, the attribute selection unit 139 measures the accuracy of the model when inputting learning data having attributes other than the target attribute among the candidates of the combination of the target attributes into the model for each of the candidates and selects a combination of target attributes from the candidates based on the measurement result.

According to such an information processing device 100, the accuracy of the model can be compared between the possible combinations of target attributes. This makes it possible to judge with high accuracy which training data corresponding to which combination should not be input to the model in order to obtain the highest accuracy.

In addition, the first training unit 135 decides a plurality of new combinations of target attributes based on the combinations of target attributes in a plurality of models having accuracy that satisfies a predetermined condition, and determines whether the accuracy of each of the models satisfies the predetermined condition when the learning data having an attribute other than the target attributes in the decided combinations is input to the plurality of models. The first training unit 135 then trains the model determined to satisfy the predetermined condition to learn the learning data.

According to such an information processing device 100, when selecting a plurality of models whose evaluation values for evaluating accuracy satisfy a predetermined condition and training the selected models to learn the features of a part of the training data, it is possible to control to suppress the learning of the training data that might reduce the performance of the model, making it possible to improve the accuracy of the model.

Moreover, the providing unit 138 provides information related to the accuracy of the model when inputting learning data having attributes other than the target attribute selected by the attribute selection unit 139 into the model, as information indicating attributes other than the target attribute selected by the attribute selection unit 139.

According to such an information processing device 100, it is possible to support the user to obtain a more proper result by using a trained model.

(Effect of One Aspect of Information Processing Device 100 According to Embodiment (Part 5))

As described above, the execution control apparatus 200 according to the embodiment includes the specifying unit 231, the decision unit 232, and the execution control unit 233. The specifying unit 231 specifies the features of the model used when a plurality of arithmetic units having different architectures each executes a predetermined process. The decision unit 232 decides an arithmetic unit as an execution target, that is, which of the plurality of arithmetic units is to execute the process using the model based on the features of the model specified by the specifying unit 231. The execution control unit 233 causes the arithmetic unit decided by the decision unit 232 to execute the process using a model.

According to such an information processing device 100, it is possible to optimize the arithmetic unit as an execution target based on the features of the model so that each of processes using the model can be executed by an appropriate arithmetic unit. Furthermore, according to such an information processing device 100, the processing time spent for the processes using the model can be further reduced. Furthermore, according to such an information processing device 100, it is possible to indirectly improve the accuracy of the model from the viewpoint of a computer by which the user intends to perform processes using the model.

Furthermore, the specifying unit 231 specifies features of a plurality of processes executed as a model, as features of the model, and then, based on the features of the plurality of processes specified by the specifying unit 231, the decision unit 232 decides an arithmetic unit as an execution target to execute the process, for each of the plurality of processes, from among the plurality of arithmetic units.

According to such an information processing device 100, each of the plurality of processes executed as a model can be executed by an arithmetic unit that is better at the process, making it possible to further reduce the processing time spent for the processes using the model.

Furthermore, the decision unit 232 decides an execution target arithmetic unit from a plurality of arithmetic units, namely, a first arithmetic unit which is guaranteed to output an identical value when an identical process is executed using identical data, or a second arithmetic unit which is not guaranteed to output an identical value when an identical process is executed using identical data.

According to such an information processing device 100, the accuracy of the model can be improved.

Furthermore, the decision unit 232 decides the arithmetic unit as execution target from among a plurality of arithmetic units, namely, the first arithmetic unit that performs scalar operations or the second arithmetic unit that performs vector operations.

According to such an information processing device 100, it is possible to allow, among a plurality of processes executed as a model, the first arithmetic unit to execute a process that requires scalar operations and the second arithmetic unit to execute a process that requires vector operations, making possible to further reduce the processing time spent for the processes using the model.

Furthermore, the decision unit 232 decides the arithmetic unit as an execution target from among the plurality of arithmetic units, namely, the first arithmetic unit adopting an out-of-order method or the second arithmetic unit not adopting the out-of-order method.

According to such an information processing device 100, the accuracy of the model can be improved.

The decision unit 232 decides the arithmetic unit as the execution target from either a central processing unit having a branch prediction function as the first arithmetic unit or an image arithmetic unit having no branch prediction function as the second arithmetic unit.

According to such an information processing device 100, it is possible to assign CPU or GPU to each of a plurality of processes executed as a model, such that assigning a CPU to the process suitable for the CPU and assigning a GPU to the process suitable for the GPU, making it further reduce the processing time spent on processes using the model.

Moreover, when the model is a model for multi-class classification, the decision unit 232 decides an image arithmetic unit as the arithmetic unit as an execution target.

According to such an information processing device 100, the processing time spent for the processes using the model can be further reduced.

In addition, when the model is a model for two-class classification, the decision unit 232 decides a central processing unit as the arithmetic unit as an execution target.

According to such an information processing device 100, the processing time spent for the processes using the model can be further reduced.

Although some of the embodiments of the present application have been described in detail with reference to the drawings, these are examples, and therefore the present invention can be implemented in other forms with various modifications and improvements applied based on the knowledge of those skilled in the art, including the embodiments described in the disclosure field of the invention.

In addition, the above-described terms such as "section, module, unit" can be read as "means" or "circuit". For example, the generation unit can be read as a generation means or a generation circuit.

REFERENCE SIGNS LIST

1 INFORMATION PROVIDING SYSTEM
2 MODEL GENERATION SERVER
3 TERMINAL DEVICE
10 INFORMATION PROVIDING DEVICE
Sy INFORMATION PROCESSING SYSTEM
100 INFORMATION PROCESSING DEVICE
120 STORAGE UNIT
121 LEARNING DATA STORAGE UNIT
122 MODEL STORAGE UNIT
130 CONTROL UNIT
131 GENERATION UNIT
132 ACQUISITION UNIT
133 FIRST DATA CONTROL UNIT
134 SECOND DATA CONTROL UNIT
135 FIRST TRAINING UNIT
136 MODEL SELECTION UNIT
137 SECOND TRAINING UNIT
138 PROVIDING UNIT
139 ATTRIBUTE SELECTION UNIT
200 EXECUTION CONTROL APPARATUS
220 STORAGE UNIT
221 MODEL ARCHITECTURE STORAGE UNIT
230 CONTROL UNIT
231 SPECIFYING UNIT
232 DECISION UNIT
233 EXECUTION CONTROL UNIT

The invention claimed is:

1. A learning apparatus comprising:
a processor, the processor is configured to:
receive training data for learning model training;
divide the training data into a plurality of data sets in chronological order;
for each of a plurality of epochs:
generate a plurality of combinations of subsets of data sets, wherein data sets in each subset are selected based on a predetermined order in each epoch;
perform, for each of the plurality of combinations of subsets of data sets:
connect the subset of data sets based on the predetermined order to generate a training data set;
train a model instance to learn features of the training data set; and
evaluate the model instance to determine model accuracy; and
select a model instance with a highest model accuracy for deployment from the model instances of the plurality of epochs.

2. The learning apparatus according to claim 1, wherein the predetermined order is a random order.

3. The learning apparatus according to claim 1, wherein the predetermined order is in time series.

4. The learning apparatus according to claim 1, wherein the training data is divided into a number of data sets designated by a user.

5. The learning apparatus according to claim 1, wherein the training data is divided into a number of data sets that falls within a range designated by a user.

6. A learning method to be executed by a learning apparatus, the method comprising:
receiving, by a processor, training data for learning model training;
dividing, by the processor, the training data into a plurality of data sets in chronological order;
for each of a plurality of epochs:
generating, by the processor a plurality of combinations of subsets of data sets, wherein data sets in each subset are selected based on a predetermined order in each epoch;
performing, by the processor, for each of the plurality of combinations of subsets of data sets:
connecting the subset of data sets based on the predetermined order to generate a training data set;
training a model instance to learn features of the training data set; and
evaluating the model instance to determine model accuracy; and
selecting, by the processor, a model instance with a highest model accuracy for deployment from the model instances of the plurality of epochs.

7. A non-transitory computer-readable storage medium having stored therein a learning program for causing a computer to execute:
receiving training data for learning model training;
dividing the training data into a plurality of data sets in chronological order;
for each of a plurality of epochs:
generating a plurality of combinations of subsets of data sets, wherein data sets in each subset are selected based on a predetermined order in each epoch;

performing for each of the plurality of combinations of subsets of data sets:

connecting the subset of data sets based on the predetermined order to generate a training data set;

training a model instance to learn features of the training data set; and evaluating the model instance to determine model accuracy; and selecting a model instance with a highest model accuracy for deployment from the model instances of the plurality of epochs.

8. A learning apparatus comprising:

a processor, the processor is configured to:

receive training data for learning model training;

divide the training data into a plurality of data sets in chronological order;

select a subset of data sets from the plurality of data sets in a predetermined order;

connect the subset of data sets based on selection order to generate a training data group;

divide the training data group into a plurality of training data sets according to a buffer size;

shuffle the plurality of training data sets in a random order; and iteratively train the learning model by sequentially learning features of the plurality of training data sets in the random order.

\*   \*   \*   \*   \*